(12) United States Patent
Zhou et al.

(10) Patent No.: US 12,531,614 B2
(45) Date of Patent: Jan. 20, 2026

(54) UPLINK BEAM REPORTING

(71) Applicant: Ofinno, LLC, Reston, VA (US)

(72) Inventors: Hua Zhou, Vienna, VA (US); Esmael Hejazi Dinan, McLean, VA (US); Yunjung Yi, Vienna, VA (US); Ali Cagatay Cirik, Chantilly, VA (US); Jonghyun Park, Syosset, NY (US); Hyoungsuk Jeon, Centreville, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 384 days.

(21) Appl. No.: 17/959,444

(22) Filed: Oct. 4, 2022

(65) Prior Publication Data
US 2023/0041095 A1  Feb. 9, 2023

Related U.S. Application Data

(63) Continuation of application No. PCT/US2021/026514, filed on Apr. 9, 2021.

(60) Provisional application No. 63/008,115, filed on Apr. 10, 2020.

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04L 5/0053* (2013.01); *H04W 24/10* (2013.01)

(58) Field of Classification Search
CPC .. H04B 7/0626; H04B 17/102; H04B 7/0619; H04L 5/0053; H04L 1/0026; H04L 5/001; H04L 5/0048; H04L 5/0055; H04L 5/0057; H04L 5/0094; H04W 24/10
See application file for complete search history.

(56) References Cited

U.S. PATENT DOCUMENTS

| 8,755,832 | B2 | 6/2014 | Baldemair et al. |
| 9,615,338 | B2 | 4/2017 | Kim et al. |
| 2019/0174432 | A1* | 6/2019 | Wang .................. H04W 72/21 |

(Continued)

FOREIGN PATENT DOCUMENTS

CN  110536397 A  12/2019

OTHER PUBLICATIONS

3GPP TS 38.101-1 V16.2.0 (Dec. 2019); Technical Specification; 3rd Generation Partnership Project; Technical Specification Group Radio Access Network; NR; User Equipment (UE) radio transmission and reception; Part 1: Range 1 Standalone; (Release 16).

(Continued)

*Primary Examiner* — Will W Lin
(74) *Attorney, Agent, or Firm* — Peter Flanagan; Kavon Nasabzadeh; Jacob L. Mangan

(57) ABSTRACT

Described are embodiments for uplink beam reporting. A wireless device determines an overlap in time between: a first uplink channel resource of a permissible exposure report for a cell and a second uplink channel resource of a channel state information (CSI) report for the cell. Based on the determined overlap in time, the wireless device drops the CSI report scheduled for transmission via the second uplink channel resource, and transmits the permissible exposure report via the first uplink channel resource.

20 Claims, 37 Drawing Sheets

(56) References Cited

U.S. PATENT DOCUMENTS

| | | | | |
|---|---|---|---|---|
| 2019/0215086 | A1* | 7/2019 | Kwak | H04B 17/24 |
| 2019/0306850 | A1 | 10/2019 | Zhang et al. | |
| 2020/0022094 | A1* | 1/2020 | You | H04W 72/21 |
| 2020/0280933 | A1* | 9/2020 | Liu | H04W 52/365 |
| 2021/0144652 | A1* | 5/2021 | Gheorghiu | H04W 52/365 |
| 2023/0035862 | A1* | 2/2023 | Yuan | H04W 52/367 |
| 2023/0065305 | A1* | 3/2023 | He | H04W 52/367 |

OTHER PUBLICATIONS

3GPP TS 38.101-2 V16.2.0 (Dec. 2019); Technical Specification; 3rd Generation Partnership Project; Technical Specification Group Radio Access Network; NR; User Equipment (UE) radio transmission and reception; Part 2: Range 2 Standalone; (Release 16).
3GPP TS 38.101-3 V16.2.1 (Dec. 2019); Technical Specification; 3rd Generation Partnership Project; Technical Specification Group Radio Access Network; NR; User Equipment (UE) radio transmission and reception; Part 3: Range 1 and Range 2 Interworking operation with other radios; (Release 16).
3GPP TS 38.101-4 V15.4.0 (Dec. 2019); Technical Specification; 3rd Generation Partnership Project; Technical Specification Group Radio Access Network; NR; User Equipment (UE) radio transmission and reception; Part 4: Performance requirements; (Release 15).
3GPP TS 38.212 V16.0.0 (Dec. 2019); 3rd Generation Partnership Project; Technical Specification Group Radio Access Network; NR; Multiplexing and channel coding; (Release 16).
3GPP TS 38.213 V16.0.0 (Dec. 2019); Technical Specification; 3rd Generation Partnership Project; Technical Specification Group Radio Access Network; NR; Physical layer procedures for control; (Release 16).
3GPP TS 38.214 V16.0.0 (Dec. 2019); 3rd Generation Partnership Project; Technical Specification Group Radio Access Network; NR; Physical layer procedures for data (Release 16).
3GPP TS 38.321 V16.0.0 (Mar. 2020); 3rd Generation Partnership Project; Technical Specification Group Radio Access Network; NR;Medium Access Control (MAC) protocol specification; (Release 16).
3GPP TS 38.331 V16.0.0 (Mar. 2020); 3rd Generation Partnership Project; Technical Specification Group Radio Access Network; NR; Radio Resource Control (RRC) protocol specification (Release 16).
R1-1900088; 3GPP TSG RAN WG1 Ad-Hoc Meeting #1901; Taipei, Jan. 21-25, 2019; Source: ZTE; Title: Enhancements on multi-beam operation; Agenda Item: 7.2.8.3; Document for: Discussion and Decision.
R1-1900294; 3GPP TSG RAN WG1 Ad-Hoc Meeting 1901; Taipei, Jan. 21-25, 2019; Source: OPPO; Title: Discussion on Multi-beam Operation Enhancements; Agenda Item: 7.2.8.3; Document for: Discussion and Decision.
R1-1900296; 3GPP TSG RAN WG1 Ad-Hoc Meeting 1901; Taipei, Jan. 21-25, 2019; Source: OPPO; Title: Discussion on the MPE (Maximum Permissible Exposure) issue; Agenda Item: 7.2.8.6; Document for: Discussion and Decision.
R1-1900340; 3GPP TSG RAN WG1 Ad-Hoc Meeting 1901; Taipei, Jan. 21-25, 2019; Source: CATT; Title: Enhancements on multi-beam operation; Agenda Item: 7.2.8.3; Document for: Discussion and Decision.
R1-1901635; 3GPP TSG RAN WG1 Meeting #96; Athens, Greece, Feb. 25-Mar. 1, 2019; Source: ZTE; Title: Enhancements on multi-beam operation; Agenda Item: 7.2.8.3; Document for: Discussion and Decision.
R1-1902704; 3GPP TSG RAN WG1 #96; Athens, Greece, Feb. 25-Mar. 1, 2019; Source: OPPO; Title: Discussion on Multi-beam Operation Enhancements; Agenda Item: 7.2.8.3; Document for: Discussion and Decision.
R1-1904028; 3GPP TSG RAN WG1 Meeting #96bis; Xi'an, China, Apr. 8-12, 2019; Source: ZTE; Title: Enhancements on UL beam management; Agenda Item: 7.2.8.6; Document for. Discussion and Decision.
R1-1904038; 3GPP TSG RAN WG1 #96bis; Xi'an, China, Apr. 8-12, 2019; Source: OPPO; Title: Discussion on Multi-beam Operation Enhancements; Agenda Item: 7.2.8.3; Document for: Discussion and Decision.
R1-1904097; 3GPP TSG RAN WG1 #96bis; Xi'an, China, Apr. 8-12, 2019; Source: vivo; Title: Further discussion on Multi-Beam Operation; Agenda Item: 7.2.8.3; Document for: Discussion and Decision.
R1-1904983; 3GPP TSG RAN WG1 #96bis; Xi'an, China, Apr. 8-12, 2019; Agenda Item: 7.2.8.3; Source: Apple; Title: Considerations on multi-panel and MPE in FR2; Document for: Discussion/Decision.
R1-1905027; 3GPP TSG-RAN WG1 Meeting #96-Bis; Xi'an, China, Apr. 8-12, 2019; Agenda item: 7.2.8.3; Source: Qualcomm Incorporated; Title: Enhancements on Multi-beam Operation; Document for: Discussion/Decision.
R1-1905065; 3GPP TSG RAN WG1 #96bis Meeting; Xi'an, China, Apr. 8-Apr. 12, 2019; Agenda item: 7.2.8.3; Source: Nokia, Nokia Shanghai Bell; Title: Enhancements on Multi-beam Operation; Document for: Discussion and Decision.
R1-1906251; 3GPP TSG RAN WG1 Meeting #97; Reno, USA, May 13-17, 2019; Source: ZTE; Title: Enhancements on UL beam management; Agenda Item: 7.2.8.5; Document for: Discussion and Decision.
R1-1907290; 3GPP TSG-RAN WG1 Meeting #97; Reno, USA, May 13-17, 2019; Agenda item: 7.2.8.3; Source: Qualcomm Incorporated; Title: Enhancements on Multi-beam Operation; Document for: Discussion/Decision.
R1-1907317; 3GPP TSG RAN WG1 #97 Meeting; Reno, Nevada, USA, May 14-May 17, 2019; Agenda item: 7.2.8.3; Source: Nokia, Nokia Shanghai Bell; Title: Enhancements on Multi-beam Operation; Document for: Discussion and Decision.
R1-1907343; 3GPP TSG RAN WG1 #97; Reno, USA, May 13-17, 2019; Agenda Item: 7.2.8.3; Source: Apple; Title: Considerations on multi-panel and MPE in FR2; Document for: Discussion/Decision.
R1-1908167; 3GPP TSG RAN WG1 #98; Prague, CZ, Aug. 26-30, 2019; Source: vivo; Title: Further discussion on Multi-Beam Operation; Agenda Item: 7.2.8.3; Document for: Discussion and Decision.
R1-1908192; 3GPP TSG RAN WG1 Meeting #98; Prague, CZ, Aug. 26-30, 2019; Source: ZTE; Title: Enhancements on multi-beam operation; Agenda Item: 7.2.8.3; Document for: Discussion and Decision.
R1-1908233; 3GPP TSG RAN WG1 #98; Prague, CZ, Aug. 26-30, 2019; Agenda Item: 7.2.8.3; Source: InterDigital, Inc.; Title: Views on Panel Activation and Deactivation; Document for: Discussion and Decision.
R1-1908352; 3GPP TSG RAN WG1 #98; Prague, CZ, Aug. 26-30, 2019; Source: OPPO; Title: Discussion on Multi-beam Operation Enhancements; Agenda Item: 7.2.8.3; Document for: Discussion and Decision.
R1-1908380; 3GPP TSG RAN WG1 #98; Prague, CZ, Aug. 26-30, 2019; Agenda Item: 7.2.8.3; Source: MediaTek Inc.; Title: Enhancements on multi-beam operations; Document for: Discussion.
R1-1908502; 3GPP TSG RAN WG1 98; Prague, Czech Republic, Aug. 26-30, 2019; Agenda item: 7.2.8.3; Source: Samsung; Title: Enhancements on multi-beam operations; Document for: Discussion and Decision.
R1-1908603; 3GPP TSG RAN WG1 Meeting #98; Prague, CZ, Aug. 26-30, 2019; Source: CATT; Title: Consideration on multi-beam enhancements; Agenda Item: 7.2.8.3; Document for: Discussion and Decision.
R1-1908654; 3GPP TSG RAN WG1 #98; Prague, CZ, Aug. 26-30, 2019; Source: Intel Corporation; Title: Discussion on multi-beam enhancements; Agenda item: 7.2.8.3; Document for: Discussion and Decision.
R1-1908784; 3GPP TSG RAN WG1#98 meeting; Prague, CZ, Aug. 26-30, 2019; Agenda Item: 7.2.8.3; Source: Sony; Title: Enhancements on multi-beam operation; Document for: Discussion.
R1-1908886; 3GPP TSG RAN WG1 #98; Prague, CZ, Aug. 26-30, 2019; Agenda item: 7.2.8.3; Source: China Telecom; Title: Enhancements on multi-beam operation; Document for: Discussion.

(56) References Cited

OTHER PUBLICATIONS

R1-1908959; 3GPP TSG RAN WG1 #98; Prague, CZ, Aug. 26-30, 2019; Agenda Item: 7.2.8.3; Source: Spreadtrum Communications; Title: Discussion on multi-beam operation; Document for: Discussion and decision.

R1-1909048; 3GPP TSG RAN WG1 #98; Prague, CZ, Aug. 26-30, 2019; Agenda Item: 7.2.8.3; Source: Apple Inc.; Title: Remaining Issues on Multi-beam operation; Document for: Discussion/Decision.

R1-1909076; 3GPP TSG RAN WG1 #98; Prague, Cz, Aug. 26-30, 2019; Agenda Item: 7.2.8.3; Source: AT Title: Enhancements on Multi Beam Operation; Document for: Discussion/Approval.

R1-1909210; 3GPP TSG RAN WG1 #98; Prague, Czech Republic, Aug. 26-30, 2019; Agenda item: 7.2.8.3; Source: Nokia, Nokia Shanghai Bell; Title: Enhancements on Multi-beam Operation; Document for: Discussion and Decision.

R1-1909225; 3GPP TSG-RAN WG1 Meeting #98; Prague, Czech Republic, Aug. 26-30; Agenda Item: 7.2.8.3; Source: Ericsson; Title: Enhancements to multibeam operation; Document for: Discussion.

R4-1814862; 3GPP TSG-RAN WG4 Meeting #89; Spokane, USA, Nov. 12-16, 2018; Agenda item: 7.6.6.1.2; Source: Nokia, Nokia Shanghai Bell; Title: FR2 UE RF exposure compliance and its system implications; Document for: Approval.

International Search Report of the International Searching Authority mailed Aug. 6, 2021, in International Application No. PCT/US2021/026514.

R1-1913109 (R1-1911205); 3GPP TSG RAN WG1 Meeting #99; Reno, NV, USA, Nov. 18-22, 2019; Agenda item: 5.2; Source: Nokia, Nokia Shanghai Bell; Title: UE FR2 MPE mitigation; Document for: Discussion.

* cited by examiner

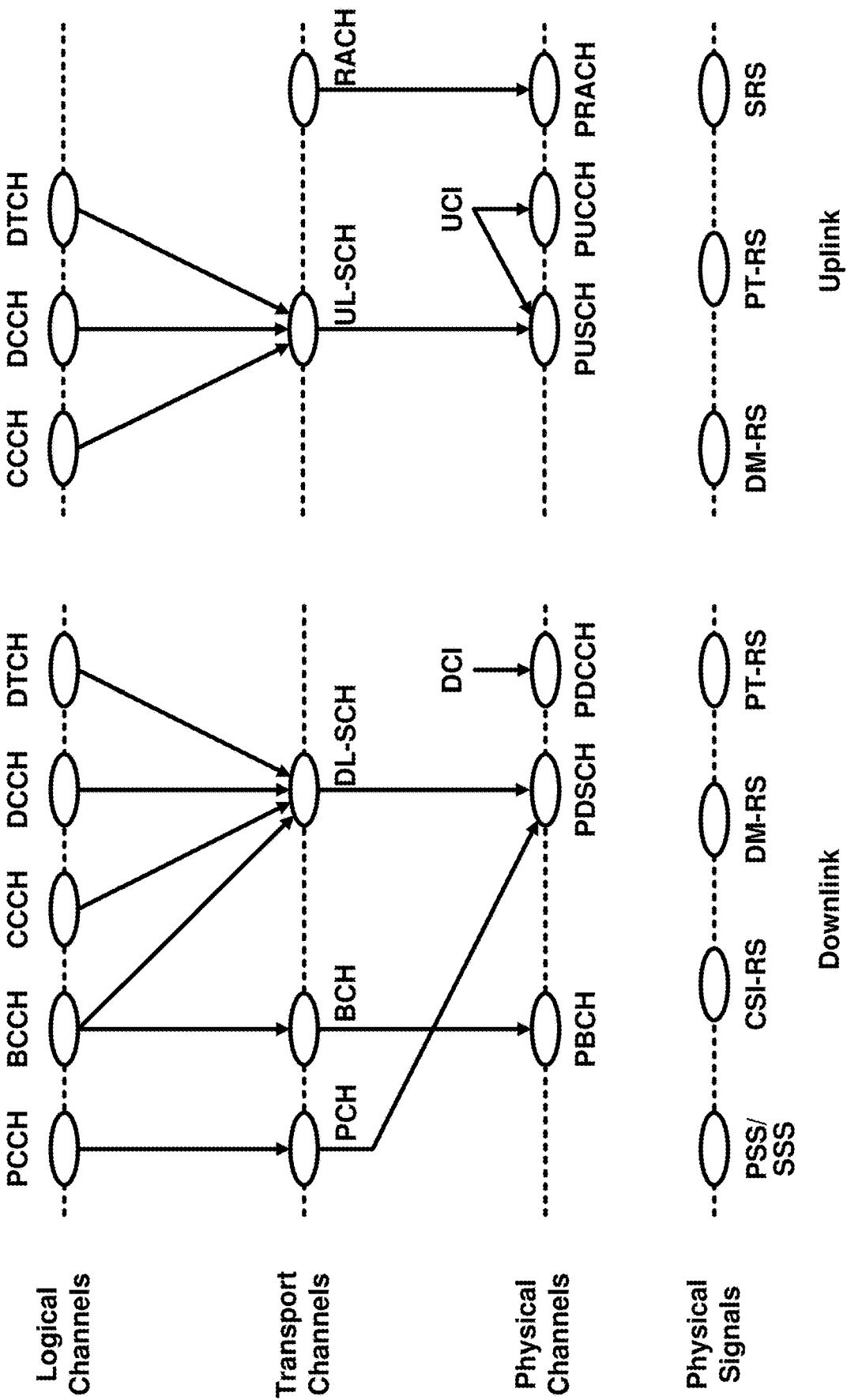
FIG. 5B Uplink
FIG. 5A Downlink

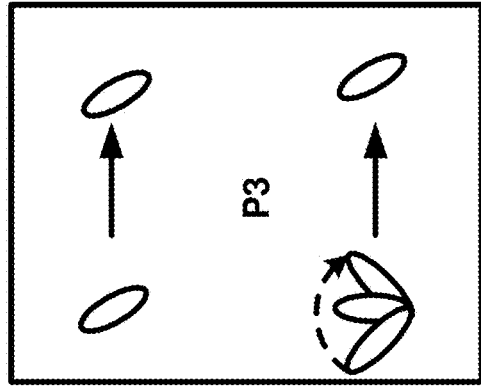
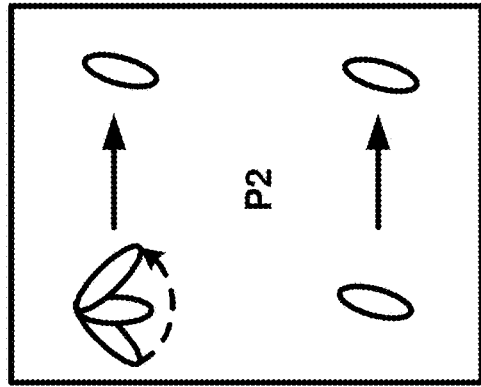
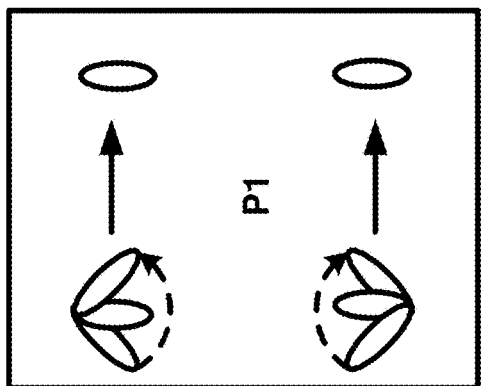
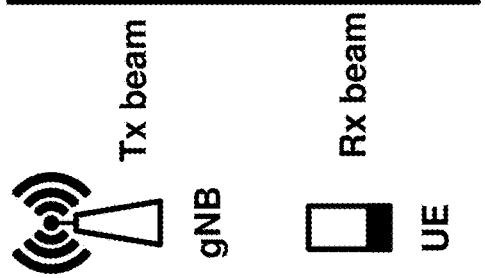
FIG. 12A
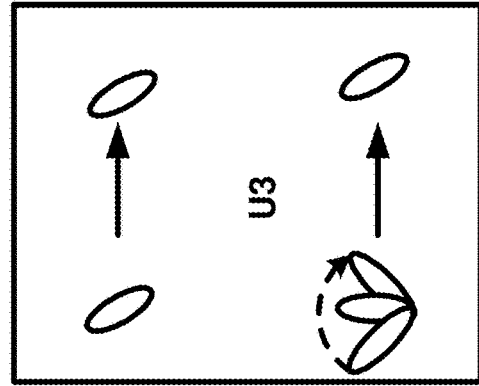
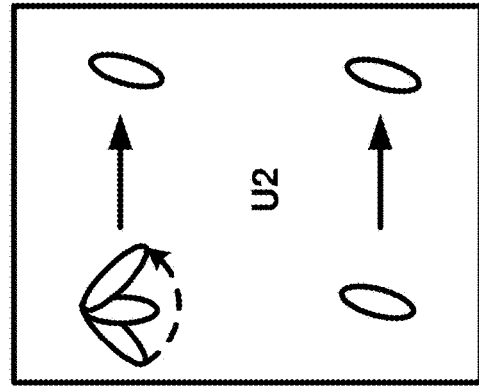
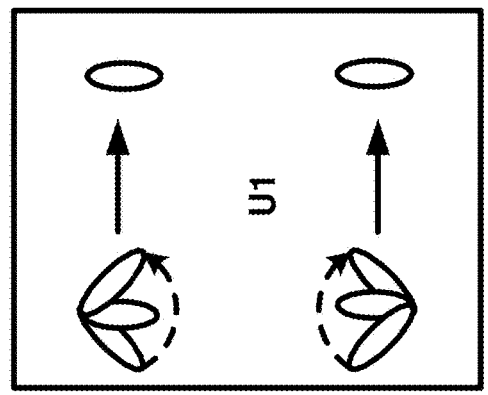
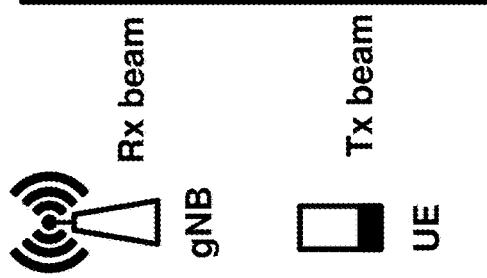
FIG. 12B

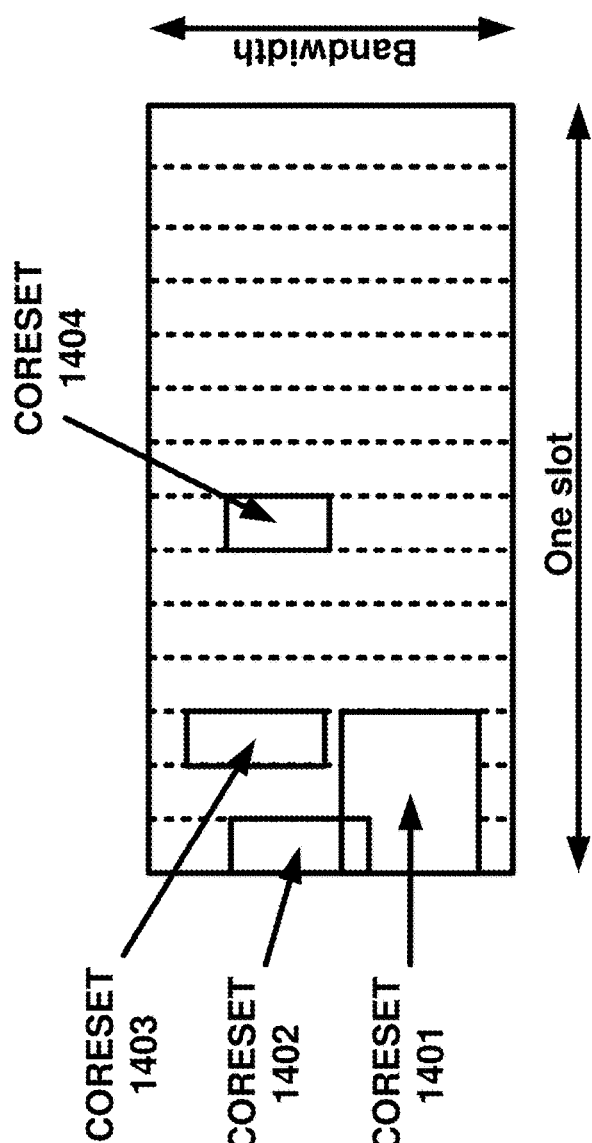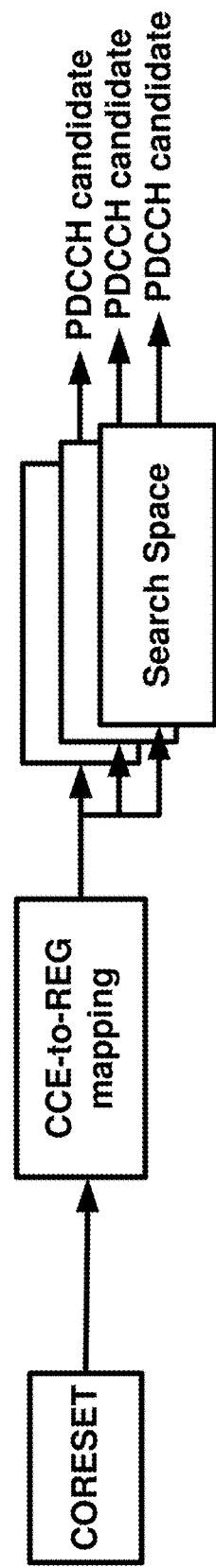
FIG. 14A
FIG. 14B

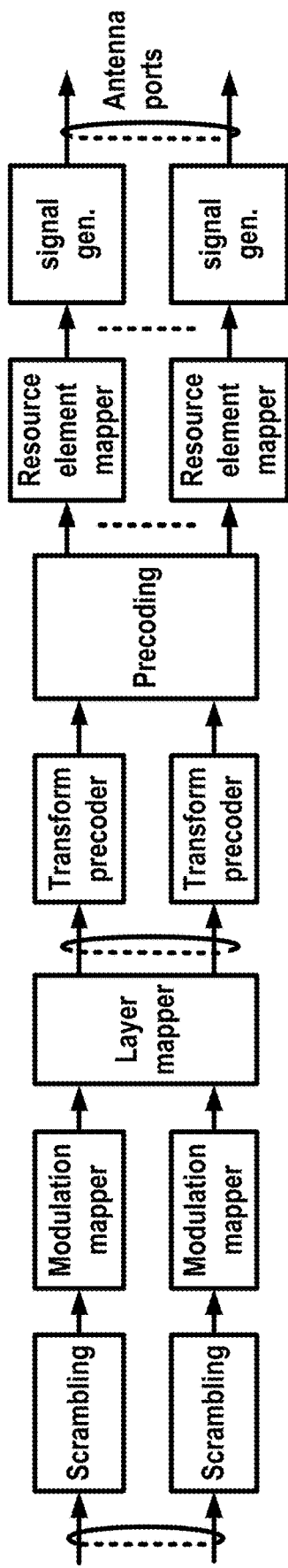
FIG. 16A
FIG. 16B
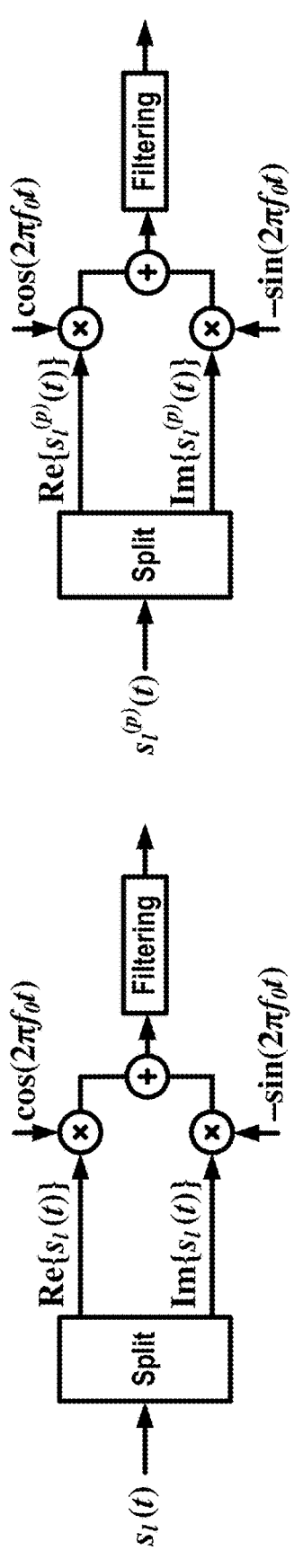
FIG. 16D
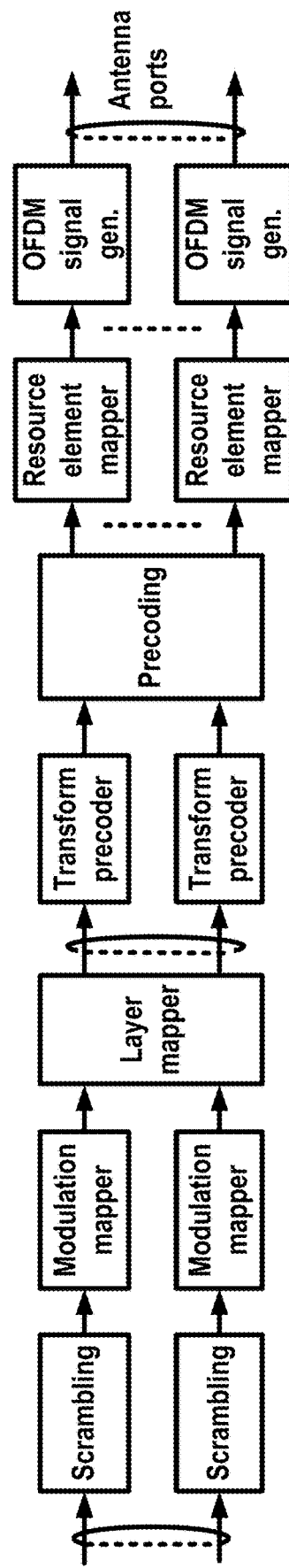
FIG. 16C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

– *ServingCellConfig*
The IE *ServingCellConfig* is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

*ServingCellConfig* information element

```
ServingCellConfig ::=        SEQUENCE {
  tdd-UL-DL-ConfigurationDedicated  TDD-UL-DL-ConfigDedicated  OPTIONAL,-- Cond TDD
  initialDownlinkBWP           BWP-DownlinkDedicated         OPTIONAL,    -- Need M
  downlinkBWP-ToReleaseList    SEQUENCE (SIZE (1..maxNrofBWPs)) OF BWP-Id  OPTIONAL,-- Need N
  downlinkBWP-ToAddModList     SEQUENCE (SIZE (1..maxNrofBWPs)) OF BWP-Downlink  OPTIONAL,   -- Need N
  firstActiveDownlinkBWP-Id    BWP-Id   OPTIONAL,     -- Cond SyncAndCellAdd
  bwp-InactivityTimer          ENUMERATED {ms2,...} OPTIONAL,  --Need R
  defaultDownlinkBWP-Id        BWP-Id  OPTIONAL,   -- Need S
  ...
  sCellDeactivationTimer       ENUMERATED {ms20, ms40, ...}   OPTIONAL,    -- Cond ServingCellWithoutPUCCH
  crossCarrierSchedulingConfig CrossCarrierSchedulingConfig  OPTIONAL,-- Need M
  tag-Id                       TAG-Id,
  pathlossReferenceLinking     ENUMERATED {spCell, sCell} OPTIONAL,-- Cond CellOnly   ...}

– *CrossCarrierSchedulingConfig*
The IE *CrossCarrierSchedulingConfig* is used to specify the configuration when the cross-carrier scheduling is used in a cell.

CrossCarrierSchedulingConfig information element

CrossCarrierSchedulingConfig ::=   SEQUENCE {
  schedulingCellInfo           CHOICE {
    own                        SEQUENCE {                         -- Cross carrier scheduling: scheduling cell
      cif-Presence             BOOLEAN
    },
    other                      SEQUENCE {                         -- Cross carrier scheduling: scheduled cell
      schedulingCellId         ServCellIndex,
      cif-InSchedulingCell     INTEGER (1..7)   }  },   ...}
```

FIG. 23

– 
SearchSpace
The IE SearchSpace defines how/where to search for PDCCH candidates. Each search space is associated with one ControlResourceSet. For a scheduled cell in the case of cross carrier scheduling, except for nrofCandidates, all the optional fields are absent.

SearchSpace information element

```
SearchSpace ::=           SEQUENCE {
  searchSpaceId           SearchSpaceId,
  controlResourceSetId    ControlResourceSetId   OPTIONAL,   -- Cond SetupOnly
  monitoringSlotPeriodicityAndOffset  CHOICE {
    sl1                   NULL,
    sl2                   INTEGER (0..1)
    ...
  }                                              OPTIONAL,   -- Cond Setup
  duration                INTEGER (2..2559)      OPTIONAL,   -- Need R
  monitoringSymbolsWithinSlot  BIT STRING (SIZE (14))  OPTIONAL,  -- Need R
  nrofCandidates          SEQUENCE {
    aggregationLevel1     ENUMERATED {n0, n1, n2, n3, n4, n5, n6, n8},
    ...
  }                                              OPTIONAL,   -- Cond Setup
  searchSpaceType         CHOICE {
    common                SEQUENCE {
      ...
    }                                            OPTIONAL,   -- Need R
    ue-Specific           SEQUENCE {             dci-Formats  ENUMERATED {formats0-0-And-1-0, formats0-1-And-1-1},
                          dci-Format0-0-AndFormat1-0   SEQUENCE {
    }                                            OPTIONAL    -- Cond Setup
  } OPTIONAL              -- Cond Setup
}
``` searchSpaceId
Identity of the search space. SearchSpaceId = 0 identifies the searchSpaceZero configured via PBCH (MIB) or ServingCellConfigCommon and may hence not be used in the SearchSpace IE. The searchSpaceId is unique among the BWPs of a Serving Cell. In case of cross carrier scheduling, search spaces with the same searchSpaceId in scheduled cell and scheduling cell are linked to each other. The UE applies the search space for the scheduled cell only if the DL BWPs in which the linked search spaces are configured in scheduling cell and scheduled cell are both active.

FIG. 24

– ControlResourceSet

The IE *ControlResourceSet* is used to configure a time/frequency control resource set (CORESET) in which to search for downlink control information.

```
ControlResourceSet ::=           SEQUENCE {
    controlResourceSetId         ControlResourceSetId,
    frequencyDomainResources     BIT STRING (SIZE (45)),
    duration                     INTEGER (1..maxCoReSetDuration),
    tci-StatesPDCCH-ToAddList    SEQUENCE(SIZE (1..maxNrofTCI-StatesPDCCH)) OF TCI-StateId OPTIONAL, -- Cond NotSIB1-initialBWP
    tci-PresentInDCI             ENUMERATED {enabled}                                                 OPTIONAL, -- Need S
    ...}
```

*controlResourceSetId*

Value 0 identifies the common CORESET configured in *MIB* and in *ServingCellConfigCommon* (*controlResourceSetZero*) and is hence not used here in the *ControlResourceSet* IE. Values 1..*maxNrofControlResourceSets*-1 identify CORESETs configured by dedicated signalling or in *SIB1*. The *controlResourceSetId* is unique among the BWPs of a serving cell.

*duration*

Contiguous time duration of the CORESET in number of symbols.

*frequencyDomainResources*

Frequency domain resources for the CORESET. Each bit corresponds a group of 6 RBs, with grouping starting from the first RB group in the BWP. The first (left-most / most significant) bit corresponds to the first RB group in the BWP, and so on....

*tci-PresentInDCI*

This field indicates if TCI field is present or absent in DL-related DCI. When the field is absent the UE considers the TCI to be absent/ disabled. In case of cross carrier scheduling, the network sets this field to enabled for the *ControlResourceSet* used for cross carrier scheduling in the scheduling cell.

*tci-StatesPDCCH-ToAddList*

A subset of the TCI states defined in pdsch-Config included in the *BWP-DownlinkDedicated* corresponding to the serving cell and to the DL BWP to which the *ControlResourceSet* belong to. They are used for providing QCL relationships between the DL RS(s) in one RS Set (TCI-State) and the PDCCH DMRS ports. The network configures at most *maxNrofTCI-StatesPDCCH* entries.

FIG. 25

– *CSI-ReportConfig*

The IE *CSI-ReportConfig* is used to configure a periodic or SP report sent on PUCCH on the cell in which the *CSI-ReportConfig* is included, or to configure a SP or aperiodic report sent on PUSCH triggered by DCI received on the cell in which the *CSI-ReportConfig* is included (in this case, the cell on which the report is sent is determined by the received DCI).

```
CSI-ReportConfig ::=          SEQUENCE {
  reportConfigId              CSI-ReportConfigId,
  carrier                     ServCellIndex        OPTIONAL,  -- Need S
  reportConfigType            CHOICE {
    periodic                  SEQUENCE {...},
    semiPersistentOnPUCCH     SEQUENCE { ... },
    semiPersistentOnPUSCH     SEQUENCE { ...},
    aperiodic                 SEQUENCE {...},
  reportQuantity              CHOICE { none                       NULL,
    cri-RI-PMI-CQI            NULL,
    cri-RI-i1                 NULL,
    cri-RI-i1-CQI             SEQUENCE {pdsch-BundleSizeForCSI
ENUMERATED {n2, n4} OPTIONAL   -- Need S },
    cri-RI-CQI                NULL,
    cri-RSRP                  NULL,
    ssb-Index-RSRP            NULL,
    cri-RI-LI-PMI-CQI         NULL },
  reportFreqConfiguration   SEQUENCE { cqi-FormatIndicator   ENUMERATED {
widebandCQI, subbandCQI }
    pmi-FormatIndicator         ENUMERATED { widebandPMI, subbandPMI }
PUCCH-CSI-Resource ::=       SEQUENCE {uplinkBandwidthPartId   BWP-Id,
  pucch-Resource              PUCCH-ResourceId}
```

*carrier*
Indicates in which serving cell the *CSI-ResourceConfig* indicated below are to be found. If the field is absent, the resources are on the same serving cell as this report configuration.
*cqi-FormatIndicator*
Indicates whether the UE shall report a single (wideband) or multiple (subband) CQI.
*pmi-FormatIndicator*
Indicates whether the UE shall report a single (wideband) or multiple (subband) PMI.
*pucch-CSI-ResourceList*
Indicates which PUCCH resource to use for reporting on PUCCH.
*reportConfigType*
Time domain behavior of reporting configuration.
*reportFreqConfiguration*
Reporting configuration in the frequency domain.
*reportQuantity*
The CSI related quantities to report.
*pucch-Resource*
PUCCH resource for the associated uplink BWP. Only PUCCH-Resource of format 2, 3 and 4 is supported. The actual PUCCH-Resource is configured in *PUCCH-Config* and referred to by its ID.

FIG. 26

| CSI-RS Configuration | Periodic CSI Reporting | SP CSI Reporting | Aperiodic CSI Reporting |
|---|---|---|---|
| Periodic CSI-RS | No dynamic triggering/activation | MAC CE activated SP CSI reporting on PUCCH; DCI triggered SP CSI reporting on PUSCH | Triggered by DCI |
| SP CSI-RS | N/A | MAC CE activated SP CSI reporting on PUCCH; DCI triggered SP CSI reporting on PUSCH | Triggered by DCI |
| Aperiodic CSI-RS | N/A | N/A | Triggered by DCI |

FIG. 27

| | |
|---|---|
| The UE triggers UL beam/power report based on UL duty cycle of 1st panel and 2nd panel, comprising: | • 1st UL duty cycle evaluated on 1st panel being higher than a threshold; and/or<br>• 2nd UL duty cycle evaluated on 2nd panel being less than the threshold. |
| The UE triggers UL beam/power report based on P-MPR of 1st panel and 2nd panel, comprising: | • 1st P-MPR via 1st panel being higher than a threshold; and/or<br>• 2nd P-MPR via 2nd panel being less than the threshold. |
| The UE triggers UL beam/power report based on P-MPR change of 1st panel and 2nd panel, comprising: | • Change of P-MPR via 1st panel from a previous P-MPR being higher than a threshold; and/or<br>• Change of P-MPR via 2nd panel from a previous P-MPR being less than the threshold. |
| The UE triggers UL beam/power report based on combined value of RSRP and P-MPR of 1st panel and 2nd panel, comprising: | • A value determined based on 1st RSRP and 1st P-MPR for 1st panel is less than a threshold; and/or<br>• A value determined based on 2nd RSRP and 2nd P-MPR for 2nd panel is higher than the threshold. |
| The UE triggers UL beam/power report based on PHR of 1st panel and 2nd panel, comprising: | • A value indicating a PHR for 1st panel is less than a threshold; and/or<br>• A value indicating a PHR for 2nd panel is higher than the threshold. |

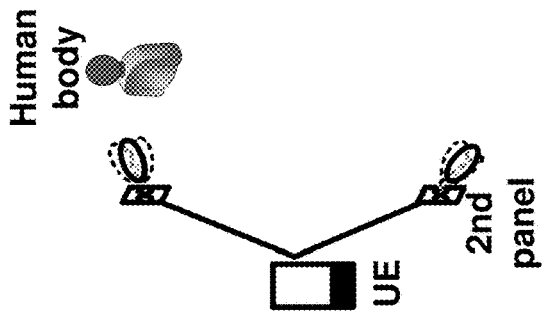

FIG. 31

| Field of uplink beam/power report via PUCCH/PUSCH | Bitwidth |
|---|---|
| first P-MPR associated with a first panel | L1 bits |
| first index identifying the first panel | L2 bits |
| differential P-MPR value for a second panel | L3 bits |
| second index identifying the second panel | L2 bits |

FIG. 34

| Field of uplink beam/power report via PUCCH/PUSCH | Bitwidth |
|---|---|
| first combined value of P-MPR and RSRP associated with a first panel | N1 bits |
| first index identifying the first panel | N2 bits |
| differential combined value of P-MPR and RSRP for a second panel | N3 bits |
| second index identifying the second panel | N2 bits |

FIG. 35

| Field of uplink beam/power report via PUCCH/PUSCH | Bitwidth |
|---|---|
| first PHR associated with a first panel | M1 bits |
| first index identifying the first panel | M2 bits |
| differential PHR value for a second panel | M3 bits |
| second index identifying the second panel | M2 bits |

FIG. 36

UPLINK BEAM REPORTING

CROSS-REFERENCE TO RELATED APPLICATIONS

This application is a continuation of International Application No. PCT/US2021/026514, filed Apr. 9, 2021, which claims the benefit of U.S. Provisional Application No. 63/008,115, filed on Apr. 10, 2020, the contents of each of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 14A illustrates an example of CORESET configurations for a bandwidth part.

FIG. 14B illustrates an example of a CCE-to-REG mapping for DCI transmission on a CORESET and PDCCH processing.

FIG. 16A, FIG. 16B, FIG. 16C, and FIG. 16D illustrate example structures for uplink and downlink transmission.

FIG. 19 shows an example of multiple LCIDs of downlink, according to some embodiments.

FIG. 20 shows an example of multiple LCIDs of uplink, according to some embodiments.

FIG. 23 shows an example of RRC message of configuration parameters of a cell.

FIG. 24 shows an example of RRC message of configuration parameters of a search space.

FIG. 25 shows an example of RRC message of configuration parameters of a control resource set (CORESET).

FIG. 26 shows an example of RRC message of configuration parameters of a CSI report.

FIG. 27 shows an example of CSI-RS configuration and CSI report framework, according to some embodiments.

FIG. 31 shows an example of aperiodic uplink beam/power report for multiple panels, according to some embodiments.

FIG. 34 shows an example of uplink beam/power report format, according to some embodiments.

FIG. 35 shows an example of uplink beam/power report format, according to some embodiments.

FIG. 36 shows an example of uplink beam/power report format, according to some embodiments.

DETAILED DESCRIPTION

Figure 1A:
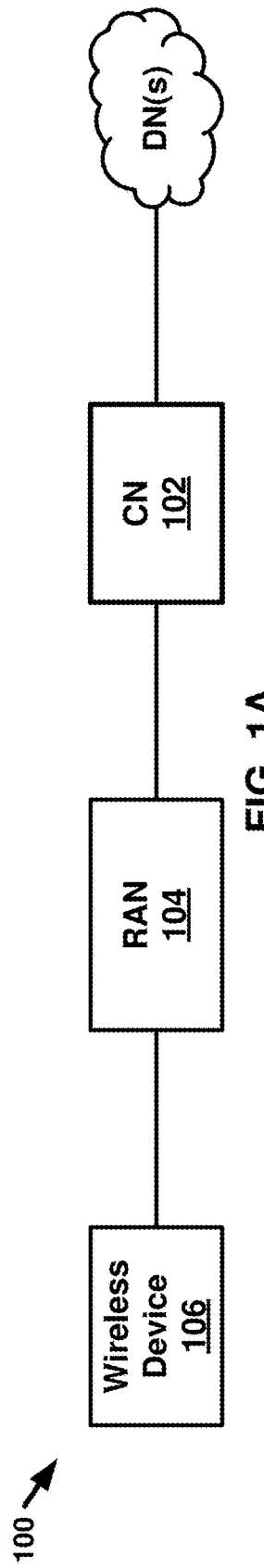
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware.

Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
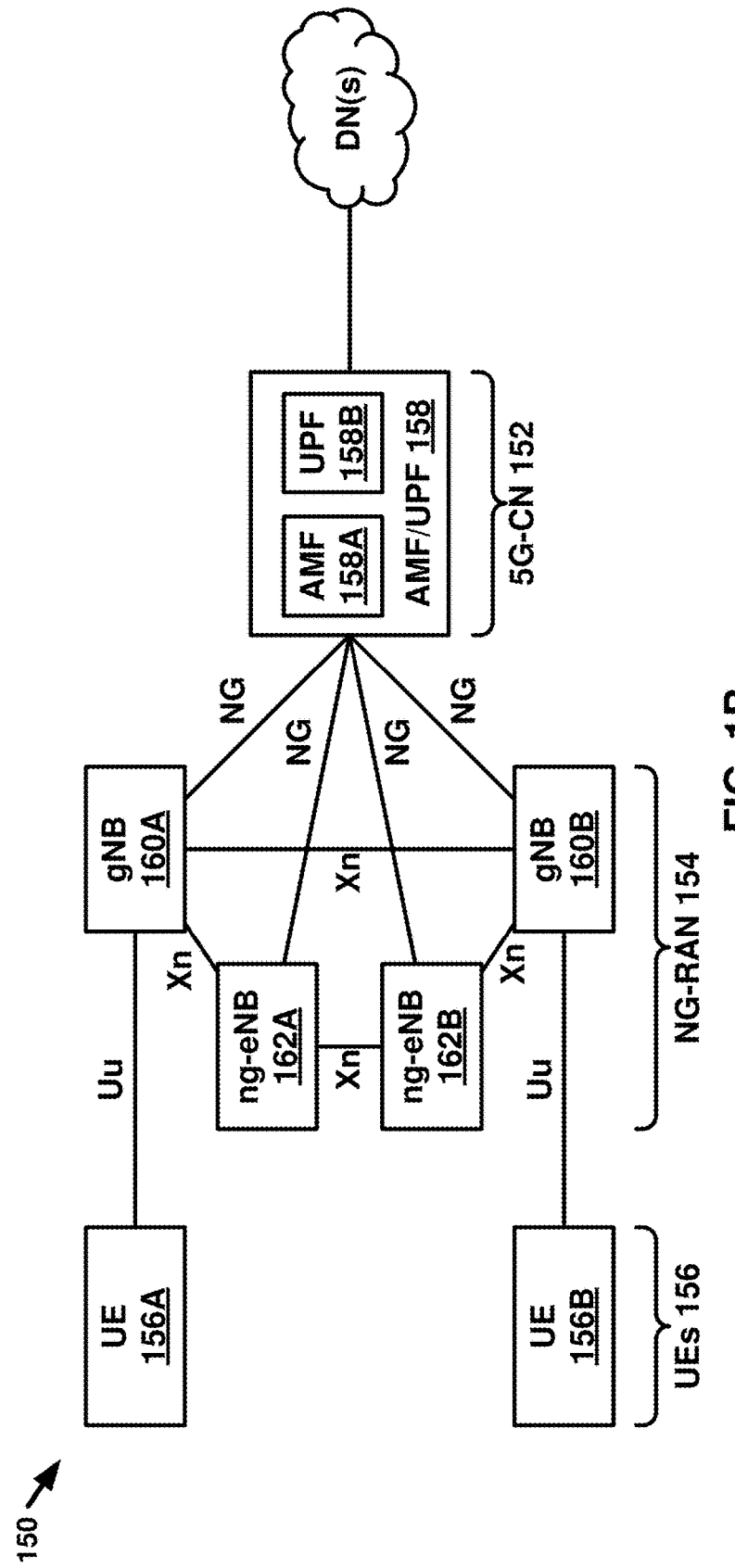

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-ON node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
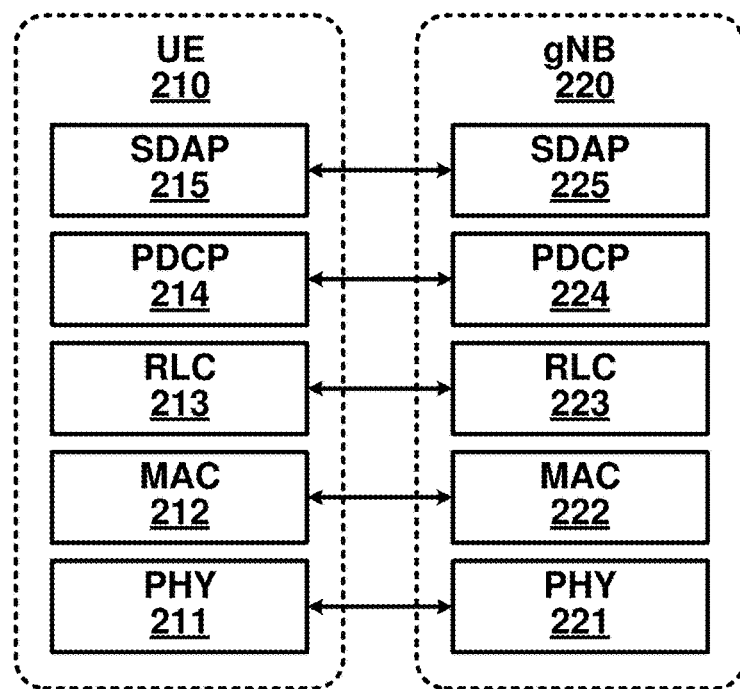
FIG. 2A and FIG. 2B respectively illustrate a New Radio (NR) user plane and control plane protocol stack.
Figure 2B:
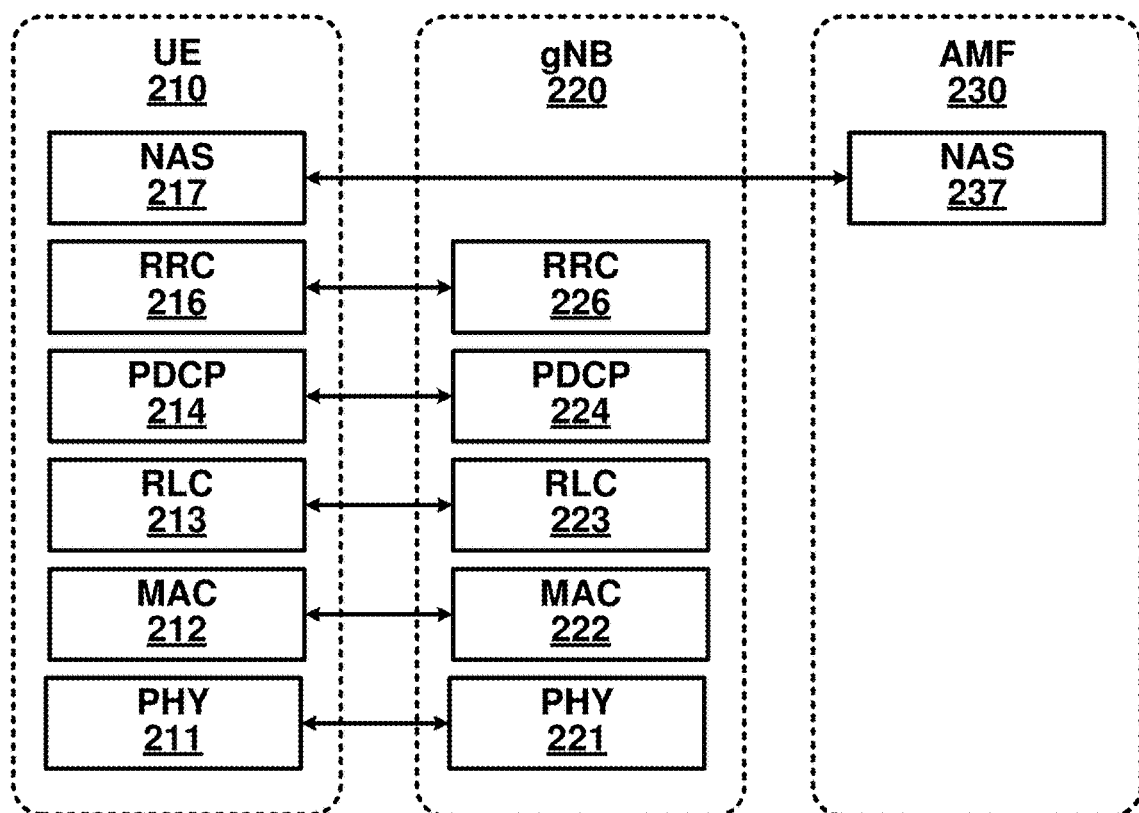

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
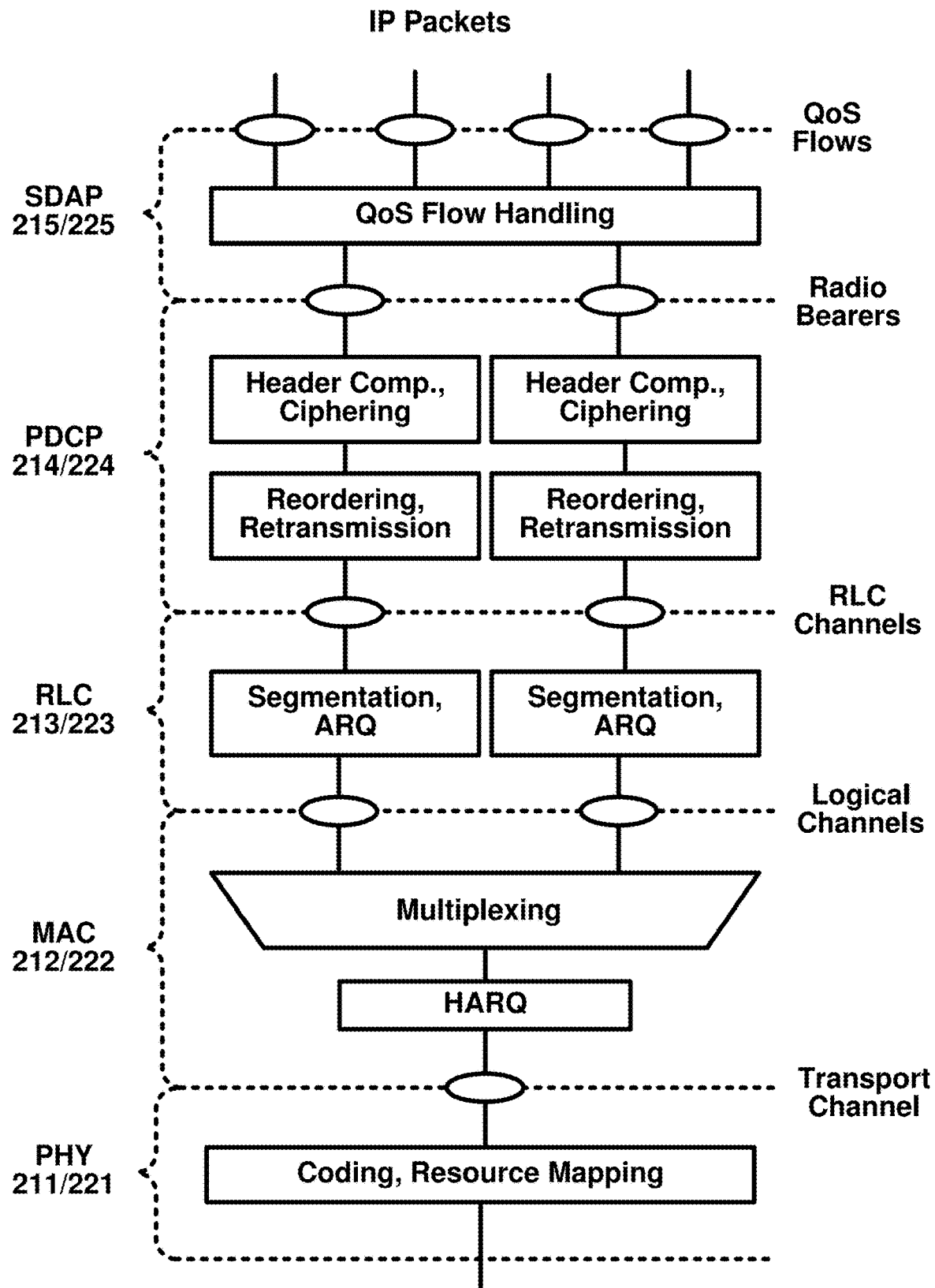
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
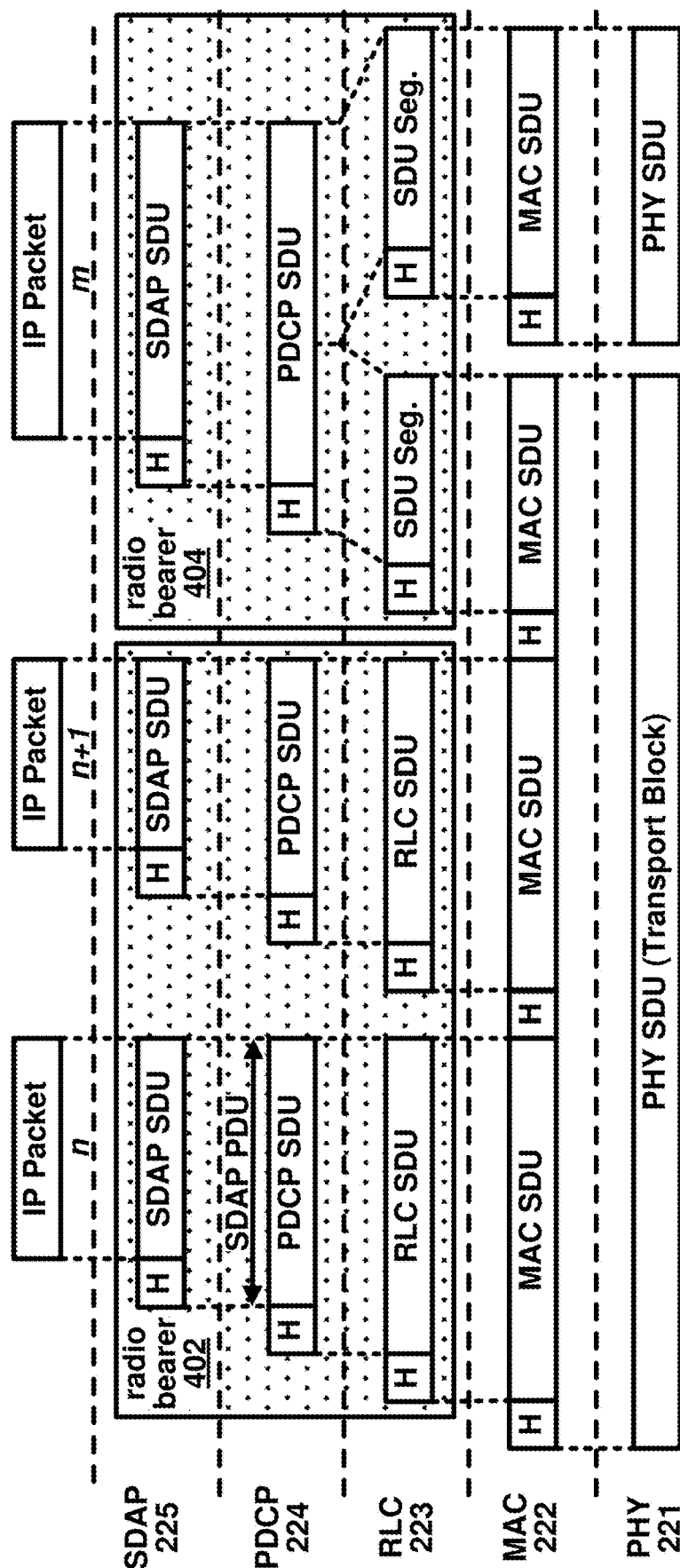
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
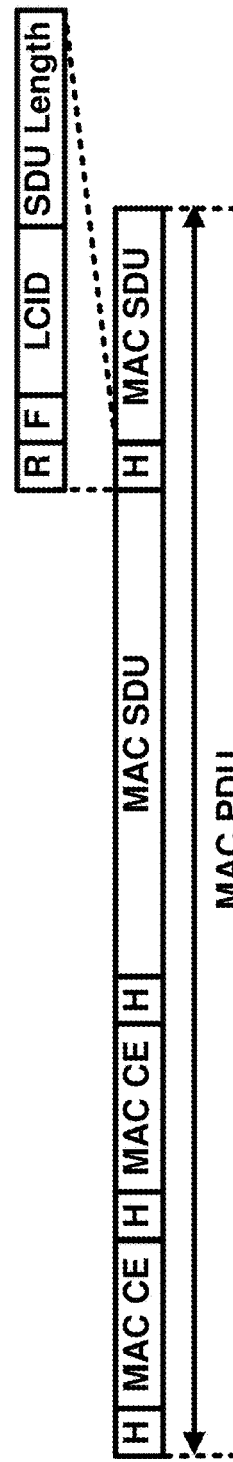
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
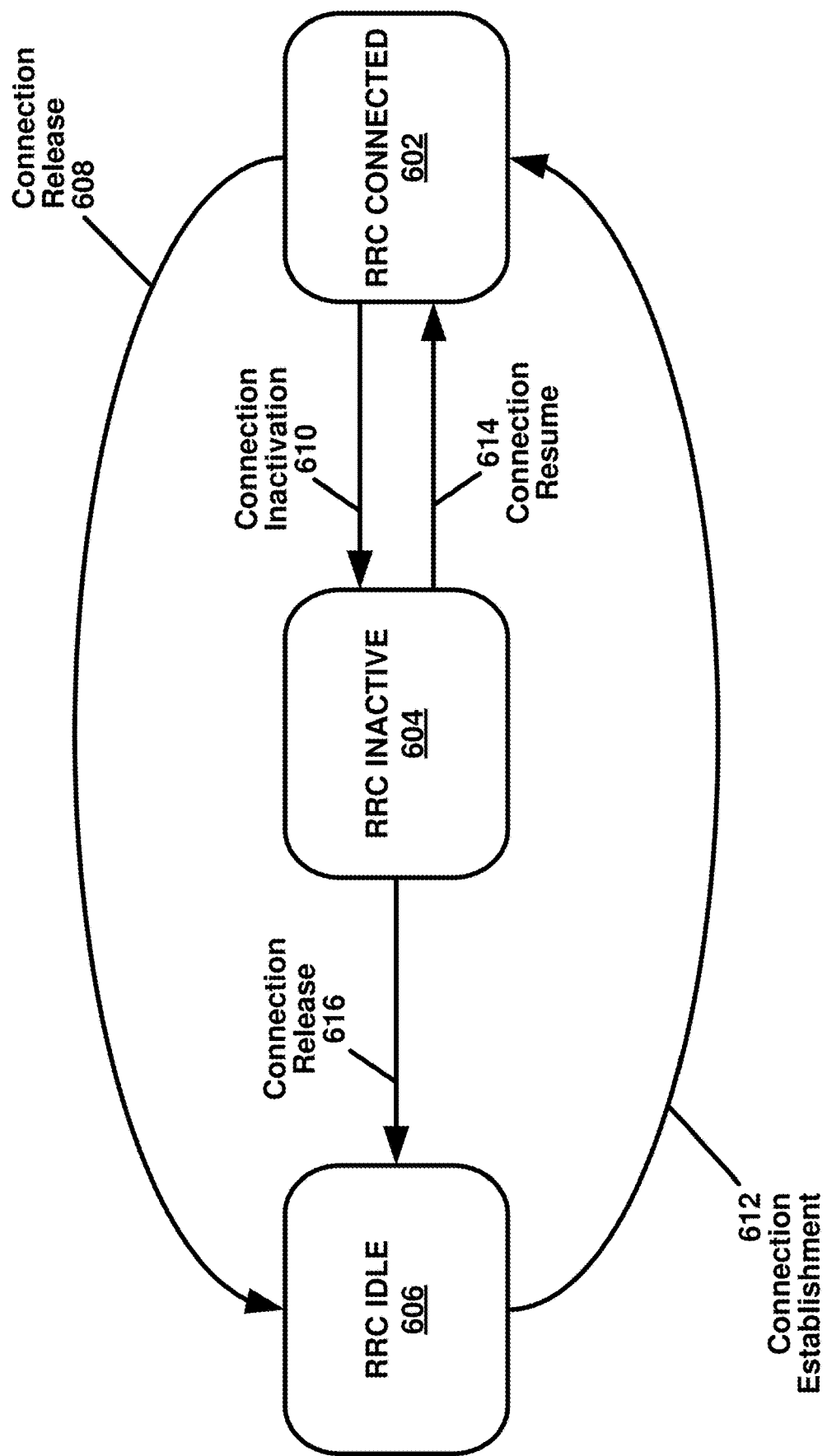
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection.

The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DUs). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
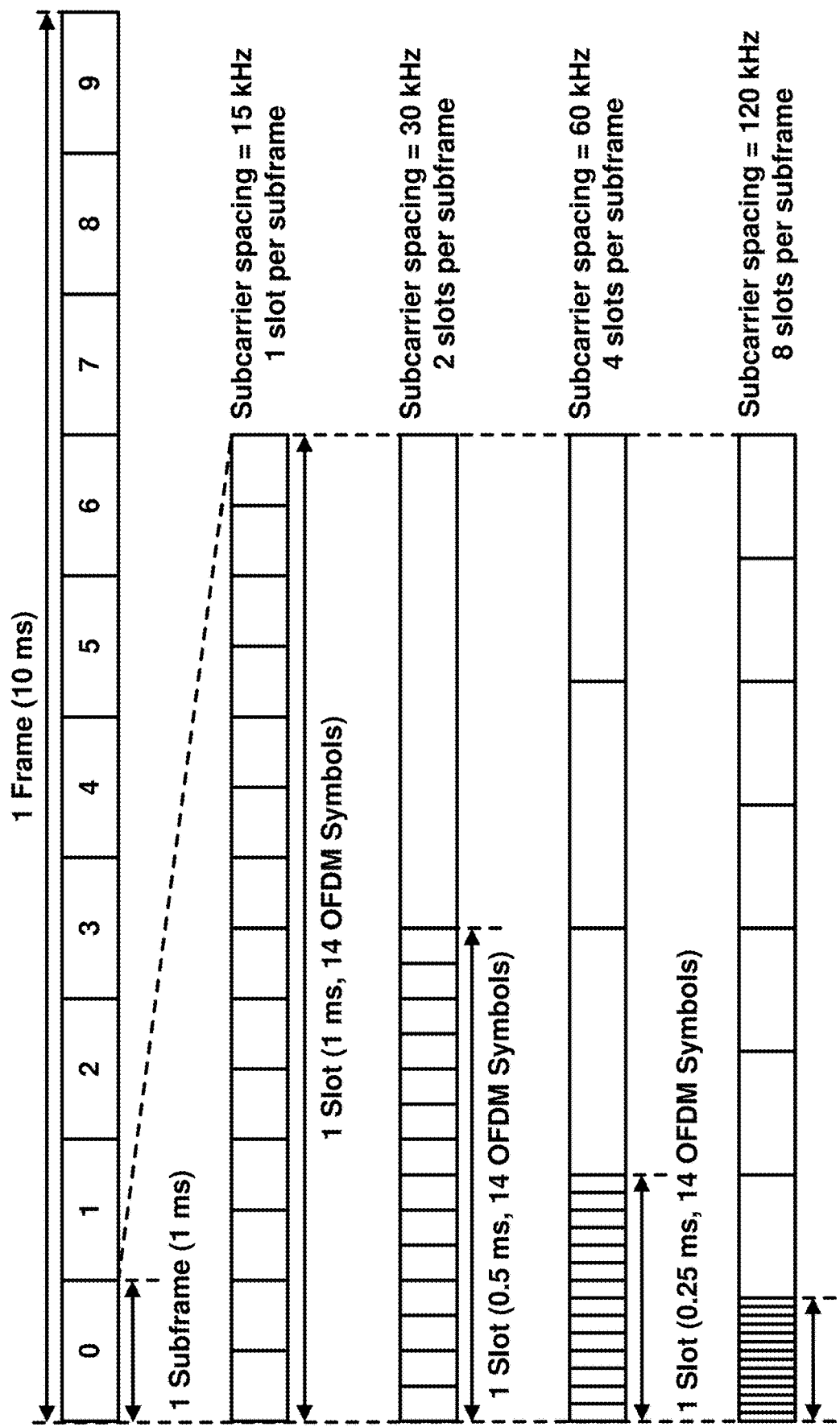
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
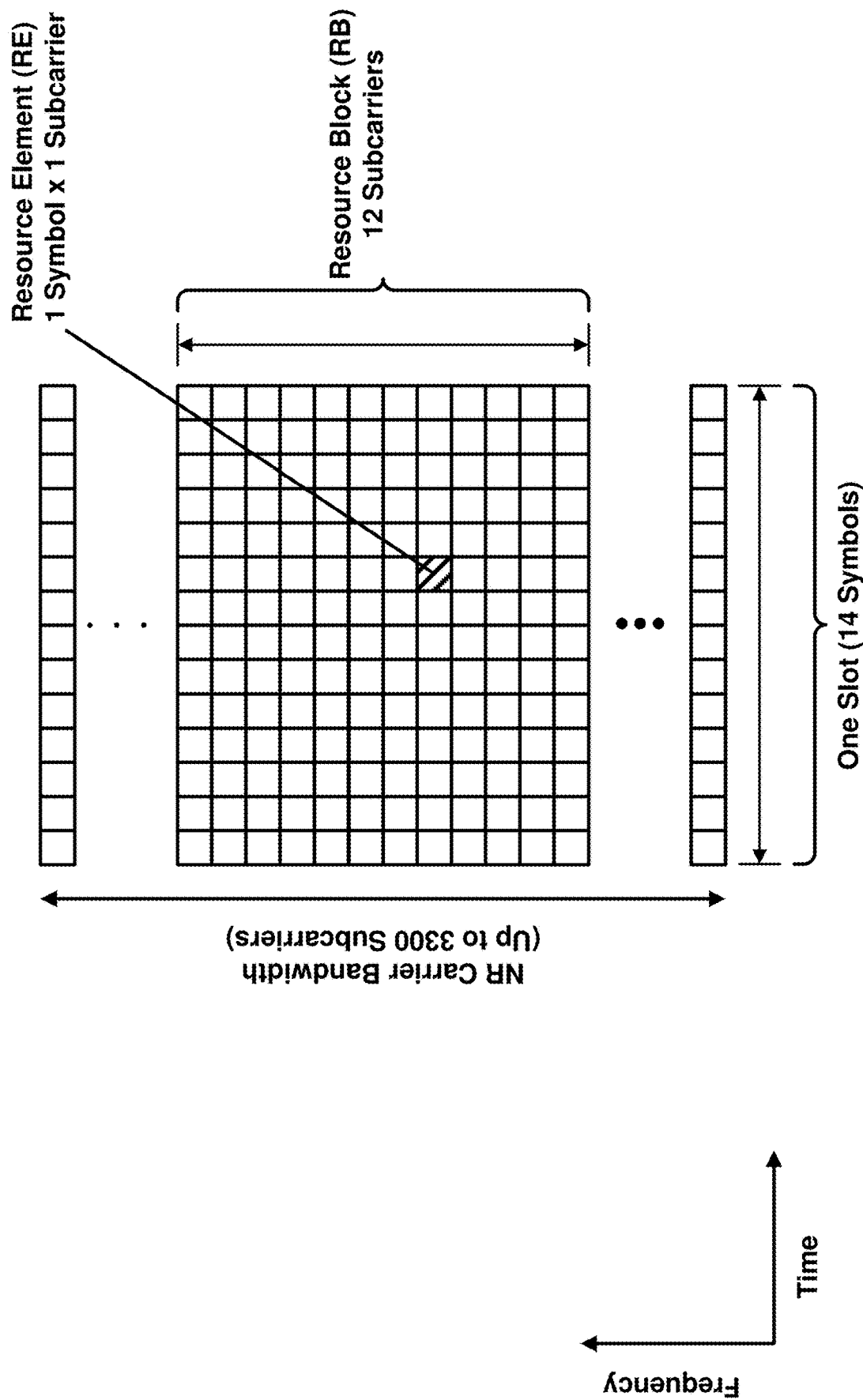
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
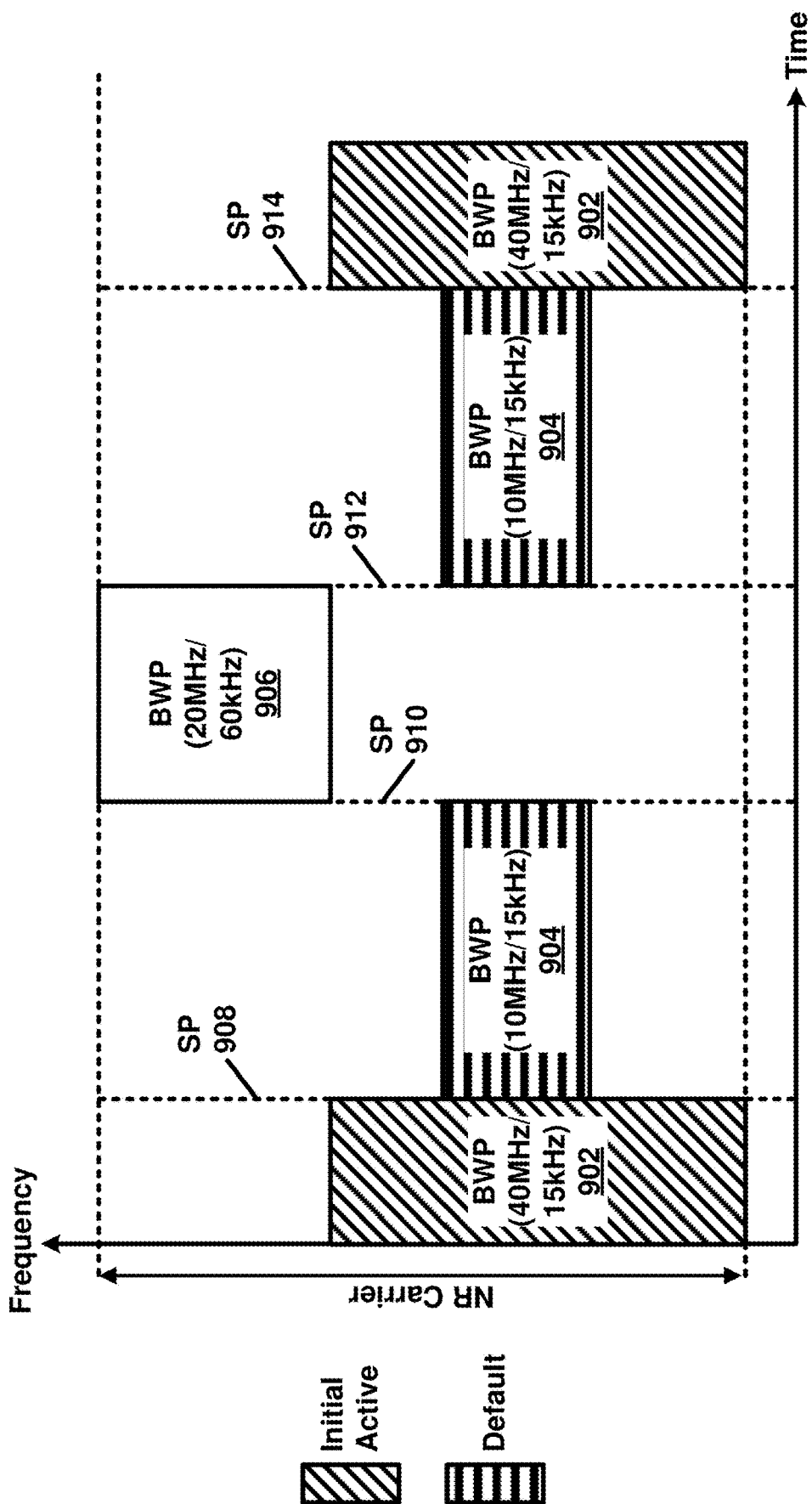
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
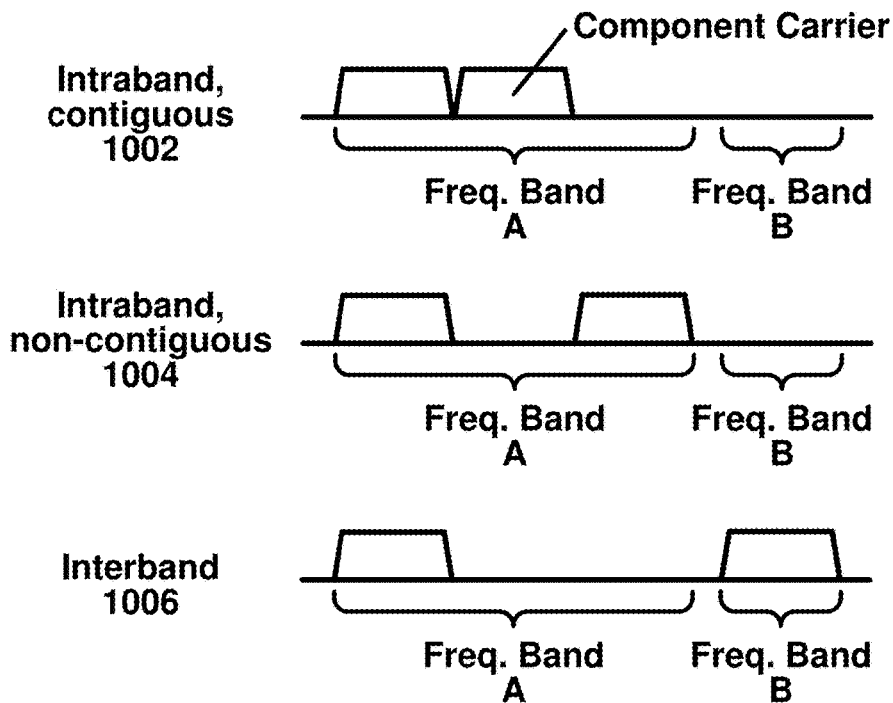
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
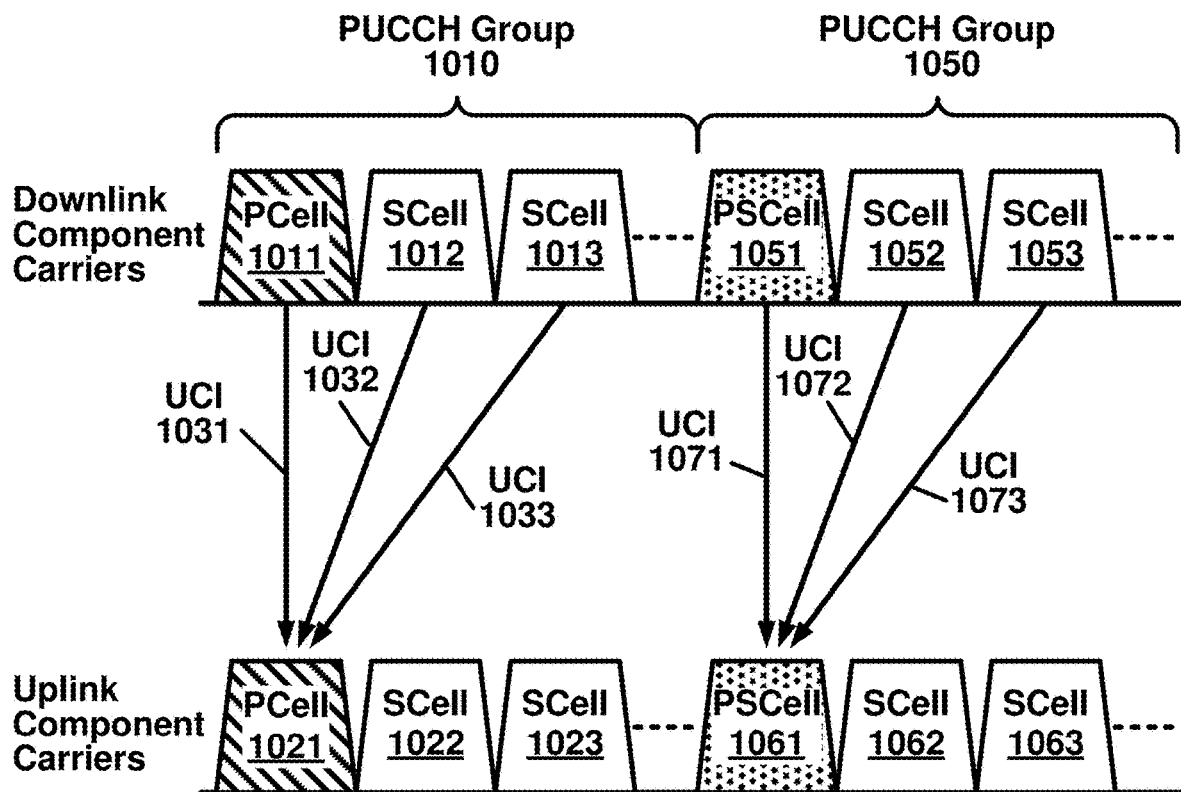
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
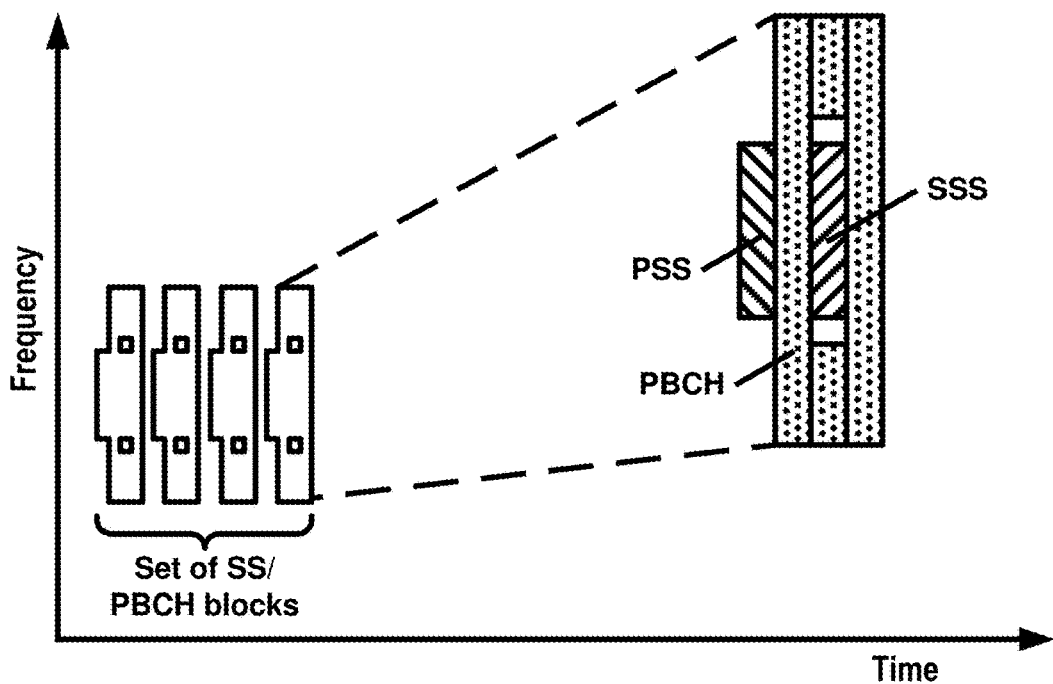
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
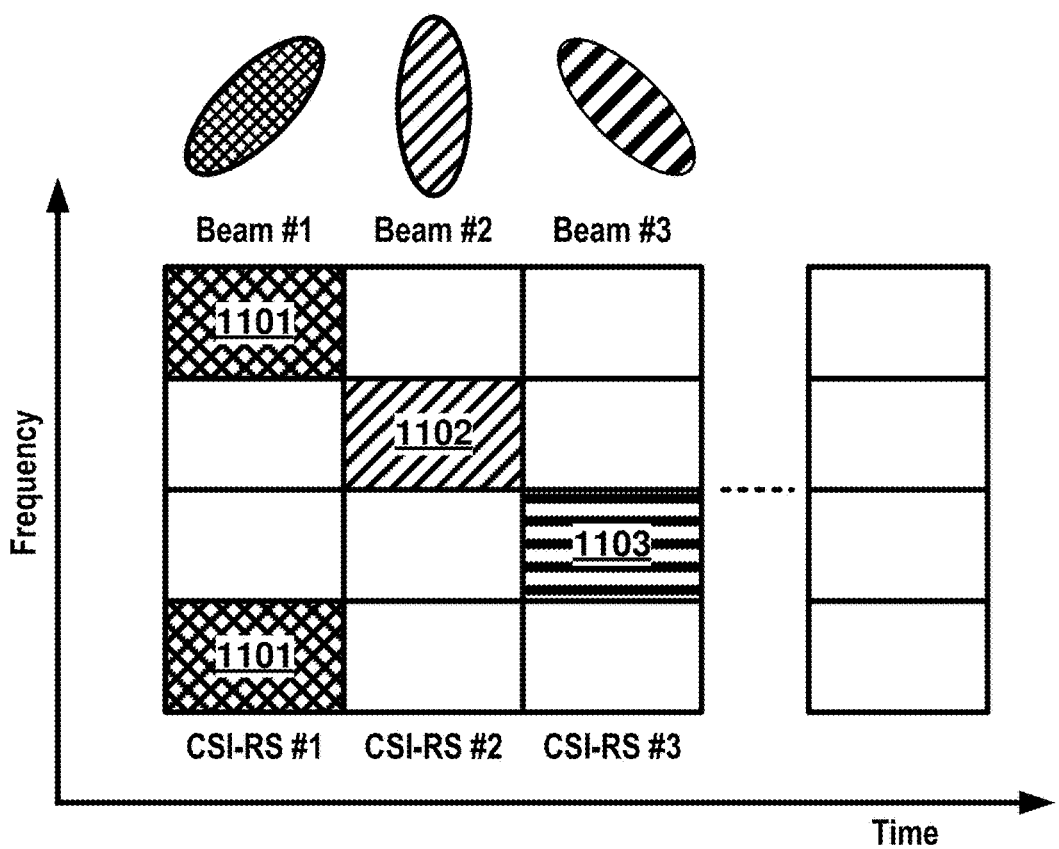
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
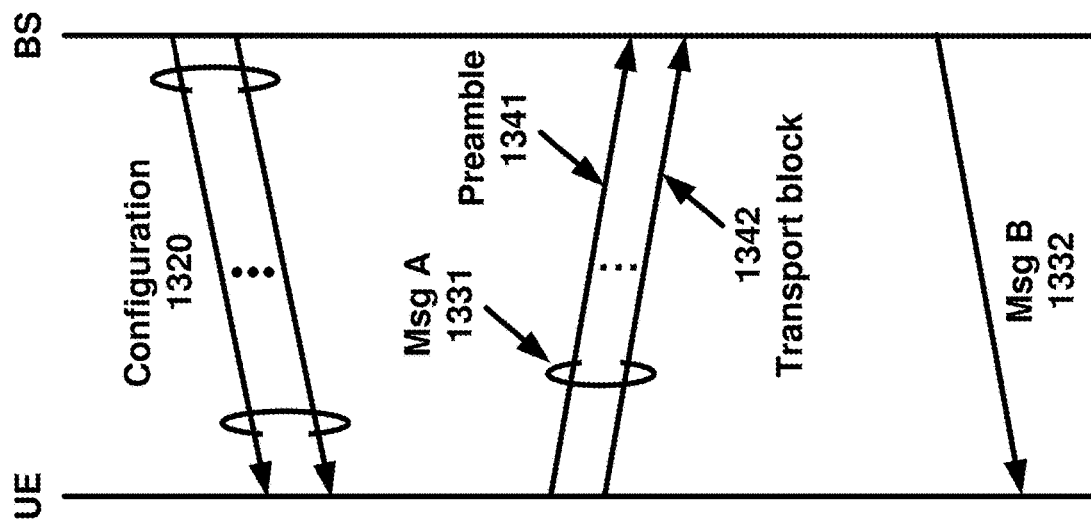
FIG. 13A, FIG. 13B, and FIG. 13C respectively illustrate a four-step contention-based random access procedure, a two-step contention-free random access procedure, and another two-step random access procedure.
Figure 13B:
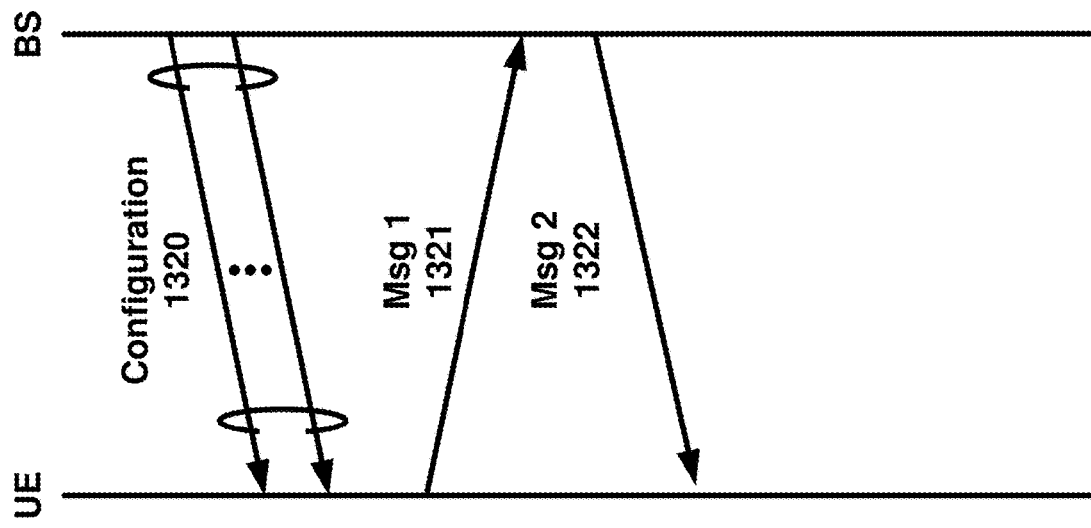
Figure 13A:
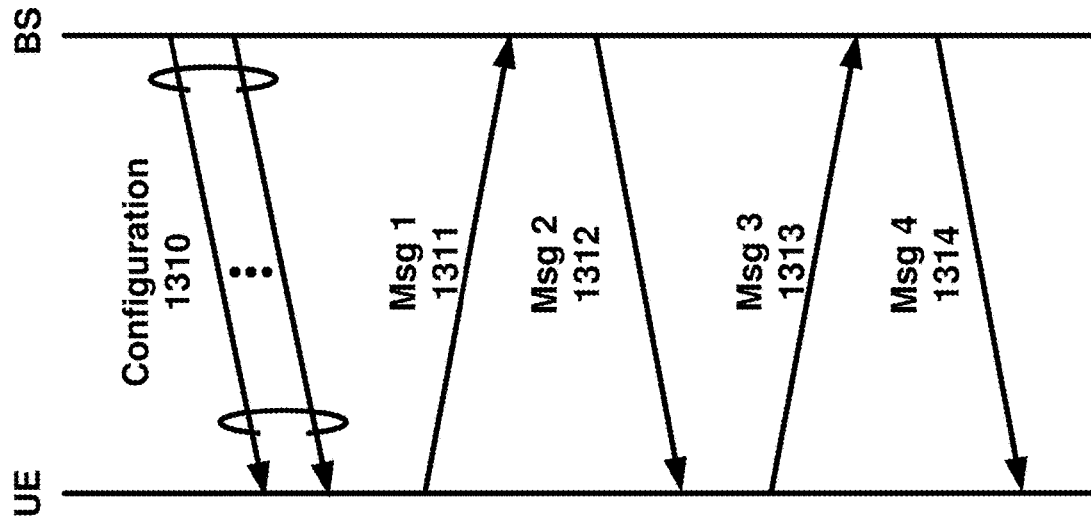

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs.

For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier). The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves.

Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC RNTI included in the Msg 2 1312, and/or any other suitable identifier).

The Msg 4 1314 may be received after or in response to the transmitting of the Msg 31313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 31313) may remain on the selected carrier. The UE may switch an uplink carrier during the random access procedure (e.g., between the Msg 1 1311 and the Msg 31313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
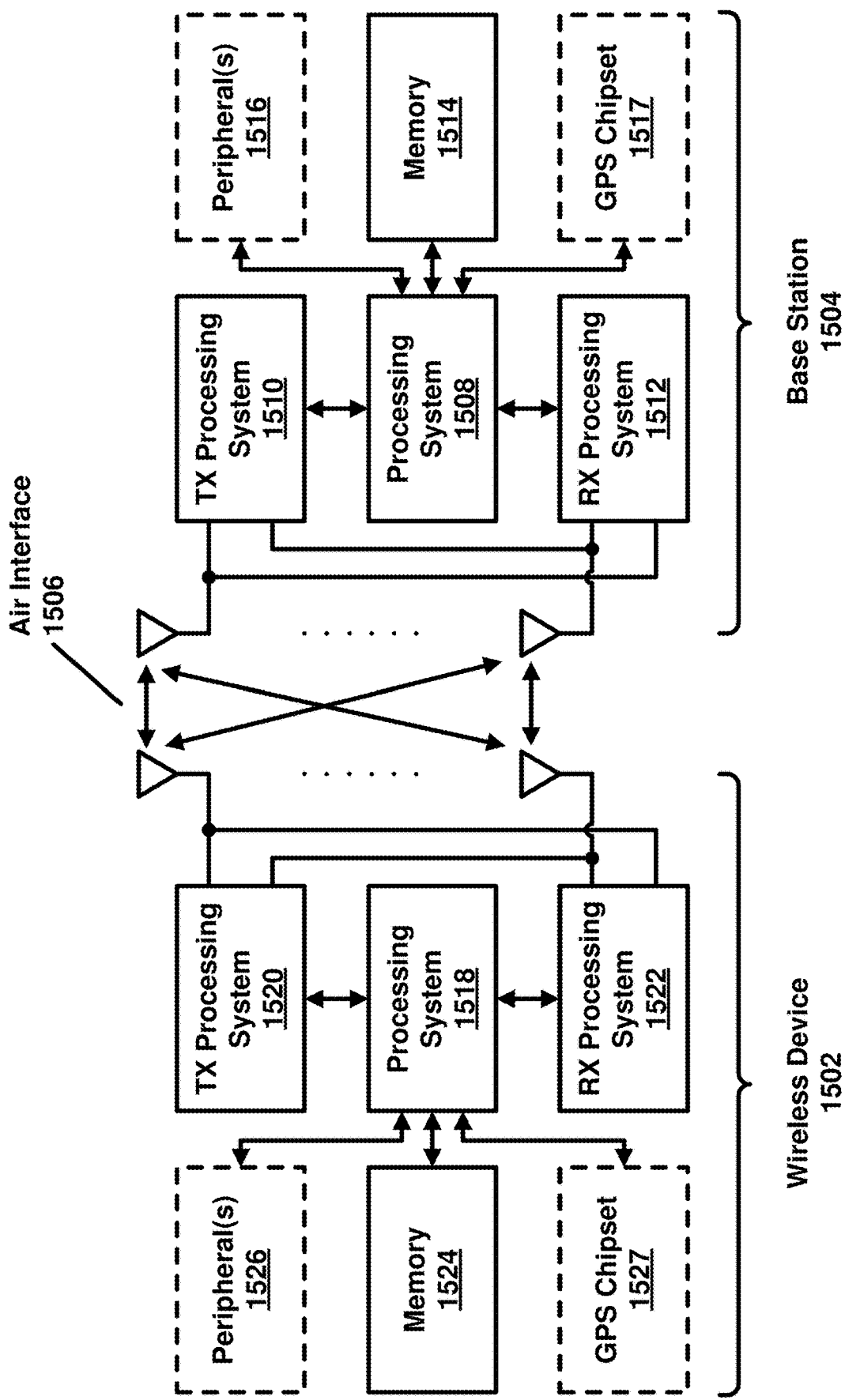
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward. A MAC CE may be a bit string that is byte aligned (e.g., a multiple of eight bits) in length. A MAC subheader may be a bit string that is byte aligned (e.g., a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one-bit length; an LCID field with a multi-bit length; and/or an L field with a multi-bit length.

Figure 17A:
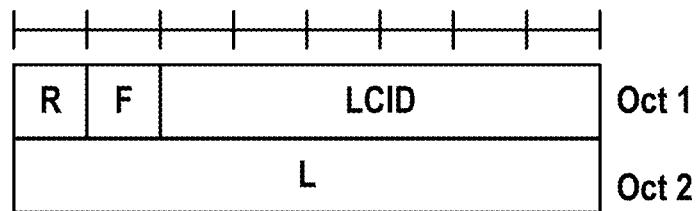
FIG. 17A, FIG. 17B and FIG. 17C show examples of MAC subheaders, according to some embodiments.
Figure 17B:
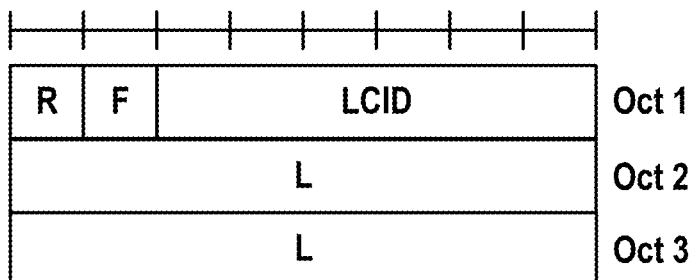
Figure 17C:
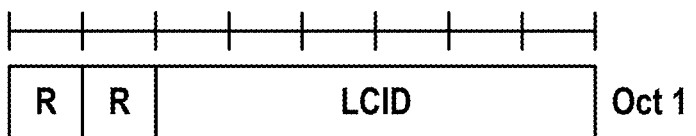

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader of FIG. 17B, the LCID field may be six bits in length, and the L field may be sixteen bits in length. When a MAC subheader corresponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader of FIG. 17C, the LCID field may be six bits in length, and the R field may be two bits in length.

Figure 18A:
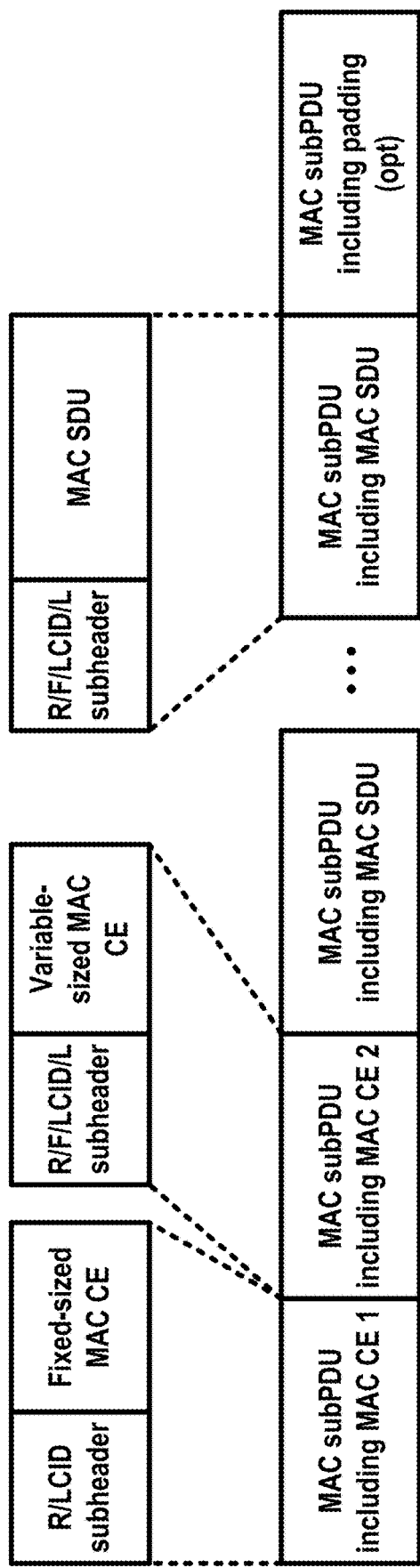
FIG. 18A shows an example of a DL MAC PDU, according to some embodiments.
Figure 18B:
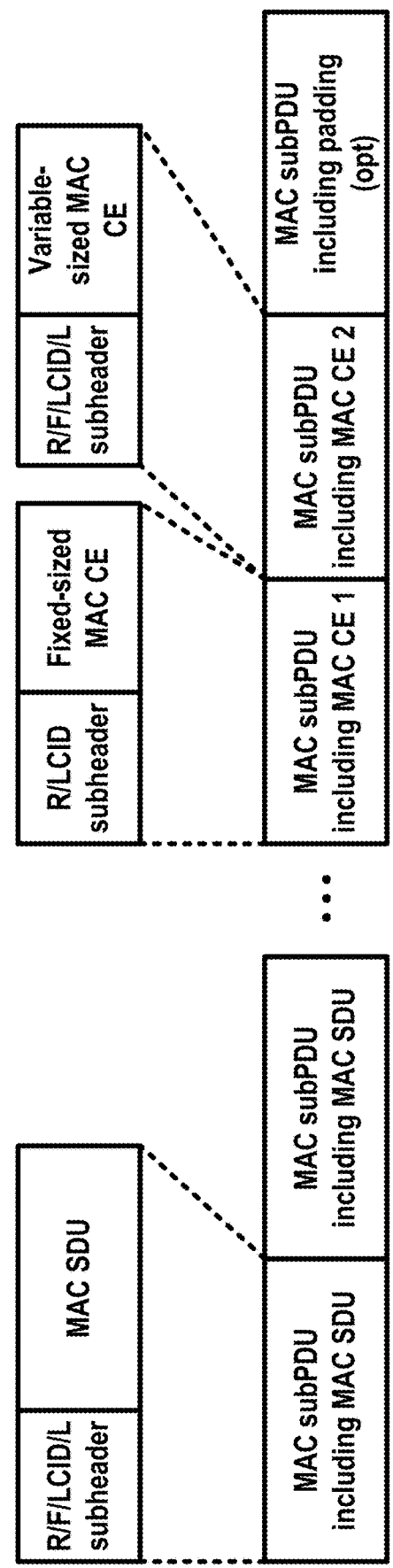
FIG. 18B shows an example of an UL MAC PDU, according to some embodiments.

FIG. 18A shows an example of a DL MAC PDU. Multiple MAC CEs, such as MAC CE 1 and 2, may be placed together. A MAC subPDU comprising a MAC CE may be placed before any MAC subPDU comprising a MAC SDU or a MAC subPDU comprising padding. FIG. 18B shows an example of a UL MAC PDU. Multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant".

A wireless device may activate/deactivate an SCell in response to receiving an SCell Activation/Deactivation MAC CE. In an example, a base station may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-) initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell. In an example, when an SCell is deactivated, if there is an ongoing random access procedure on the SCell, a wireless device may abort the ongoing random access procedure on the SCell.

Figures 21A, 21B:
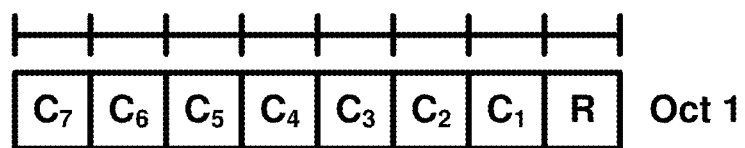
FIG. 21A and FIG. 21B show examples of SCell activation/deactivation MAC CE formats, according to some embodiments.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one). FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g. FDD), a base station and/or a wireless device may independently switch a DL BWP and an UL BWP. In unpaired spectrum (e.g. TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
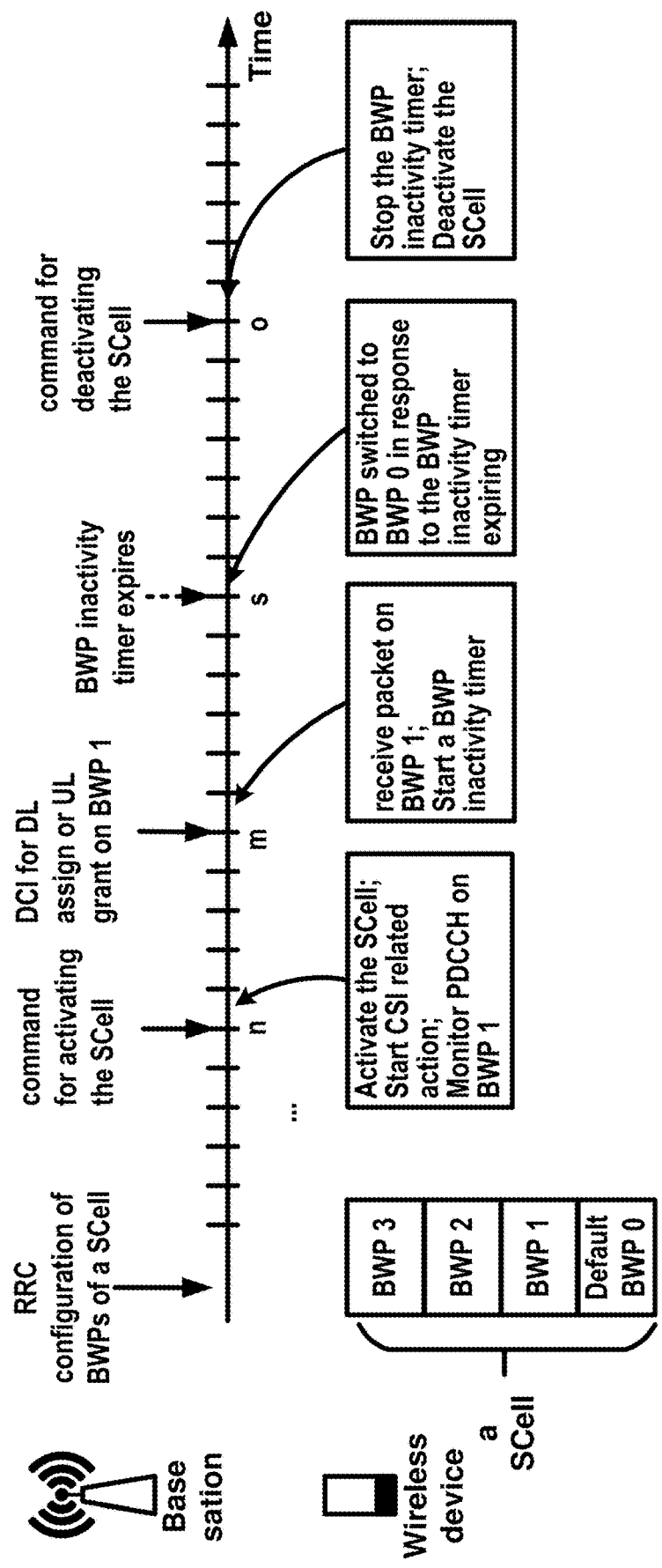
FIG. 22 shows an example of BWP activation/deactivation on a SCell, according to some embodiments.

FIG. 22 shows an example of BWP switching on an SCell. In an example, a wireless device may receive from a base station at least one RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a MAC CE to activate the SCell at nth slot. The wireless device may start a SCell deactivation timer (e.g., sCellDeactivationTimer), and start CSI related actions for the SCell, and/or start CSI related actions for the first active BWP of the SCell. The wireless device may start monitoring a PDCCH on BWP 1 in response to activating the SCell.

In an example, the wireless device may start restart a BWP inactivity timer (e.g., bwp-InactivityTimer) at $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the SCell and/or stop the BWP inactivity timer when the sCellDeactivationTimer expires.

In an example, a MAC entity may apply normal operations on an active BWP for an activated serving cell configured with a BWP comprising: transmitting on UL-SCH;

transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-InactivityTimer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

FIG. 23 shows an example of RRC message of a severing cell configuration (e.g., ServingCellConfig IE). The RRC message of a serving cell configuration may comprise at least one of: a TDD configuration parameter, an initial BWP ID, a plurality of DL BWP, a plurality of UL BWP, a first active BWP, a BWP inactivity timer, a SCell deactivation timer, and/or a cross carrier scheduling configuration information (e.g., CrossCarrierSchedulingConfig).

In an example, the configuration parameters may comprise one or more PDCCH configuration parameters of a first cell and one or more PDCCH configuration parameters of a second cell. One or more PDCCH configuration parameters may comprise: one or more control resource sets, one or more search spaces (configured in SearchSpace IE, as shown in FIG. 24), a downlink preemption indication, one or more PUSCH power control parameters, one or more PUCCH power control parameters, and/or one or more SRS power control parameters.

FIG. 24 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g. in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

FIG. 25 shows an example of configuration of a control resource set (CORESET). In an example, a base station may transmit to a wireless device one or more configuration parameters of a CORESET. The configuration parameters may comprise at least one of: a CORESET ID identifying the CORESET, a frequency resource indication, a time duration parameter indicating a number of symbols of the CORESET, a CCE-REG mapping type indicator (not shown in FIG. 25), a plurality of TCI states, an indicator indicating whether a TCI is present in a DCI, and the like. The frequency resource indication, comprising a number of bits (e.g., 45 bits), indicates frequency domain resources, each bit of the indication corresponding to a group of 6 RBs, with grouping starting from the first RB group in a BWP of a cell (e.g., SpCell, SCell). The first (left-most/most significant) bit corresponds to the first RB group in the BWP, and so on. A bit that is set to 1 indicates that an RB group, corresponding to the bit, belongs to the frequency domain resource of this CORESET. Bits corresponding to a group of RBs not fully contained in the BWP within which the CORESET is configured are set to zero.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type1-PDCCH CSS set configured by ra-SearchSpace in PDCCH-ConfigCommon for a DCI format with CRC scrambled by a RA-RNTI or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In an example, a wireless device determines a PDCCH monitoring occasion on an active DL BWP based on one or more PDCCH configuration parameters comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \bmod k_s = 0$. $N_{slot}^{frame,\mu}$ is a number of slots in a frame when numerology µ is configured. $o_s$ is a slot offset indicated in the PDCCH configuration parameters. $k_s$ is a PDCCH monitoring periodicity indicated in the PDCCH configuration parameters. The wireless device monitors PDCCH candidates for the search space set for $T_s$ consecutive slots, starting from slot $n_{s,f}^\mu$, and does not monitor PDCCH candidates for search space set s for the next $k_s-T_s$ consecutive slots. In an example, a USS at CCE aggregation level L∈{1, 2, 4, 8, 16} is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ as $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^\mu} = 0$ for any CSS; $Y_{p,n_{s,f}^\mu} = (A_p \cdot Y_{p,n_{s,f}^\mu - 1}) \bmod D$ for a USS, $Y_{p,-1} = n_{RNTI} \neq 0$, $A_p = 39827$ for p mod 3=0, $A_p = 39829$ for p mod 3=1, $A_p = 39839$ for p mod 3=2, and D=65537; i=0, . . . , L−1; $N_{CCE,p}$ is the number of CCEs, numbered from 0 to $N_{CCE,p} - 1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $n_{CI} = 0$; $m_{s,n_{CI}} = 0, \ldots, M_{s,n_{CI}}^{(L)} - 1$, where $M_{s,n_{CI}}^{(L)}$ is the number of PDCCH candidates the wireless device is configured to monitor for aggregation level L of a search space set s for a serving cell corresponding to $n_{CI}$; for any CSS, $M_{s,max}^{(L)} = M_{s,0}^{(L)}$; for a USS, $M_{s,max}^{(L)}$ is the maximum of $M_{s,n_{CI}}^{(L)}$ over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding.

In an example, a base station may transmit to a wireless device RRC messages (e.g., CSI-ReportConfig. IE) comprising configuration parameters of a CSI report. The wireless device, based on the configuration parameters, may transmit the CSI report to the base station.

FIG. 26 shows an example of contents of RRC message for CSI report configuration. As shown in FIG. 26, configuration parameters of a CSI report may comprise at least one of: a report configuration ID, a serving cell index, a report configuration type indicator, a report quantity indicator, and/or one or more report frequency configuration parameters. The configuration parameters may further comprise: an indication of a time restriction for channel and/or interference measurement, a codebook configuration, a group-based beam reporting indication, a CQI table and one or more CSI-RS resource configuration index. In an example, a CSI report may comprise one or more CSI quantities. The one or more CSI quantities may comprise channel quality indicator (CQI), precoding matrix indicator (PMI), CSI-RS resource indicator (CRI), SS/PBCH block resource indicator (SSBRI), layer indicator (LI), rank indicator (RI), layer 1 reference signal received power (L1-RSRP), and/or layer 1 signal to interference and noise ratio (L1-SINR). The report configuration type indicator may indicate whether the CSI report is a periodic report, a SP CSI report or aperiodic report. When the report configuration type indicator indicates the CSI report is periodic report, the CSI report is configured with report slot configuration and PUCCH resource. When the report configuration type indicator indicates the CSI report is semi-persistent report (on PUCCH), the CSI report is configured with report slot configuration and PUCCH resource. When the report configuration type indicator indicates the CSI report is semi-persistent report (on PUSCH), the CSI report is configured with report slot configuration, report slot offset configuration and open loop power control parameter (e.g., P0 and alpha). When the report configuration type indicator indicates the CSI report is aperiodic report, the CSI report is configured with report slot offset configuration. The report quantity indicator may indicate which one of CRI-RI-PMR-CQI, CRI-RI-LI, CRI-RI-L1-CQI, CRI-RI-CQI, CRI-RSRP, SSB-Index-RSRP and CRI-RI-LI-PMI-CQI the wireless device shall transmit in the CSI report. In an example, based on the configuration parameters of a CSI report, the wireless device may transmit one or more quantities of the CSI report indicating downlink channel quality of one or more RS transmitted from a base station to the wireless device.

FIG. 27 shows an example of CSI report and CSI-RS configuration framework. In an example, when a CSI-RS is configured as a periodic CSI-RS, CSI report associated with the CSI-RS may comprise at least one of: a periodic CSI without dynamic triggering/activation, a MAC CE activated SP CSI report on PUCCH, DCI triggered SP CSI report on PUSCH, and/or aperiodic CSI report triggered by a DCI. In an example, when a CSI-RS is SP CSI-RS, CSI report associated with the CSI-RS may comprise at least one of: a MAC CE activated SP CSI report on PUCCH, DCI triggered SP CSI report on PUSCH, and/or aperiodic CSI report triggered by a DCI. The CSI report may not be a periodic CSI report when the CSI-RS associated with the CSI report is a SP CSI-RS. In an example, when a CSI-RS is aperiodic CSI-RS, CSI report associated with the CSI-RS may comprise aperiodic CSI report triggered by a DCI. The CSI report may not be a periodic CSI report or a SP CSI report when the CSI-RS associated with the CSI report is aperiodic CSI-RS.

Figure 28:
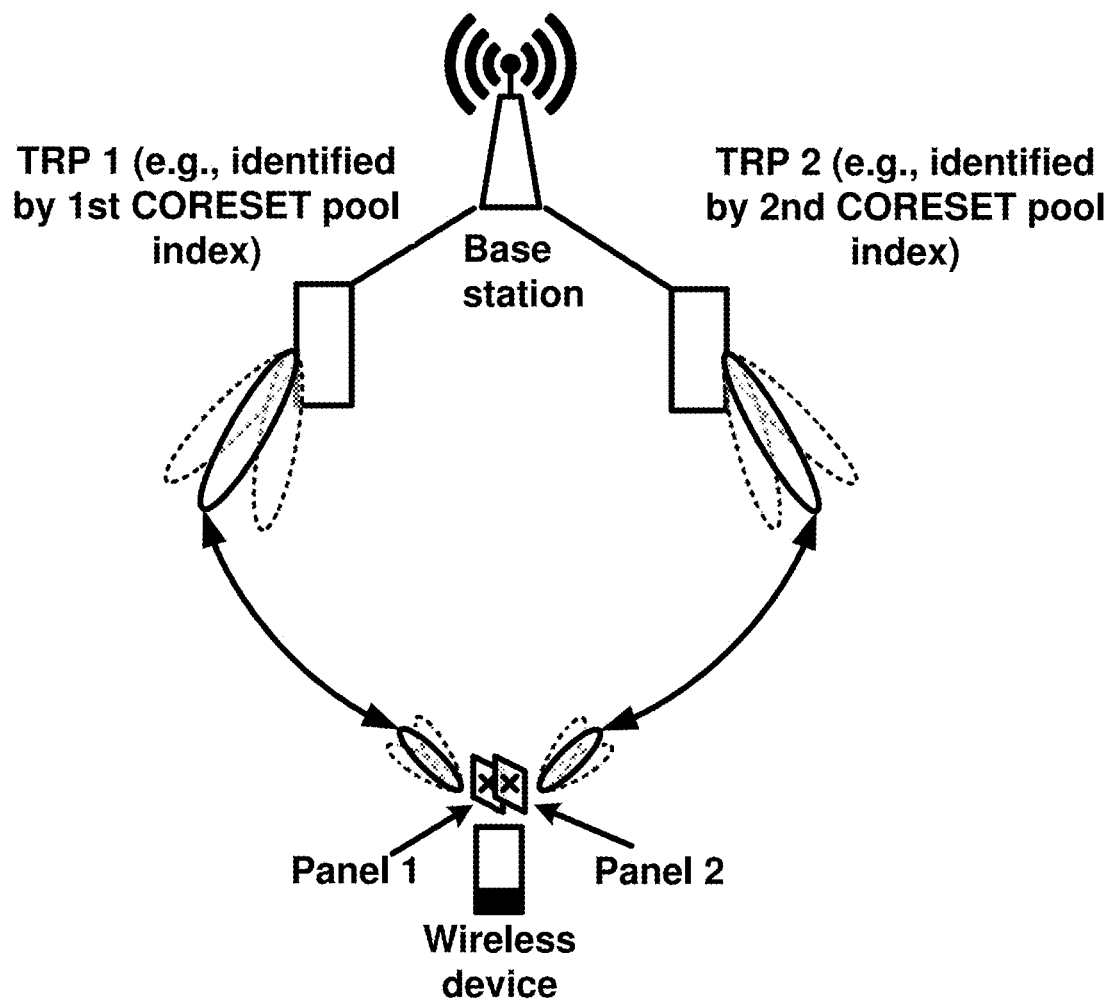
FIG. 28 shows an example of a wireless communication system with multiple TRPs/panels, according to some embodiments.

FIG. 28 shows an example of transmission and reception with multiple transmission reception points (TRPs) and/or multiple panels. In an example, a base station may be equipped with more than one TRP (e.g., TRP 1 and TRP 2). A wireless device may be equipped with more than one panel (e.g., Panel 1 and Panel 2). Transmission and reception with multiple TRPs and/or multiple panels may improve system throughput and/or transmission robustness for a wireless communication in a high frequency (e.g., above 6 GHz).

In an example, a TRP of multiple TRPs of the base station may be identified by at least one of: a TRP identifier (ID), a cell index, or a reference signal index. In an example, a TRP may be identified by a control resource set group (or pool) index (e.g., CORESETPoolIndex) of a control resource set group from which a DCI is transmitted from the base station on a control resource set. In an example, a TRP ID of a TRP may comprise a TRP index indicated in the DCI. In an example, a TRP ID of a TRP may comprise a TCI state group index of a TCI state group. A TCI state group may comprise at least one TCI state with which the wireless device receives the downlink TBs, or with which the base station transmits the downlink TBs.

In an example, a base station may be equipped with multiple TRPs. The base station may transmit to a wireless device one or more RRC messages comprising configuration parameters of a plurality of CORESETs on a cell (or a BWP of the cell). Each of the plurality of CORESETs may be identified with a CORESET index and may be associated with (or configured with) a CORESET pool (or group) index. One or more CORESETs, of the plurality of CORE-SETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

In an example, a wireless device may receive multiple PDCCHs scheduling fully/partially/non-overlapped PDSCHs in time and frequency domain, when the wireless device receives one or more RRC messages (e.g., PDCCH-Config IE) comprising a first CORESET pool index (e.g., CORESETPoolIndex) value and a second COESET pool index in ControlResourceSet IE. The wireless device may determine the reception of full/partially overlapped PDSCHs in time domain only when PDCCHs that schedule two PDSCHs are associated to different ControlResource-Sets having different values of CORESETPoolIndex.

In an example, a wireless device may assume (or determine) that the ControlResourceSet is assigned with CORE-SETPoolIndex as 0 for a ControlResourceSet without CORESETPoolIndex. When the wireless device is scheduled with full/partially/non-overlapped PDSCHs in time and frequency domain, scheduling information for receiving a PDSCH is indicated and carried only by the corresponding PDCCH. The wireless device is expected to be scheduled with the same active BWP and the same SCS. In an example, a wireless device can be scheduled with at most two codewords simultaneously when the wireless device is scheduled with full/partially overlapped PDSCHs in time and frequency domain.

In an example, when PDCCHs that schedule two PDSCHs are associated to different ControlResourceSets having different values of CORESETPoolIndex, the wireless device is allowed to the following operations: for any two HARQ process IDs in a given scheduled cell, if the wireless device is scheduled to start receiving a first PDSCH starting in symbol j by a PDCCH associated with a value of CORESETpoolIndex ending in symbol i, the wireless device can be scheduled to receive a PDSCH starting earlier than the end of the first PDSCH with a PDCCH associated with a different value of CORESETpoolIndex that ends later than symbol i; in a given scheduled cell, the wireless device can receive a first PDSCH in slot i, with the corresponding HARQ-ACK assigned to be transmitted in slot j, and a second PDSCH associated with a value of CORESET-poolIndex different from that of the first PDSCH starting later than the first PDSCH with its corresponding HARQ-ACK assigned to be transmitted in a slot before slot j.

In an example, if a wireless device configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the wireless device may assume that the DM-RS ports of PDSCH associated with a value of CORESET-PoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORE-SETPoolIndex as the PDCCH scheduling that PDSCH within the active BWP of the serving cell are monitored by the wireless device. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the wireless device may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

In an example, a wireless device, when configured with multiple panels, may determine to activate (or select) one of the multiple panels to receive downlink signals/channels transmitted from one of multiple TRPs of the base station. The activation/selection of one of the multiple panels may be based on receiving downlink signaling indicating the activation/selection or be automatically performed based on measuring downlink channel qualities of one or more reference signals transmitted from the base station.

In an example, the wireless device may apply a spatial domain filter to transmit from a panel of the multiple panels to one of the multiple TRPs of the base station, the panel and the spatial domain filter being determined based on at least one of: an UL TCI indication of a DCI, a panel ID in the DCI, a SRI indication of a DCI, a CORESET pool index of a CORESET for receiving the DCI, and the like.

In an example, when receiving a DCI indicating an uplink grant, the wireless device may determine a panel and a transmission beam (or spatial domain transmission filter) on the panel. The panel may be explicitly indicated by a panel ID comprised in the DCI. The panel may be implicitly indicated by an SRS ID (or an SRS group/pool index), a UL TCI pool index of a UL TCI for uplink transmission, and/or a CORESET pool index of a CORESET for receiving the DCI.

In an example, when operating on high frequency (e.g., above 6 GHz), a wireless device may use one of multiple panels to communicate with a base station. The wireless device shall comply with applicable radio frequency (RF) exposure requirements. The RF exposure requirements comprises one or more maximum permissible exposure (MPE) parameters associated with a frequency range. In an example, the one or more MPE parameters associated with a frequency range may comprise a maximum (or allowed) electric field strength value (E) in unit of V/m, a maximum (or allowed) magnetic field strength value (H) in unit of A/m, a maximum (or allowed) power density value (S) in unit of $mW/cm^2$, and/or an averaging time value in unit of minutes. In a frequency of FR2, RF exposure requirement is defined as an allowed power density averaged over $68/f^{1.05}$ minutes where f is a value of carrier frequency in unit of GHz.

Figure 29:
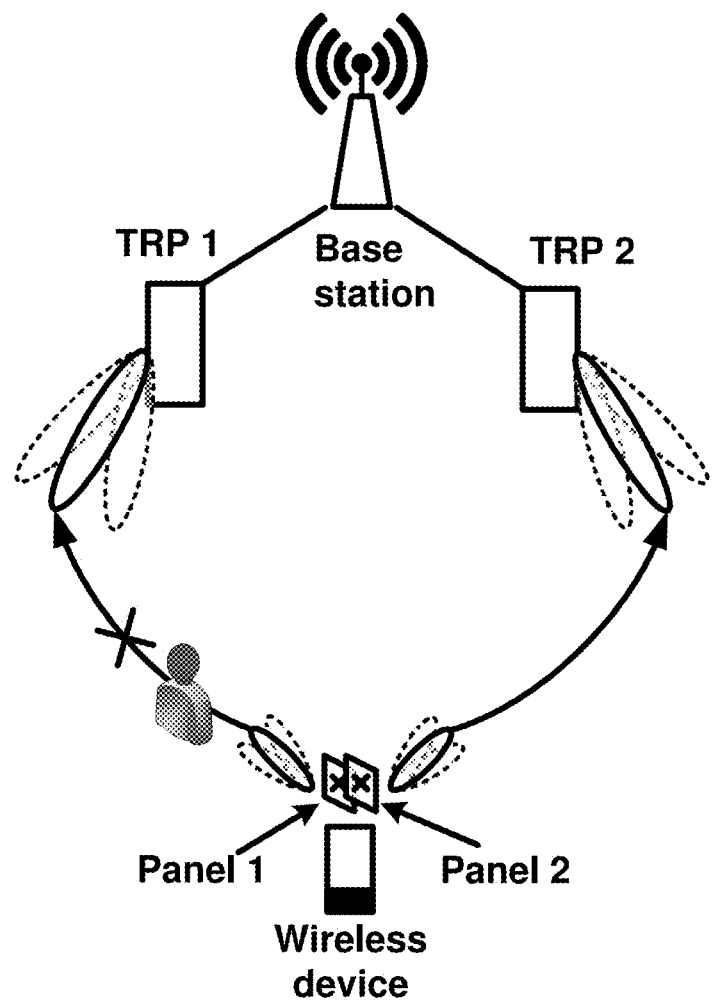
FIG. 29 shows an example of uplink coverage loss with multiple TRPs/panels, according to some embodiments.

FIG. 29 shows an example of uplink coverage loss due to MPE compliance when a wireless device is equipped with multiple panels. The wireless device may sense that there is a human body (or soft objects) in a proximity of a first panel (e.g., panel 1) of the wireless device. The human body is not in the proximity of a second panel (e.g., panel 2) of the wireless device. The wireless device may sense the proximity of human body by using variety of sensors installed in the wireless device. The wireless device may sense the proximity of human body based on indication of another wireless device or a base station. The wireless device, by complying with the RF exposure requirements based on the one or more MPE parameters on the operating frequency, may automatically reduce maximum transmission power via the first panel. Reducing maximum transmission power may result in uplink coverage loss. That may be a serious problem when the wireless device is in an edge of coverage of the base station. In an example, instead of reducing maximum transmission power via the first panel for complying with the RF exposure requirement, the wireless device may use a second panel (e.g., panel 2) of the wireless device to transmit uplink signals/channels to the base station, e.g., when the second panel is not in the proximity of the human body. Transmission via the second panel may relax a transmission power limitation for compliance of RF exposure requirement.

In an example, a wireless device, by complying with RF exposure requirements in case of proximity detection, may automatically reduce maximum output power for transmitting signals or channels to a base station. Amount of maximum output power reduction, due to complying with the RF exposure requirements, may be referred to as power management maximum power reduction (P-MPR). In an example, a wireless device shall apply P-MPR$_{f,c}$ for carrier f of serving cell c for the cases described below: a) ensuring compliance with applicable electromagnetic power density exposure requirements and addressing unwanted emissions/self-defense requirements in case of simultaneous transmissions on multiple RAT(s) for scenarios not in scope of 3GPP RAN specifications; b) ensuring compliance with applicable electromagnetic power density exposure requirements in case of proximity detection is used to address such requirements that require a lower maximum output power. For wireless device conformance testing P-MPR$_{f,c}$ shall be 0 dB.

In an example, a wireless device may reduce maximum output power due to modulation orders, transmit bandwidth configuration, waveform type and narrow allocations. Amount of maximum output power reduction, due to implementing modulation orders, bandwidth and waveform type etc., may be referred to as maximum power reduction (MPR). In the above example, the cause of MPR is different from the cause of P-MPR.

In an example, a wireless device may be signaled by a base station with additional emission requirements. Each additional emission requirement may be associated with a unique network signaling (NS) value indicated in RRC signaling by an NR frequency band number of the applicable operating band and an associated value in the field additionalSpectrumEmission. The wireless device, to meet these additional requirements, may be allowed for additional power reduction, which is referred to as additional maximum power reduction (A-MPR).

In an example, a wireless device may configure its maximum output power ($P_{CMAX,f,c}$) for carrier f of a serving cell c based on a P-MPR, a MPR, a A-MPR, a power value of a power class of the wireless device, and/or a maximum Effective Isotropic Radiated Power (EIRP$_{max}$) of the wireless device. $P_{CMAX,f,c}$ may be defined as that available to the reference point of a given transmitter branch that corresponds to a reference point of a higher-layer filtered RSRP measurement. The wireless device may set $P_{CMAX,f,c}$ for carrier f of a serving cell c such that corresponding measured peak EIRP $P_{UMAX,f,c}$ is within the following bounds $P_{Powerclass}$−MAX(MAX(MPR$_{f,c}$, A−MPR$_{f,c}$)+ΔMB$_{P,n}$, P−MPR$_{f,c}$)−MAX{T(MAX(MPR$_{f,c}$, A−MPR$_{f,c}$)), T(PMPR$_{f,c}$)}≤$P_{UMAX,f,c}$≤EIRP$_{max}$, while the corresponding measured total radiated power $P_{TMAX,f,c}$ is bounded by $P_{TMAX,f,c}$≤TRP$_{max}$. In an example, Powerclass P is a power value corresponding to a power class of the wireless device, EIRP$_{max}$ is applicable maximum EIRP, MPR$_{f,c}$ is MPR applicable for modulation orders, bandwidth and waveform types etc. related to frequency f on cell c, A-MPR$_{f,c}$ is additional maximum power reduction indicated by the base station, ΔMB$_{P,n}$ is a peak EIRP relaxation and TRP$_{max}$ is maximum total radiated power for the power class of the wireless device.

In an example, in additional to power reduction mechanism (e.g., MPR, A-MPR and/or P-MPR), a wireless device may transmit one or more RRC messages indicating a UE capability parameter (e.g., maxUplinkDutyCycle-FR2) to facilitate electromagnetic power density exposure requirements. If a field of wireless device capability (e.g., maxUplinkDutyCycle-FR2) is present and the percentage of uplink symbols transmitted within any 1 second evaluation period is larger than maxUplinkDutyCycle-FR2, the wireless device follows the uplink scheduling and can apply P-MPR$_{f,c}$. If the field of wireless device capability maxUplinkDutyCycle-FR2 is absent, the compliance to electromagnetic power density exposure requirements are ensured by means of scaling down the power density or by other means.

In an example, a wireless device may reduce uplink transmission power, in order to comply with RF exposure requirements when detecting a human body in the proximity of the wireless device. Reducing uplink transmission power may result in uplink coverage loss. In order to avoid uplink coverage loss due to complying with RF exposure requirements, the wireless device may indicate to a base station that a proximity of a first active panel is detected and/or a proximity of a second panel is not detected. In response to receiving the indication, the base station may transmit a command indicating active panel switching from the first panel to the second panel. In an example, the wireless device may transmit an uplink beam/power report (e.g., uplink power state report for a beam or a panel) comprising the indication of the proximity detection. The wireless device may transmit the uplink beam/power report aperiodically or periodically.

In an example, the wireless device may be equipped with multiple panels comprising a first panel and a second panel. The first panel and the second panel are both activated. The wireless device may transmit uplink signals via the first panel during a time period when the first panel is activated. The wireless device may transmit uplink signals via the second panel during a time period when the second panel is activated.

In an example, the wireless device may apply a spatial domain filter to transmit from a panel of the multiple panels to one of the multiple TRPs of the base station, the panel and the spatial domain filter being determined based on at least one of: an UL TCI indication of a DCI, a panel ID in the DCI, a SRI indication of a DCI, a CORESET pool index of a CORESET for receiving the DCI, and the like.

In an example, when receiving a DCI indicating an uplink grant, the wireless device may determine a panel and a transmission beam (or spatial domain transmission filter) on the panel. The panel may be explicitly indicated by a panel ID comprised in the DCI. The panel may be implicitly indicated by an SRS ID (or an SRS group/pool index), a UL TCI pool index of a UL TCI for uplink transmission, and/or a CORESET pool index of a CORESET for receiving the DCI.

Figure 30:
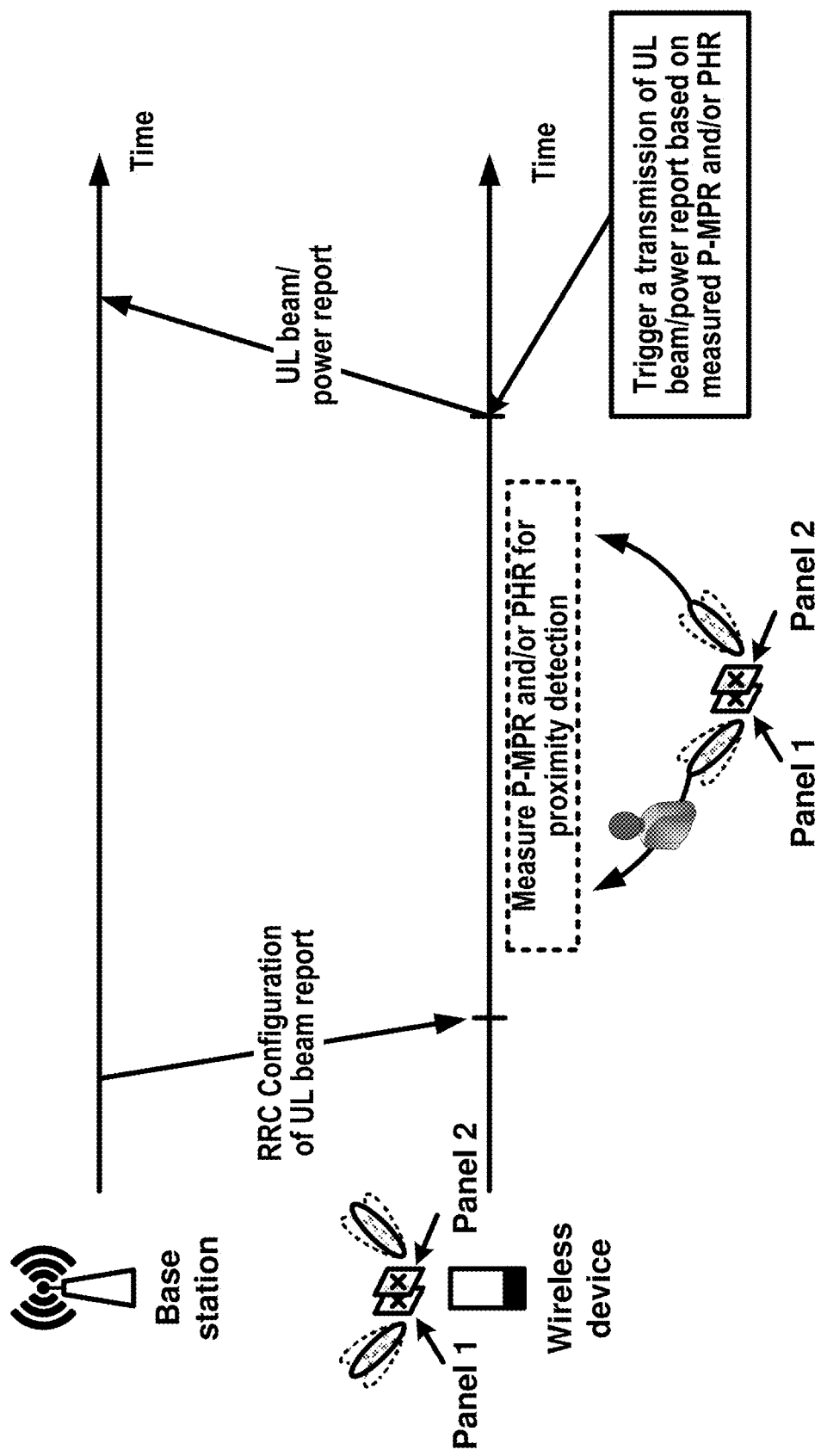
FIG. 30 shows an example of aperiodic uplink beam/power report for multiple panels, according to some embodiments.

FIG. 30 shows an example of aperiodic transmission of uplink beam/power report comprising indication of proximity detection (or an MPE detection). The uplink beam/power report may be different from a CSI report. In an example, a base station may transmit to a wireless device one or more RRC messages comprising first configuration parameters of uplink beam/power report and second configuration parameters of channel state information (CSI) report. The second configuration parameters of CSI report may be implemented based on examples of FIG. 26 and/or FIG. 27.

In an example, the wireless device may transmit uplink beam/power report indicating that a proximity with a first panel of a plurality of panels is detected by the wireless device and/or the proximity is not detected on at least a second panel of the plurality of panels. Different from the CSI report, the uplink beam/power report may comprise at least one of: a first index identifying the first panel, a second index identifying the at least second panel, a first P-MPR value for transmission via the first panel, a second P-MPR value for transmission via the second panel, a first PHR value for transmission via the first panel, and/or a second PHR value for transmission via the second panel, a first maximum output power for transmission via the first panel, and/or a second maximum output power for transmission via the second panel.

In an example, a P-MPR may be a transmission power reduction value for uplink transmission via an active panel of a plurality of panels. The wireless device may determine the P-MPR based on complying with RF exposure requirements due to proximity detection.

In an example, a PHR transmitted in the uplink beam/power report via a PUCCH resource may be referred to as a L1-PHR. The wireless device may determine a value of the L1-PHR based on at least one of: L1-RSRP of a pathloss RS associated with a panel, a P-MPR of the panel, and/or other power parameters.

In an example, a CSI report may be redefined to comprise not only the downlink CSI report, but also uplink beam/power report (e.g., indicating proximity detection and/or uplink coverage loss). In this case, a base station may transmit to a wireless device one or more RRC messages comprising configuration parameters of CSI report comprising at least one of: CQI, PMI, CRI, SSBRI, LI, RI, L1-RSRP, L1-SINR, P-MPR and/or L1-PHR. A report quantity type of the configuration parameters of the CSI report may indicate which one of CQI, PMI, CRI, SSBRI, LI, RI, L1-RSRP, L1-SINR, P-MPR and/or L1-PHR shall be transmitted in the CSI report.

As shown in FIG. 30, the wireless device may perform proximity detection on the plurality of panels. The wireless device may perform proximity detection based on P-MPR and/or PHR (or L1-PHR). The wireless device may trigger, based on the P-MPR and the PHR, a transmission of an uplink beam/power report comprising indication of proximity detection. The wireless device may trigger the uplink transmission of the uplink beam/power report by implementing examples of FIG. 31. The wireless device may transmit the uplink beam/power report via an uplink channel (e.g., PUCCH/PUSCH) based on the first configuration parameters of the uplink beam/power report. The wireless device may transmit the uplink beam/power report with a report format by implementing examples of FIG. 34, FIG. 35 and/or FIG. 36.

FIG. 31 shows examples of uplink beam/power report triggering when a wireless device is equipped with multiple panels. In an example, the wireless device may be equipped with multiple panels comprising a first panel and a second panel. The first panel and the second panel are both activated. The wireless device may transmit uplink signals via a panel during a time period when the panel is activated.

As shown in FIG. 31, a wireless device may trigger an uplink beam/power report (e.g., comprising indication of a proximity detection or an MPE detection or an uplink coverage loss) based on uplink duty cycle(s) of the first panel and the second panel. In an example, an uplink duty cycle of a cell may be defined as percentage of uplink symbols transmitted via the cell within an evaluation period (e.g., a millisecond, or a second). When the wireless device switches an uplink transmission between the first panel and the second panel, uplink duty cycle may be evaluated per panel. A first uplink duty cycle of the first panel may be defined as percentage of uplink symbols transmitted via the first panel within an evaluation period. A second uplink duty cycle of the second panel may be defined as percentage of uplink symbols transmitted via the second panel within the evaluation period.

In an example, a wireless device may determine whether to apply a P-MPR value based on a joint evaluation of a first uplink duty cycle of the first panel and a second uplink duty cycle of the second panel. The first uplink duty cycle and the second uplink duty cycle may be evaluated in a same evaluation period. The wireless device may determine to apply the P-MPR value based on a summation of the first uplink duty cycle and the second uplink duty cycle being greater than a threshold (e.g., maxUplinkDutyCycle-PC2-FR1, maxUplinkDutyCycle-FR2, and the like). The wireless device may determine to apply the P-MPR value based on one of the first uplink duty cycle and the second uplink duty cycle being greater than the threshold. The one may be a smaller one or a bigger one of the first uplink duty cycle and the second uplink duty cycle by configuration, or predefined.

In an example, the wireless device may trigger an uplink beam/power report via a PUCCH (or a PUSCH) in response to the first uplink duty cycle evaluated on the first panel (within an evaluation period) being higher than a threshold and/or the second uplink duty cycle evaluated on the second panel (within the evaluation period) being less than the threshold. The threshold may be a parameter determined based on the wireless device's capability.

In an example, the wireless device may transmit to the base station one or more UE capability RRC messages (e.g., UECapabilityInformation IE) comprising the threshold. The wireless device may transmit the capability RRC messages in response to receiving from the base station RRC messages for capability enquiry (e.g., UECapabilityEnquiry IE). The threshold may be indicated by maxUplinkDutyCycle in UECapabilityInformation. In an example, maxUplinkDutyCycle may indicate a maximum percentage of symbols during an evaluation period (e.g., 1 s) that can be scheduled for uplink transmission so as to ensure compliance with applicable electromagnetic power density exposure requirements provided by regulatory bodies.

In an example, when the first uplink duty cycle of the first panel is greater than the threshold, the wireless device may determine it's possible that an uplink coverage loss may occur on the first panel due to application of P-MPR on the first panel (e.g., in case of proximity detection near (or in the direction of) the first panel). In an example, when the second uplink duty cycle of the second panel is less than the threshold, the wireless device may determine it's less possible that an uplink coverage loss may occur on the second panel than on the first panel. In an example, the wireless device may detect (or predict) an uplink coverage loss based on the first uplink duty cycle evaluated on the first panel being higher than the threshold and/or the second uplink duty cycle evaluated on the second panel (within the evaluation period) being less than the threshold. When the wireless device determines the first uplink duty cycle evaluated on the first panel is higher than the threshold and/or the second uplink duty cycle evaluated on the second panel (within the evaluation period) is less than the threshold and/or based on a proximity detection on the first panel, the wireless device may trigger an uplink beam/power report comprising at least one of: a first index identifying the first panel, the first uplink duty cycle, a second index identifying the second panel, and/or the second uplink duty cycle. The uplink beam/power report may indicate an uplink coverage loss is occurring on the first panel.

As shown in FIG. 31, a wireless device may trigger an uplink beam/power report (e.g., comprising indication of a proximity detection or an MPE detection or an uplink coverage loss) based on a first P-MPR of the first panel and a second P-MPR of the second panel. The wireless device may determine P-MPR based on at least one of two requirements: ensuring compliance with applicable electromagnetic power density exposure requirements and addressing unwanted emissions/self-defense requirements in case of simultaneous transmissions on multiple RAT(s) for scenarios not in scope of 3GPP RAN specifications, and ensuring compliance with applicable electromagnetic power density exposure requirements in case of proximity detection is used to address such requirements that require a lower maximum output power. In an example, the wireless device may determine a first value of a first applicable P-MPR of the first panel based on the two requirements when the wireless device determines transmission via the first panel. The wireless device may determine a second value of a second applicable P-MPR of the second panel based on the two requirements when the wireless device determines transmission via the second panel. In an example, the wireless device may determine (or predict) an uplink coverage loss of the first panel based on the first P-MPR of the first panel being higher than a threshold and/or the second P-MPR of the second panel being less than the threshold. The threshold may be a power reduction value determined based on a wireless device capability.

In an example, a wireless device may transmit to the base station one or more wireless device capability RRC messages (e.g., UECapabilityInformation IE) comprising the threshold. The wireless device may transmit the capability RRC messages in response to receiving from the base station RRC messages for capability enquiry (e.g., UECapabilityEnquiry IE). The threshold may indicate a P-MPR value. When an applied P-MPR value for a panel is greater than the threshold, the wireless device may determine it is possible that an uplink coverage loss may occur on the panel (e.g., due to compliance with MPE requirements in case of proximity detection). When the applied P-MPR value for the panel is less than the threshold, the wireless device may determine it is not possible that an uplink coverage loss may occur on the panel.

In an example, when the wireless device determines that the first P-MPR of the first panel is higher than the threshold and/or the second P-MPR of the second panel is less than the threshold, the wireless device may determine that an uplink coverage loss may occur on the first panel, and/or may not occur on the second panel. In an example, the wireless device may determine (or predict) an uplink coverage loss based on comparison between the first P-MPR of the first panel and the second P-MPR of the second panel. In an example, when the wireless device determines that the first P-MPR of the first panel is higher than the second P-MPR of the second panel, the wireless device may determine that an uplink coverage loss may occur more likely on the first panel than on the second panel. When the wireless device determines that the first P-MPR of the first panel is higher than the second P-MPR of the second panel, the wireless device may trigger an uplink beam/power report via a PUCCH (or a PUSCH) comprising at least one of: a first index identifying the first panel, the first P-MPR value, a first $P_{CMAX}$ determined on the first panel, a second index identifying the second panel, the second P-MPR value, a second $P_{CMAX}$ determined on the second panel.

As shown in FIG. 31, a wireless device may trigger an uplink beam/power report (e.g., comprising an indication of proximity detection) based on change of a first P-MPR of the first panel and change of a second P-MPR of the second panel. In an example, the change of P-MPR is determined per panel. The wireless device may determine change of a P-MPR of a panel based on comparison between a P-MPR determined for a latest (or current) uplink transmission and a P-MPR determined for a previous uplink transmission before the latest uplink transmission. In an example, the wireless device may detect (or predict) an uplink coverage loss in response to change of the first P-MPR being greater than a threshold and/or change of the second P-MPR being less than the threshold. The threshold may be a power reduction value determined based on a wireless device capability.

In an example, the wireless device may transmit to the base station one or more wireless device capability RRC messages (e.g., UECapabilityInformation IE) comprising the threshold. The wireless device may transmit the capability RRC messages in response to receiving from the base station RRC messages for capability enquiry (e.g., UECapabilityEnquiry IE). The threshold may indicate a P-MPR change value. In an example, when a P-MPR change applied for a panel by the wireless device is greater than the threshold, the wireless device may determine it is possible that an uplink coverage loss may occur on the panel (e.g., due to compliance with MPE requirements in case of proximity detection). When the P-MPR change applied for the panel is less than the threshold, the wireless device may determine it is not possible that an uplink coverage loss may occur on the panel (e.g., due to compliance with MPE requirements in case of proximity detection).

In an example, the wireless device may detect (or predict) an uplink coverage loss of a panel based on comparison between a first change of a first P-MPR of the first panel and a second change of a second P-MPR of the second panel. In an example, when the wireless device determines that the first change of the first P-MPR of the first panel is higher than the second change of the second P-MPR of the second panel, the wireless device may determine that an uplink coverage loss may occur more likely on the first panel than on the second panel. When the wireless device determines that the first change of the first P-MPR of the first panel is higher than the second change of the second P-MPR of the second panel, the wireless device may trigger an uplink beam/power report via a PUCCH (or a PUSCH) comprising at least one of: a first index identifying the first panel, the first change of the first P-MPR, a first $P_{CMAX}$ determined on the first panel, a second index identifying the second panel and/or the second change of the second P-MPR, a second $P_{CMAX}$ determined on the second panel.

As shown in FIG. 31, a wireless device may trigger an uplink beam/power report (e.g., comprising indication of a proximity detection or an MPE detection or an uplink coverage loss) based on a first P-MPR and a first RSRP of the first panel and a second P-MPR and a second RSRP of the second panel. A P-MPR may be determined based on one or more of above examples. RSRP may be defined as a linear average over power contributions of resource elements of the antenna port(s) that carry reference signals (e.g., SSB and/or CSI-RSs) configured for RSRP measurements within measurement frequency bandwidth in configured reference signals occasions. In an example, for frequency range 1 (FR 1), reference point for the RSRP shall be the antenna connector of the wireless device. For FR 2, RSRP shall be measured based on combined signal from antenna elements corresponding to a given receiver branch. A first RSRP of the first panel may be measured on received RSs via the first panel. A second RSRP of the second panel may be measured on received RSs via the second panel. The first RSRP may be same with or different from the second RSRP.

In an example, the wireless device may trigger the uplink beam/power report based on a combined value of a first P-MPR and a first RSRP of the first panel being less than a threshold, and/or a combined value of a second P-MPR and a second RSRP of the second panel being higher than the threshold. A combined value of a RSRP and a P-MPR may be determined as the value of the RSRP minus the value of the P-MPR (e.g., when the value of the P-MPR is equal to or greater than 0). The threshold may be determined based on a wireless device capability. The uplink beam/power report may comprise at least one of: a first index identifying the first panel, the first P-MPR, the first RSRP, a combined value of the first P-MPR and the first RSRP, a first $P_{CMAX}$ configured on the first panel, a second index identifying the second panel, the second P-MPR, the second RSRP, and/or a combined value of the second P-MPR and the second RSRP, and/or a second $P_{CMAX}$ configured on the second panel.

In an example, the wireless device may transmit to the base station one or more wireless device capability RRC messages (e.g., UECapabilityInformation IE) comprising the threshold. The wireless device may transmit the capability RRC messages in response to receiving from the base station RRC messages for capability enquiry (e.g., UECapabilityEnquiry IE). The threshold may indicate a combined RSRP and P-MPR value. In an example, when a combined value of measured RSRP value and applicated P-MPR value on a panel is less than threshold, the wireless device may determine it is possible that an uplink coverage loss may occur on the panel (e.g., due to compliance with MPE requirements in case of proximity detection). When a combined value of measured RSRP value and applicated P-MPR value on a panel is greater than threshold, the wireless device may determine it is not possible that an uplink coverage loss may occur on the panel.

In an example, the wireless device may trigger the uplink beam/power report based on comparison between a first combined value of a first P-MPR and a first RSRP of the first panel and a second combined value of a second P-MPR and a second RSRP of the second panel. In an example, when the wireless device determines that the first combined value of the first panel is less than the second combined value of the second panel, the wireless device may determine that an uplink coverage loss may occur more likely on the first panel than on the second panel.

As shown in FIG. 31, a wireless device may trigger an uplink beam/power report (e.g., comprising indication of a proximity detection or an MPE detection or an uplink coverage loss) based on a first PHR (e.g., L1-PHR) of the first panel and a second PHR (e.g., L1-PHR) of the second panel.

In an example, types of PHRs are the following: a Type 1 power headroom PH that is valid for PUSCH transmission occasion i on active UL BWP b of carrier f of serving cell c, a Type 3 power headroom PH that is valid for SRS transmission occasion i on active UL BWP b of carrier f of serving cell c.

In an example, a wireless device determines whether a PHR for an activated serving cell is based on an actual transmission or a reference format based on a higher layer signaling of configured grant and periodic/SP SRS transmissions and a DCI the wireless device received until and including the PDCCH monitoring occasion where the wireless device detects the first DCI format 0_0 or DCI format 0_1 scheduling an initial transmission of a transport block since a PHR was triggered if the PHR is reported on a PUSCH triggered by the first DCI. Otherwise, a wireless device determines whether a PHR is based on an actual transmission or a reference format based on the higher layer signaling of configured grant and periodic/SP SRS transmissions and a DCI the UE received until the first uplink symbol of a configured PUSCH transmission minus $T'_{proc,2}=T_{proc,2}$ where $T_{proc,2}$ is determined based on the wireless device's capability assuming $d_{2,1}=1$, $d_{2,2}=0$, and with $\mu_{DL}$ corresponding to the subcarrier spacing of the active downlink BWP of the scheduling cell for a configured grant if the PHR is reported on the PUSCH using the configured grant.

In an example, a wireless device may determine that a Type 1 PHR for an activated serving cell is based on an actual PUSCH transmission. For PUSCH transmission occasion i on active UL BWP b of carrier f of serving cell c, the wireless device may compute the Type 1 PHR as $PH_{type1,b,f,c}(i,j,q_d,l)=P_{CMAX,f,c}(i)-\{P_{O-PUSCH,b,f,c}(j)+10\log_{10}(2^{\mu} \cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)\}$ [dB], where $M_{RB,b,f,c}^{PUSCH}(i)$ is bandwidth of the PUSCH resource assignment expressed in number of resource blocks for PUSCH transmission occasion i on active UL BWP b of carrier f of serving cell c. $\alpha_{b,f,c}(j)$ is a power compensation factor configured by the base station. $\Delta_{TF,b,f,c}(i)$ is a value of power adjustment for transmission format of the PUSCH. $f_{b,f,c}(i,l)$ is the PUSCH power control adjustment state l for active UL BWP b of carrier f of serving cell c. $P_{O\_PUSCH,b,f,c}(j)$ is a target PUSCH received power configured by the base station. $PL_{b,f,c}(q_d)$=referenceSignal-Power−RSRP, where referenceSignalPower is provided by the base station and RSRP is measured on a reference serving cell. In an example, the RSRP may be a L1-RSRP without filtering based on a filter configuration configured by the base station. The RSRP may be a L3-RSRP with filtering based on a filter configuration configured by the base station. In an example, the wireless device may determine a value of $P_{CMAX,f,c}(i)$ based on a P-MPR, a MPR, a A-MPR, a power value of a power class of the wireless device, and/or a maximum Effective Isotropic Radiated Power ($EIRP_{max}$) of the wireless device, by implementing examples explained previously.

In an example, a wireless device may determine that a Type 1 PHR for an activated serving cell is based on a reference PUSCH transmission. For PUSCH transmission occasion i on active UL BWP b of carrier f of serving cell c, the wireless device may compute the Type 1 PHR as:

$PH_{type1,b,f,c}(i,j,q_d,l) = \tilde{P}_{CMAX,f,c}(i) - \{P_{O\text{-}PUSCH,b,f,c}(j) + \alpha_{b,f,c}(j) \cdot PL_{b,f,c}(q_d) + f_{b,f,c}(i,l)\}$, where $\tilde{P}_{CMAX,f,c}(i)$ is computed assuming MPR=0 dB, A-MPR=0 dB, P-MPR=0 dB. $\Box T_C$=0 dB. MPR, A-MPR, P-MPR and $\Box T_C$ are determined based on above examples. $P_{O\_PUSCH,b,f,c}(j)$ and $\alpha_{b,f,c}(i)$ are obtained using $P_{O\_NOMINAL\_PUSCH,f,c}(0)$ and p0-PUSCH-AlphaSetId=0, $PL_{b,f,c}(q_d)$ is obtained using pusch-Pathloss-ReferenceRS-Id=0, and l=0.

In an example, a wireless device may determine that a Type 3 PHR for an activated serving cell is based on an actual SRS transmission. For SRS transmission occasion i on active UL BWP b of carrier f of serving cell c and if the wireless device is not configured for PUSCH transmissions on carrier f of serving cell c, the wireless device may compute a Type 3 PHR as
$PH_{type3,b,f,c}(i,q_s) = P_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d) + h_{b,f,c}(i)\}$ [dB], where $M_{SRS,f,c}(i)$ is SRS bandwidth expressed in number of resource blocks for SRS transmission occasion i on active UL BWP b of carrier f of serving cell c. $\alpha_{SRS,b,f,c}(q_s)$ is a power compensation factor configured by the base station. $h_{b,f,c}(i)$ is the SRS power control adjustment state l for active UL BWP b of carrier f of serving cell c. $P_{O\_SRS,b,f,c}(q_s)$ is a target SRS received power configured by the base station. In an example, the wireless device may determine a value of $P_{CMAX,f,c}(i)$ based on a P-MPR, a MPR, a A-MPR, a power value of a power class of the wireless device, and/or a maximum Effective Isotropic Radiated Power ($EIRP_{max}$) of the wireless device, by implementing examples explained previously.

In an example, a wireless device may determine that a Type 3 PHR for an activated serving cell is based on a reference SRS transmission. For SRS transmission occasion i on UL BWP b of carrier f of serving cell c and if the wireless device is not configured for PUSCH transmissions on UL BWP b of carrier f of serving cell c the wireless device may compute a Type 3 PHR as
$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}$ [dB], where $q_s$ is a SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$ and $h_{b,f,c}(i)$ are obtained from SRS-ResourceSetId=0 for UL BWP b. $\tilde{P}_{CMAX,f,c}(i)$ is computed assuming MPR=0 dB, A-MPR=0 dB, P-MPR=0 dB and $\Box T_C$=0 dB.

In an example, a PHR may comprise at least one of: a L1-PHR and a L2-PHR. A PHR evaluated based on a L1-RSRP may be referred to as a L1-PHR. The PHR transmitted in an uplink beam/power report (e.g., comprised in UCIs, or transmitted in PUCCH) may be referred to as L1-PHR. The existing PHR evaluated based on L3-RSRP and transmitted in a PHR MAC CE (e.g., Single Entry PHR MAC CE, or Multiple Entry PHR MAC CE associated with LCIDs as shown in FIG. 20) may be referred to L2-PHR.

As shown in FIG. 31, the wireless device may trigger the uplink beam/power report based on a first PHR of the first panel being lower than a threshold and/or a second PHR of the second panel being higher than the threshold. When the wireless device determines that the first PHR of the first panel is lower than the threshold and the second PHR of the second panel is higher than the threshold, the wireless device may determine (or predict) that an uplink coverage loss may occur more likely on the first panel than on the second panel. The threshold may be configured by the base station, e.g., by implementing above examples, or preconfigured to a fixed value. The uplink beam/power report may comprise at least one of: a first index identifying the first panel, the first PHR, the first P-MPR value, a first $P_{CMAX}$ configured on the first panel, a second index identifying the second panel, the second PHR, and/or the second P-MPR value, a second $P_{CMAX}$ configured on the second panel.

In an example, the wireless device may trigger the uplink beam/power report based on comparison between a first PHR of the first panel and a second PHR of the second panel. In an example, when the wireless device determines that the first PHR of the first panel is smaller (e.g., in absolute value) than the second PHR of the second panel, the wireless device may determine (or predict) that an uplink coverage loss may occur more likely on the first panel than on the second panel. The uplink beam/power report may comprise at least one of: a first index identifying the first panel, the first PHR, the first P-MPR value, a first $P_{CMAX}$ configured on the first panel, a second index identifying the second panel, the second PHR, the second P-MPR value, a second $P_{CMAX}$ configured on the second panel.

One or more examples of FIG. 31 may be combined for determining to trigger an uplink beam/power report. In an example, a wireless device may trigger the uplink beam/power report based on a joint evaluation of at least one of: uplink duty cycle, P-MPR, RSRP and/or PHR on a panel.

As shown in FIG. 30 and FIG. 31, the wireless device may trigger the uplink beam/power report based on one or more of uplink duty cycle, P-MPR, RSRP and/or PHR. The wireless device may transmit the uplink beam/power report when one or more conditions are met, e.g., based on examples of FIG. 31. The transmission of the uplink beam/power report may be aperiodic. Aperiodic transmission of the uplink beam/power report may reduce uplink signaling overhead, and notify timely the base station uplink coverage issue due to proximity detection.

Figure 32:
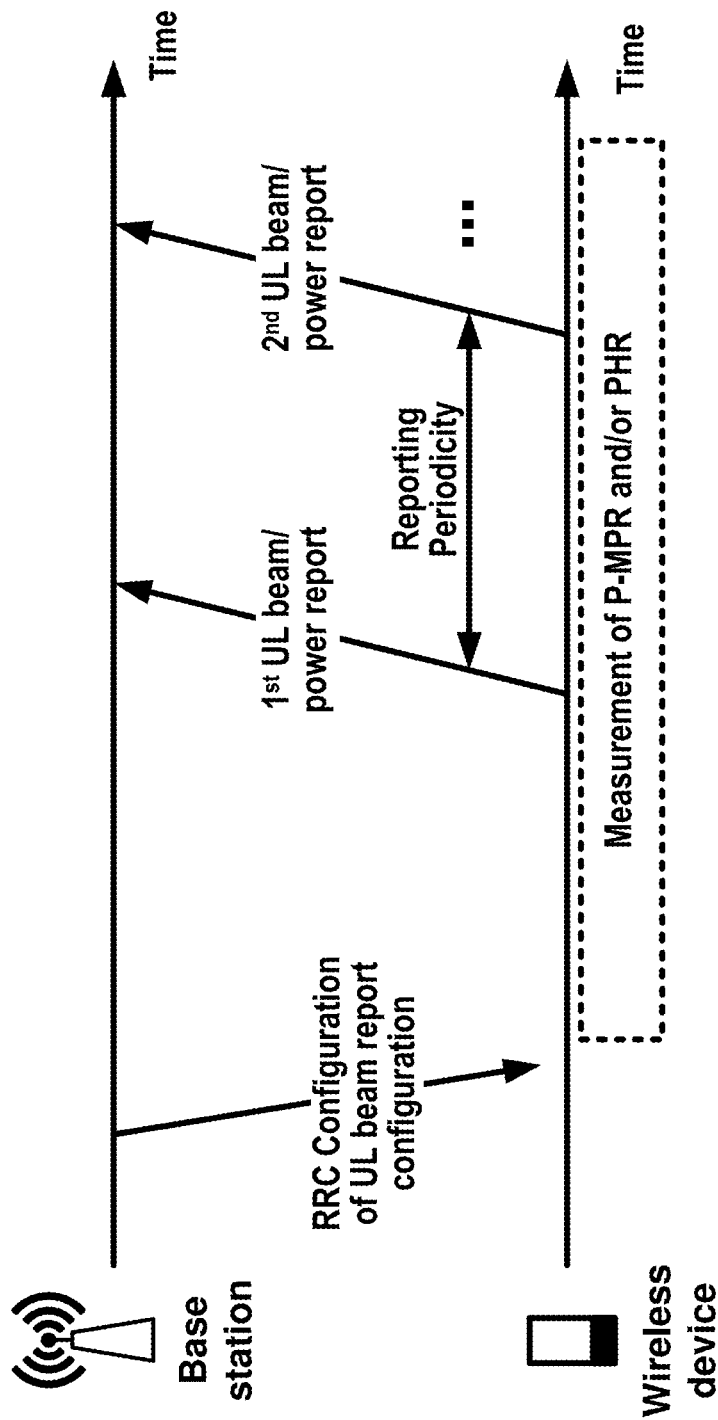
FIG. 32 shows an example of periodic uplink beam/power report for multiple panels, according to some embodiments.

FIG. 32 shows an example of periodic uplink beam/power report (e.g., comprising indication of a proximity detection or an MPE detection or an uplink coverage loss). In an example, a base station may transmit to a wireless device one or more RRC messages comprising configuration parameters of uplink beam/power report. The configuration parameters may be transmitted by implementing examples of FIG. 31.

As shown in FIG. 32, the wireless device may measure P-MPR and/or PHR based on examples of FIG. 30. The wireless device may be equipped with a plurality of panels comprising a first panel and a second panel, based on examples of FIG. 30.

In an example, different from FIG. 31, the wireless device may transmit periodic uplink beam/power report based on the configuration parameters of the uplink beam/power report. The wireless device may transmit periodic uplink beam/power report based on contiguous measurements (e.g., L1-RSRP, L3-RSRP, P-MPR, and/or PHR) on the plurality of panels. The wireless device may transmit the uplink beam/power report with a transmission periodicity indicated in the configuration parameters. The wireless device may transmit the uplink beam/power report via a PUCCH resource indicated in the configuration parameters. The uplink beam/power report may comprise at least one of: a first index indicating a first panel, a first P-MPR value associated with the first panel, a first PHR value associated with the first panel, a first RSRP value associated with the first panel, a first $P_{CMAX}$ determined on the first panel. In an example, the uplink beam/power report may further comprise at least one of: a second index indicating a second panel, a second P-MPR value associated with the second panel, a second PHR value associated with the second panel, a second RSRP value associated with the second panel, a second $P_{CMAX}$ determined on the second panel.

By example of FIG. 32, the wireless device may transmit periodic uplink beam/power report indicating P-MPR/RSRP/PHR values for active panels. Based on the periodically indicated P-MPR/RSRP/PHR values for the active panels, the base station may predict on which panel an uplink coverage loss may occur. The base station may transmit to the wireless device a command indicating an active panel switching (e.g., to avoid uplink coverage loss) for uplink transmission based on the predication. Periodic transmission of the uplink beam/power report may reduce actual occurrence of uplink coverage loss.

In an example, FIG. 30, FIG. 31, and/or FIG. 32 may be extended to multiple cells. In an example, a wireless device may transmit the uplink beam/power report based on the examples of FIG. 30, FIG. 31 and/or FIG. 32, the uplink beam/power report further comprising a BWP ID of a serving cell for the uplink beam/power report and/or a cell index of a serving cell. In an example, when the wireless device transmits the uplink beam/power report for multiple cells, the uplink beam/power report may comprise multiple entries, each entry comprising a cell index or a BWP ID and a corresponding uplink beam/power report (e.g., P-MPR, PHR, and/or L1-RSRP) for a cell identified by the cell index and/or a BWP identified by the BWP ID.

In an example, a wireless device may perform aperiodic CSI reporting using PUSCH on serving cell c upon successful decoding of a DCI format 0_1 or DCI format 0_2 which triggers an aperiodic CSI trigger state. When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH. An aperiodic CSI report carried on the PUSCH supports wideband, and sub-band frequency granularities. An aperiodic CSI report carried on the PUSCH supports Type I, Type II and Enhanced Type II CSI.

In an example, a wireless device may perform semi-persistent CSI reporting on the PUSCH upon successful decoding of a DCI format 0_1 or DCI format 0_2 which activates a semi-persistent CSI trigger state. DCI format 0_1 and DCI format 0_2 contains a CSI request field which indicates the semi-persistent CSI trigger state to activate or deactivate. Semi-persistent CSI reporting on the PUSCH supports Type I, Type II with wideband, and sub-band frequency granularities and Enhanced Type II CSI. The PUSCH resources and MCS shall be allocated semi-persistently by an uplink DCI.

In an example, CSI reporting on PUSCH can be multiplexed with uplink data on PUSCH. CSI reporting on PUSCH can also be performed without any multiplexing with uplink data from the wireless device. Type I CSI feedback is supported for CSI Reporting on PUSCH. Type I wideband and sub-band CSI is supported for CSI Reporting on the PUSCH. Type II CSI is supported for CSI Reporting on the PUSCH.

For Type I, Type II and Enhanced Type II CSI feedback on PUSCH, a CSI report comprises of two parts comprising Part 1 and Part 2. Part 1 has a fixed payload size and is used to identify the number of information bits in Part 2. Part 1 shall be transmitted in its entirety before Part 2.

In an example, for Type I CSI feedback, Part 1 contains RI (if reported), CRI (if reported), CQI for the first codeword (if reported). Part 2 contains PMI (if reported) and contains the CQI for the second codeword (if reported) when RI (if reported) is larger than 4.

In an example, for Type II CSI feedback, Part 1 contains RI (if reported), CQI, and an indication of the number of non-zero wideband amplitude coefficients per layer for the Type II CSI. The fields of Part 1—RI (if reported), CQI, and the indication of the number of non-zero wideband amplitude coefficients for each layer—are separately encoded. Part 2 contains the PMI of the Type II CSI. Part 1 and 2 are separately encoded.

In an example, for Enhanced Type II CSI feedback, Part 1 contains RI, CQI, and an indication of the overall number of non-zero amplitude coefficients across layers for the Enhanced Type II. The fields of Part 1—RI, CQI, and the indication of the overall number of non-zero amplitude coefficients across layers—are separately encoded. Part 2 contains the PMI of the Enhanced Type II CSI. Part 1 and 2 are separately encoded.

In an example, a Type II CSI report that is carried on the PUSCH shall be computed independently from any Type II CSI report that is carried on the PUCCH formats 3 or 4.

In an example, when the higher layer parameter reportQuantity is configured with one of the values 'cri-RSRP' or 'ssb-Index-RSRP', the CSI feedback consists of a single part.

In an example, for both Type I and Type II reports configured for PUCCH but transmitted on PUSCH, the determination of the payload for CSI part 1 and CSI part 2 follows that of transmission on PUCCH.

In an example, when CSI reporting on PUSCH comprises two parts, the wireless device may omit a portion of the Part 2 CSI. Omission of Part 2 CSI is according to a predefined priority order. In an example, $N_{Rep}$ is the number of CSI reports configured to be carried on the PUSCH. Priority 0 is the highest priority and priority $2N_{Rep}$ is the lowest priority and the CSI report n corresponds to the CSI report with the nth smallest $Pri_{i,CSI}(y,k,c,s)$ value among the $N_{Rep}$ CSI reports. The subbands for a given CSI report n indicated by the higher layer parameter csi-ReportingBand are numbered continuously in increasing order with the lowest subband of csi-ReportingBand as subband 0. When omitting Part 2 CSI information for a particular priority level, the wireless device shall omit all of the information at that priority level.

In an example, a wireless device is semi-statically configured by higher layers to perform periodic CSI Reporting on the PUCCH. The wireless device can be configured by higher layers for multiple periodic CSI Reports corresponding to multiple higher layer configured CSI Reporting Settings, where the associated CSI Resource Settings are higher layer configured. Periodic CSI reporting on PUCCH formats 2, 3, 4 supports Type I CSI with wideband granularity.

In an example, a wireless device shall perform semi-persistent CSI (SP CSI) reporting on the PUCCH applied starting from a first slot that is after slot $n+3N_{slot}^{subframe,\mu}$ when the wireless device would transmit a PUCCH with HARQ-ACK information in slot n corresponding to a PDSCH carrying the activation command (e.g., SP CSI activation/deactivation MAC CE) where $\square$ is the SCS configuration for the PUCCH. The activation command will contain one or more Reporting Settings where the associated CSI Resource Settings are configured.

In an example, SP CSI reporting on the PUCCH supports Type I CSI. SP CSI reporting on the PUCCH format 2 supports Type I CSI with wideband frequency granularity. SP CSI reporting on PUCCH formats 3 or 4 supports Type I CSI with wideband and sub-band frequency granularities and Type II CSI Part 1. When the PUCCH carry Type I CSI with wideband frequency granularity, the CSI payload carried by the PUCCH format 2 and PUCCH formats 3, or 4 are identical and the same irrespective of RI (if reported), CRI (if reported). For type I CSI sub-band reporting on PUCCH formats 3, or 4, the payload is split into two parts. The first part contains RI (if reported), CRI (if reported), CQI for the first codeword. The second part contains PMI and contains the CQI for the second codeword when RI>4. A SP CSI report carried on the PUCCH formats 3 or 4 supports Type II CSI feedback, but only Part 1 of Type II CSI feedback. Supporting Type II CSI reporting on the PUCCH formats 3 or 4 is a UE capability type2-SP-CSI-Feedback-Long-PUCCH. A Type II CSI report (Part 1 only) carried on PUCCH formats 3 or 4 shall be calculated independently of any Type II CSI reports carried on the PUSCH.

In an example, when the wireless device is configured with CSI Reporting on PUCCH formats 2, 3 or 4, each PUCCH resource is configured for each candidate UL BWP.

In an example, a wireless device is not expected to report CSI with a total number of UCI bits and CRC bits larger than 115 bits when configured with PUCCH format 4. For CSI reports transmitted on a PUCCH, if all CSI reports consist of one part, the wireless device may omit a portion of CSI reports. Omission of CSI is according to the priority order determined from the $Pri_{i,CSI}(y,k,c,s)$ value. CSI report is omitted beginning with the lowest priority level until the CSI report code rate is less or equal to the one configured by the higher layer parameter maxCodeRate. If any of the CSI reports consist of two parts, the wireless device may omit a portion of Part 2 CSI. Omission of Part 2 CSI is according to a predefined priority order. Part 2 CSI is omitted beginning with the lowest priority level until the Part 2 CSI code rate is less or equal to the one configured by higher layer parameter maxCodeRate.

In an example, when configured (or activated) with multiple CSI reports, a wireless device may determine a transmision priority for each of the multiple CSI reports based on a priority value $Pri_{iCSI}(y, k, c, s)=2 \cdot N_{cells} \cdot M_s \cdot y + N_{cells} \cdot M_s \cdot k + M_s \cdot c + s$. In an example, y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH. In an example, k=0 for CSI reports carrying L1-RSRP or L1-SINR and k=1 for CSI reports not carrying L1-RSRP or L1-SINR (e.g., the CSI reports comprising CQI/PMI/CRI/SSBRI/LI/RI). In an example, c is a serving cell index and $N_{cells}$ is a value of a higher layer parameter maxNrofServingCells. In an example, s is a reportConfigID of the CSI report and $M_s$ is a value of a higher layer parameter maxNrofCSI-Report-Configurations. In an example, a first CSI report is said to have (higher) priority over a second CSI report if an associated $Pri_{iCSI}(y, k, c, s)$ value is lower for the first report than for the second report.

In an example, two CSI reports are said to collide if a time occupancy of the physical channels scheduled to carry the two CSI reports overlap in at least one OFDM symbol and the physical channels are transmitted on a same carrier.

In an example, when a wireless device is configured to transmit two colliding CSI reports (e.g., a first CSI report and a second CSI report), the wireless device may not be required to transmit the first CSI report with higher $Pri_{iCSI}(y, k, c, s)$ compared with the second CSI report in response to y values associated with priority values of the two CSI reports being different and the two CSI reports not being both carried on PUCCH. The wireless device may transmit the second CSI report with lower $Pri_{iCSI}(y, k, c, s)$, compared with the $Pri_{iCSI}(y, k, c, s)$ of the first CSI report. In response to y values associated with priority values of the two CSI reports being same and/or the two CSI report being both carried on PUCCH, the wireless device may determine whether to multiplex the two CSI reports or drop one of the two CSI reports based on: $Pri_{iCSI}(y, k, c, s)$ values of the two CSI reports, CSI report quantities of the two CSI reports, and/or available uplink radio (e.g., PUCCH/PUSCH) resources.

In an example, if a wireless device transmits CSI reports using PUCCH format 2, the wireless device transmits only wideband CSI for each CSI report of the CSI reports. In the following, a Part 1 CSI report refers either to a CSI report with only wideband CSI or to a Part 1 CSI report with wideband CSI and sub-band CSI. In an example, if the wireless device has one or more CSI reports and zero or more HARQ-ACK/SR information bits to transmit in a PUCCH, if any of the CSI reports are overlapping and the wireless device is provided by multi-CSI-PUCCH-ResourceList with J (e.g., J>2) PUCCH resources in a slot, for PUCCH format 2 and/or PUCCH format 3 and/or PUCCH format 4, the wireless device uses the PUCCH format 2 resource J−1, or the PUCCH format 3 resource J−1, or the PUCCH format 4 resource J−1 and the UE selects $N_{CSI}^{reported}$ CSI report(s) for transmission (e.g., together with HARQ-ACK information and SR), when any, in ascending priority value of the $N_{CSI}^{reported}$ CSI report(s) among the configured/activated CSI reports.

In an example, if a wireless device determines a PUCCH resource with PUCCH format 2 for transmission of HARQ-ACK, SR and wideband or sub-band CSI, or if the wireless device determines a PUCCH resource with PUCCH format 3 or PUCCH format 4 for transmission of HARQ-ACK, SR and wideband CSI reports, the wireless device may transmit the HARQ-ACK, SR, and CSI reports bits based on: total bits of HARQ-ACK, SR, Part 1 CSI reports and CRC bit, and available PUCCH resources. In an example, the wireless device may select $N_{CSI}^{reported}$ CSI report(s), from the $N_{CSI}^{total}$ CSI reports, for transmission (e.g., together with HARQ-ACK and SR) in ascending priority value.

In an example, if a wireless device determines a PUCCH resource with PUCCH format 3 or PUCCH format 4 for transmission of HARQ-ACK, SR and sub-band CSI reports, the wireless device may select the first $N_{CSI-port2}^{reported}$ Part 2 CSI reports, according to respective priority value(s), for transmission together with the HARQ-ACK, SR and $N_{CSI}^{total}$ Part 1 CSI reports based on Part 2 CSI bits and Part 1 CSI bits. The wireless device may drop all Part 2 CSI reports and selects $N_{CSI\text{-}part1}^{reported}$ Part 1 CSI report(s), from the $N_{CSI}^{total}$ CSI reports in ascending priority value, for transmission together with the HARQ-ACK and SR information bits based on Part 2 CSI bits and Part 1 CSI bits.

When configured with multiple panels at a wireless device and operating in high frequency (e.g., 30 GHz, 50 GHz, or above TeraHz etc.), the wireless device may transmit periodic or aperiodic uplink beam/power report comprising P-MPR and/or PHR (e.g., L1-PHR) of the multiple panels, as shown in FIG. 30 and/or FIG. 32. The uplink beam/power report may indicate a proximity detection, uplink coverage loss, a MPE issue, or P-MPR/PHR of one of the mulitple panels. In an example, the wireless device may transmit to the base station one or more CSI reports indicating downlink channel quality of one or more reference signal transmitted from a base station to the wireless device. The uplink beam/power report may be different from the one or more CSI reports. In an exmaple, the uplink beam/power report may indicate that a second panel or a beam of the second panel from the multiple panels is suitable for uplink transmission in case a proximity being detected on a first panel and/or uplink coverage loss being occurring on the first panel. In response to receiving the uplink beam/power report, a gNB may indicate the wireless device to change to the second panel for uplink transmission (e.g., PUCCH/PUSCH/SRS). In existing technologies, a CSI report, when comprising L1-RSRP and/or L1-SINR, may indicate a downlink beam or a downlink TRP for receiving downlink transmission. In response to receiving the CSI report, the gNB may determine a downlink transmission beam for the downlink transmission (e.g., PDCCH/PDSCH/CSI-RS). In existing technologies, a CSI report, when comprising PMI/CRI/RI etc., may indicate a quantity of spatial property (e.g., rank, precoding weight index, etc.) of a radio propagation channel from the base station to the wireless device. In response to receiving the CSI report, the gNB may determine a transmission format (e.g., MCS, resource allocation of PDCCH/PDSCH, MIMO transmission format, etc.) on a PDSCH.

In an example, a wireless device may transmit aperiodic/periodic/semi-persistent uplink beam/power report (e.g. comprising P-MPR and/or PHR of one or more panels) via a PUCCH resource or a PUSCH resource. Based on existing technologies, the wireless device may transmit one or more CSI reports (e.g., comprising CQI/PMI/RI/CRI/SSBRI/LI/L1-RSRP/L1-SINR) via a PUCCH resource or a PUSCH resource. When the one or more CSI reports overlaps in time, the wireless device, by implementing existing technologies, may determine whether to multiplex the one or more CSI reports in an uplink transmission (e.g., a PUCCH resource or a PUSCH resource), or drop one of the one or more CSI reports based on priority values of the one or more CSI reports and available uplink radio resources. However, an uplink beam/power report, comprising P-MPR and/or PHR of one or more panels, is different from a CSI report. By implementing existing technologies, the wireless device and a base station may not determine whether the wireless device shall transmit or drop an uplink beam/power report when the uplink beam/power report overlaps in time with CSI reports. Based on existing technologies, the wireless device may autonomously drop the uplink beam/power report in response to the uplink beam/power report overlapping in time with the CSI report. Autonomously dropping the uplink beam/power report (e.g., when the wireless device determines that an uplink coverage is becoming worse due to proximity detection) may result in uplink coverage loss and communication link broken. Existing technologies may reduce uplink throughput and increase power consumption of a wireless device.

Example embodiments may comprise determining a priority value for an uplink beam/power report. Based on the priority value of the uplink beam/power report, the wireless device may determine whether to multiplex the uplink beam/power report or drop the uplink beam/power report when the uplink beam/power report overlaps with CSI reports. The wireless device may determine the priority value for the uplink beam/power report based on at least one of: whether the uplink beam/power report is transmitted on PUCCH or PUSCH, whether the uplink beam/power report is a periodic transmission, aperiodic transmission or a semi-persistent transmission, which cell the uplink beam/power report is associated with, a report configuration index for the uplink beam/power report, quantities (P-MPR, PHR and/or RSRP) of the uplink beam/power report. Example embodiments may improve uplink coverage and power consumption of the wireless device.

Figure 33:
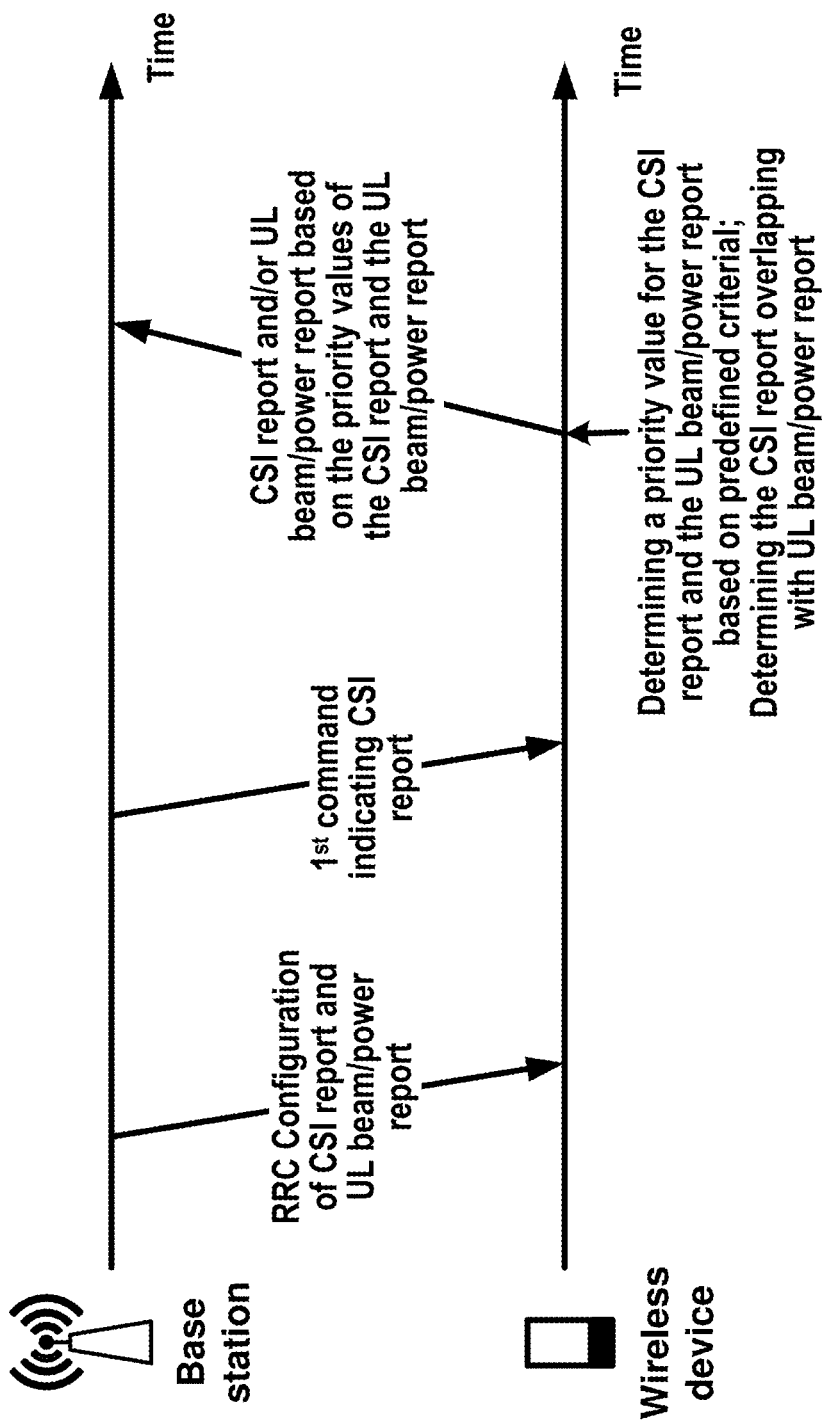
FIG. 33 shows an example of prioritization of uplink beam/power report for multiple panels, according to some embodiments.

FIG. 33 shows an example of uplink beam/power report. In an example, a base station may transmit to a wireless device one or more RRC messages comprising configuration parameters of CSI report and uplink beam/power report. The wireless device may be equipped with one or more panels, e.g., based on examples of FIG. 28. The configuration parameters of the CSI report may be implemented based on examples of FIG. 26 and/or FIG. 27.

In an example, an uplink beam/power report may be referred to as uplink transmission power state report, panel state report, panel selection indication, and/or MPE report. A wireless device may transmit the uplink beam/power report indicating an uplink coverage loss on a panel of a plurality panels of the wireless device. The uplink beam/power report may be implemented as aperiodic report as shown in FIG. 30 and/or FIG. 31. The uplink beam/power report may be implemented as a periodic report as shown in FIG. 32. The periodic uplink beam/power report may be transmitted via a PUCCH resource. In an example, the uplink beam/power report may be implemented as a semi-persistent report. The semi-persistent uplink beam/power report may be activated by a MAC CE, or a DCI. The SP uplink beam/power report activated by the MAC CE may be transmitted via a PUCCH resource. The SP uplink beam/power report activated by the DCI may be transmitted via a PUSCH resource.

In an example, the uplink beam/power report may comprise at least one of: one or more uplink duty cycle value of one or more panels, one or more P-MPR values of one or more panels, one or more RSRP received on one or more panels, one or more PHR (or power state report) for one or more panels.

In an example, a wireless device may determine a RSRP received on a panel based on a downlink RS (e.g., SSB/CSI-RS), the downlink RS being configured by the base station for the uplink beam/power report. The downlink RS may be different from pathloss RS (or beam RS for CSI report) configured by the base station. The wireless device may measure the pathloss RS (or beam RS) for determining downlink beam quality, downlink channel quality, and/or downlink interference. The wireless device may measure the downlink RS configured for the uplink beam/power report for determining uplink beam quality, uplink channel quality, and/or uplink interference.

In an example, an uplink beam/power report may comprise a PHR value associated with a panel. The PHR value is transmitted in a layer 1 signaling (e.g., in UCI bits), different from PHR MAC CE.

In an example, an uplink beam/power report may comprise: a first combined value of P-MPR and RSRP associated with a first panel, a second combined value of P-MPR and RSRP associated with a second panel. The wireless device may determine a P-MPR value for a panel based on examples of FIG. 30, FIG. 31, and/or FIG. 32. The wireless device may determine a RSRP value for a panel based on examples of FIG. 30, FIG. 31, and/or FIG. 32. The wireless device may determine a PHR (or a power state value) for a panel based on examples of FIG. 30, FIG. 31, and/or FIG. 32. In an example, the wireless device may transmit the uplink beam/power report with a report format implemented based on examples of FIG. 34, FIG. 35 and/or FIG. 36.

As shown in FIG. 33, the wireless device may receive a first command (e.g., $1^{st}$ command) indicating a CSI report. In an example, the first command may be an RRC message comprising configuration parameters of a periodic transmission of the CSI report via a PUCCH resource. The first command may be a MAC CE indicating an activation of a semi-persistent transmission of the CSI report via a PUCCH resource. The first command may be a DCI indicating an activation of a semi-persistent transmission of the CSI report via a PUSCH resource. The first command may be a DCI indicating a triggering of aperiodic transmission of the CSI report via a PUSCH resource. The CSI report may be associated with a CSI reporting configuration index. The CSI report may be associated with a cell identified by a cell index. The wireless device, based on the first command the configuration parameters of the CSI report, determine an uplink radio resource (e.g., a PUCCH resource or a PUSCH resource).

In an example, the wireless device may determine an uplink transmission of an uplink beam/power report based on examples of FIG. 30, FIG. 31 and/or FIG. 32. The wireless device may determine the uplink transmission of the uplink beam/power report overlaps (or collide) in time with the CSI report. The wireless device may determine a first priority value for the CSI report and a second priority value for the uplink beam/power report. The wireless device may determine the first priority value based on at least one of: a CSI report configuration index of the CSI report, a cell index associated with the CSI report, whether the CSI report comprise L1-RSRP (or L1-SINR) or not comprise L1-RSRP (or L1-SINR), whether the CSI report is periodic, semi-persistent, or aperiodic report, whether the CSI report is via a PUCCH resource or via a PUSCH resource. The wireless device may determine the second priority value based on at least one of: an uplink beam/power report configuration index of the uplink beam/power report, a cell index associated with the uplink beam/power report, whether the uplink beam/power report is periodic, semi-persistent or aperiodic report, whether the uplink beam/power report is via a PUCCH resource or a PUSCH resource.

In an example, the wireless device may determine the first priority value for the CSI report based on the first command and the configuration parameters. The wireless device may determine the first priority value as $Pri_{iCSI}(y, k, c, s) = 2 \cdot N_{cells} \cdot M_s \cdot y + N_{cells} \cdot M_s \cdot k + M_s \cdot c + s$. In an example, y=0 if the CSI report is aperiodic CSI report via PUSCH, y=1 if the CSI report is SP CSI report via PUSCH, y=2 if the CSI report is SP CSI report via PUCCH, and y=3 if the CSI report is periodic CSI report via PUCCH. In an example, k=0 if the CSI report carries L1-RSRP or L1-SINR. k=1 if the CSI report does not carry L1-RSRP or L1-SINR (e.g., the CSI report comprising CQI/PMI/CRI/SSBRI/LI/RI). In an example, c is a serving cell index and $N_{cells}$ is a value of a higher layer parameter maxNrofServingCells. In an example, s is a reportConfigID of the CSI report and $M_s$ is a value of a higher layer parameter maxNrofCSI-ReportConfigurations.

In an example, the wireless device may determine the second priority value for the uplink beam/power report based on at least one of: an uplink beam/power report configuration index of the uplink beam/power report, a cell index associated with the uplink beam/power report, whether the uplink beam/power report is periodic, semi-persistent or aperiodic report, whether the uplink beam/power report is via a PUCCH resource or a PUSCH resource. The wireless device may determine the second priority value as $Pri_{iCSI}(y, k, c, s) = 2 \cdot N_{cells} \cdot M_s \cdot y + N_{cells} \cdot M_s \cdot k + M_s \cdot c + s$. In an example, y=0 if the uplink beam/power report is aperiodic report via PUSCH, y=1 if the uplink beam/power report is semi-persistent report via PUSCH, y=2 if the uplink beam/power report is semi-persistent report via PUCCH, and y=3 if the uplink beam/power report is periodic report via PUCCH. In an example, the uplink beam/power report may be configured (or pre-defined) as periodic report via PUCCH. In such case, y may be a fixed value (e.g., 0, 1, 2, or 3 based on one or more criterial). In an example, y may be set to 0, when uplink beam/power report is urgent for uplink coverage loss recovery (e.g., in high frequency). In an example, y may be set to 3, when uplink beam/power report is not urgent for uplink coverage loss recovery (e., in low frequency). In an example, k may be a fixed value (e.g., 0) for the uplink beam/power report. In an example, c is a serving cell index and $N_{cells}$ is a value of a higher layer parameter maxNrof-ServingCells. In an example, s is a reportConfigID of the CSI report and $M_s$ is a value of a higher layer parameter maxNrofCSI-ReportConfigurations.

In an example, the wireless device may not be required to transmit the uplink beam/power report if the second priority value associated with the uplink beam/power report is higher than the first priority value associated with the CSI report, when the uplink beam/power report collides with the CSI report. The wireless device may transmit the CSI report if the first priority value of the CSI report is lower than the second priority value of the uplink beam/power report. The wireless device may not be required to transmit the uplink beam/power report if: the second priority value associated with the uplink beam/power report is higher than the first priority value associated with the CSI report, y values associated with the CSI report and the uplink beam/power report are different, and the CSI report and the uplink beam/power report are not both carried on PUCCH (e.g., one of both is on PUSCH and another one on PUCCH, or both are on PUSCH).

In an example, the wireless device may not be required to transmit the CSI report if the first priority value associated with the CSI report is higher than the second priority value associated with the uplink beam/power report, when the uplink beam/power report collides with the CSI report. The wireless device may transmit the uplink beam/power report if the second priority value of the uplink beam/power report is lower than the first priority value of the CSI report. The wireless device may not be required to transmit the CSI report if: the first priority value associated with the CSI report is higher than the second priority value associated with the uplink beam/power report, y values associated with the CSI report and the uplink beam/power report are different, and the CSI report and the uplink beam/power report are not both carried on PUCCH.

In an example, based on the first priority value of the CSI report and the second priority value of the uplink beam/power report and the CSI report colliding with the uplink beam/power report, the wireless device may determine whether to multiplex them or drop one of the CSI report and the uplink beam/power report based on: CSI report quantities of the CSI report, uplink beam quantities of the uplink beam/power report, and/or available uplink radio (e.g., PUCCH/PUSCH) resources. The wireless device may determine whether to multiplex them or drop one of the CSI report and the uplink beam/power report if y values associated with the CSI report and the uplink beam/power report are same and/or the CSI report and the uplink beam/power report are both carried on PUCCH.

In an example, if the wireless device has one or more CSI reports and one or more uplink beam/power report and zero or more HARQ-ACK/SR information bits to transmit in a PUCCH, if any of the CSI reports and the uplink beam/power reports are overlapping and the wireless device is provided by multi-CSI-PUCCH-ResourceList with J (e.g., J>2) PUCCH resources in a slot, for PUCCH format 2 and/or PUCCH format 3 and/or PUCCH format 4, the wireless device uses the PUCCH format 2 resource J−1, or the PUCCH format 3 resource J−1, or the PUCCH format 4 resource J−1 and the UE selects a number (e.g., $N_{CSI}^{reported}$ configured by the base station) of CSI report(s) and uplink beam/power report for transmission (e.g., together with HARQ-ACK information and SR), when any, in ascending priority value of the number CSI report(s) among the configured/activated CSI reports and uplink beam/power reports.

In an example, a wireless device may determine to transmit a total number of configured/activated CSI report(s) and uplink beam/power reports. Any of the total number of CSI reports and uplink beam/power reports may overlap in time. If a wireless device determines a PUCCH resource with PUCCH format 2 for transmission of HARQ-ACK, SR, wideband or sub-band CSI and uplink beam/power report, or if the wireless device determines a PUCCH resource with PUCCH format 3 or PUCCH format 4 for transmission of HARQ-ACK, SR, wideband CSI reports and uplink beam/power report, the wireless device may transmit the HARQ-ACK, SR, and CSI reports bits based on: total bits of HARQ-ACK, SR, Part 1 CSI reports, uplink beam/power reports and CRC bit, and available PUCCH resources. In an example, the wireless device may select a number (e.g., configured by the base station) of CSI report(s) and uplink beam/power reports, from the total number of configured/activated CSI report(s) and uplink beam/power reports, for transmission (e.g., together with HARQ-ACK and SR) in ascending priority value.

In an example, a wireless device may determine to transmit a total number of configured/activated CSI report(s) and uplink beam/power reports. Any of the total number of CSI reports and uplink beam/power reports may overlap in time. If a wireless device determines a PUCCH resource with PUCCH format 3 or PUCCH format 4 for transmission of HARQ-ACK, SR, sub-band CSI reports and uplink beam/power report, the wireless device may select the first $N_{CSI\text{-}part2}^{reported}$ Part 2 CSI reports, according to respective priority value(s), for transmission together with the HARQ-ACK, SR, $N_{CSI}^{total}$ Part 1 CSI reports and uplink beam/power reports based on Part 2 CSI bits, Part 1 CSI bits and uplink beam/power reports.

In an example, a wireless device may determine priority order of a uplink beam/power report and CSI report(s) based on: CSI quantities of the CSI report(s), whether the CSI report(s) comprise a wideband CSI, or a subband CSI, whether the CSI report(s) comprise Part 1 CSI report or Part 2 CSI report, uplink beam quantities of the uplink beam/power report. The priority order may be predefined and known to both the base station and the wireless device. In an example, the wireless device may determine uplink beam/power report (comprising P-MPR, RSRP, L1-PHR, or power state report) has higher priority than a CSI report comprising L1-RSRP/L1-SINR. The wireless device may determine uplink beam/power report has lower priority than a first CSI report comprising L1-RSRP/L1-SINR. The wireless device may determine uplink beam/power report has higher priority than a third CSI report not comprising L1-RSRP/L1-SINR. In an example, the wireless device may determine uplink beam/power report (comprising P-MPR, RSRP, L1-PHR, or power state report) has higher priority than a CSI report comprising a wideband CSI and/or Part 1 CSI. The wireless device may determine uplink beam/power report has lower priority than a first CSI report comprising a wideband CSI and/or Part 1 CSI. The wireless device may determine uplink beam/power report has higher priority than a third CSI report not comprising a subband CSI and/or Part 2 CSI.

In an example, a wireless device may determine the uplink beam/power report has a same priority value of the CSI report. In this case, the priority value calculation equation may be kept without change, e.g., for backward compatibility. In an example the wireless device may determine the uplink beam/power report has a same priority value of the CSI report in response to the CSI report comprising L1-RSRP and/or L1-SINR. In an example the wireless device may determine the uplink beam/power report has a same priority value of the CSI report in response to the CSI report not comprising L1-RSRP and/or L1-SINR (e.g., the CSI report comprising CQI/PMI/CRI/SSBRI/LI/RI). In an example the wireless device may determine the uplink beam/power report has a same priority value of the CSI report in response to the CSI report comprising at least one of: a wideband CSI, a subband CSI, a Part 1 CSI report and/or a Part 2 CSI report.

In an example, a wireless device may determine a transmission of the uplink beam/power report has higher priority than the CSI report in response to the uplink beam/power report having a same priority value of the CSI report. In an example, when the wireless device determines to drop one of the CSI report and the uplink beam/power report, the wireless device may drop the CSI report based on the transmission of the uplink beam/power report having higher priority than the CSI report. When the wireless device determines to multiplex the CSI repot and the uplink beam/power report in an uplink transmission via a PUCCH/PUSCH resource, the wireless device may determine an order of bits of the CSI report and the uplink beam/power report for channel encoding based on the uplink beam/power report having higher priority than the CSI report.

As shown in FIG. 33, based on the priority order (e.g., the priority values) of the CSI report and the uplink beam/power report, the wireless device may determine whether multiplex the CSI report and the uplink beam/power report or drop one of the CSI report and the uplink beam/power report. In an example, the wireless device may determine to multiplex the CSI report and the uplink beam/power report according to the priority order when there is available uplink channel resource (e.g., PUCCH/PUSCH). In an example, the wireless device may determine to drop one of the CSI report and the uplink beam/power report, with higher priority value, and transmit another one with lower priority value.

Based on example of FIG. 33, the wireless device and the base station may align on what the wireless device shall transmit when CSI report(s) and uplink beam/power report are overlapping in time. Example embodiments may improve uplink power consumption and uplink coverage. Example embodiments may improve downlink signaling overhead.

In an example, a wireless device may transmit uplink beam/power report indicating an uplink coverage loss and/or a transmission power reduction (e.g., due to a proximity detection). In an example, the wireless device, by implementing existing technologies, may transmit a PHR MAC CE indicating the transmission power reduction. MAC CE based indication may not be quick enough to enable the base station and/or the wireless device to adapt uplink transmission of one of multiple panels in case a proximity detection, especially in high frequency. Existing technologies does not provide efficient way to transmit the uplink beam/power report. Example embodiments may improve uplink signaling overhead and transmission latency of transmission power reduction.

FIG. 34 shows an example of uplink transmission power reduction indication (e.g., an uplink beam/power report as shown in FIG. 30, FIG. 32 and/or FIG. 33) for a wireless device equipped with multiple panels. In an example, a wireless device may transmit to a base station an uplink beam/power report comprising one or more P-MPR values associated with one or more panels of the multiple panels. The wireless device may be equipped with the multiple panels based on examples of FIG. 28. The wireless device may transmit the uplink beam/power report based on example(s) of FIG. 30, FIG. 31 and/or FIG. 32.

As shown in FIG. 34, the wireless device may transmit to the base station the uplink beam/power report with a report format. The wireless device may transmit the uplink beam/power report in one or more uplink control information (UCI) bits. The wireless device may jointly encode the information bits of the uplink beam/power report and one or more CSI bits. The wireless device may separately encode the information bits of the uplink beam/power report and one or more CSI bits.

In an example, the uplink beam/power report with the report format may comprise one or more fields comprising a first field indicating a first P-MPR (or a transmission power reduction value) associated with a first panel of the multiple panels. The first field may have a first fixed number (e.g., L1 as shown in FIG. 34, L1 may be 1, 2, 3, 4, or any number greater than 1) of bits. In an example, the uplink beam/power report with the report format may comprise the one or more fields comprising a second field indicating a first index identifying the first panel of the multiple panels. The second field may have a second fixed number (e.g., L2 as shown in FIG. 34, L2 may be 1 or 2 depending on a number of the multiple panels) of bits. In an example, L2=2 when the wireless device has at most 4 active panels of the multiple panels. In an example, L2=1 when the wireless device has at most 2 active panels of the multiple panels. In an example, the uplink beam/power report with the report format may comprise the one or more fields comprising a third field indicating a second P-MPR (or a transmission power reduction value) associated with a second panel of the multiple panels. The second P-MPR value may be a P-MPR value (e.g., absolute value) measured on the second panel. The second P-MPR may be a differential P-MPR value (e.g., differential value) compared with the first P-MPR value. The third field may have a same length of bits as the first field, e.g., when the third field comprises an absolute value of P-MPR measured on the second panel. The third field may have a smaller length of bits than the first field, e.g., when the third field comprises a differential value of P-MPR measured on the second panel compared with the first P-MPR value measured on the first panel. In this case, the third field may have a third fixed length (e.g., L3 as shown in FIG. 34, L3=1, 2, 3, or any number less than L1) of bits. In an example, the uplink beam/power report with the report format may comprise the one or more fields comprising a fourth field indicating a second index identifying the second panel of the multiple panels. The fourth field may have a same length (e.g., L2 as shown in FIG. 34) of the second field. The uplink beam/power report comprising differential P-MPR value of a second panel may reduce uplink signaling overhead and power consumption of the wireless device.

In an example, a wireless device may determine the first panel, from the multiple active panels, having a highest P-MPR value based on measurements or detections on the multiple active panels. The wireless device transmitting the uplink beam/power report comprising the highest P-MPR value associated with the first panel may indicate that uplink coverage loss may occur on the first panel (e.g., due to a proximity detection on the first panel). In an example, the wireless device may transmit the uplink beam/power report comprising the one or more fields (e.g., the first field, the second field, the third field and the fourth field as shown in FIG. 34) indicating a first highest P-MPR associated with the first panel and a second highest P-MPR associated with the second panel. The uplink beam/power report comprising the one or more fields may indicate that uplink coverage loss may occur on the first panel and/or the second panel (e.g., due to a proximity detection on the first panel and/or the second panel). The uplink beam/power report comprising highest P-MPRs on the first panel and/or the second panel may indicate an uplink transmission restriction on the first panel and/or the second panel. In response to receiving the uplink beam/power report, the base station may avoid to schedule uplink transmission on the first panel and/or the second panel. In response to receiving the uplink beam/power report, the base station may transmit to the wireless device a command (e.g., a DCI, MAC CE or RRC message) indicating uplink transmission on an active panel, from the multiple active panels, different from the first panel and the second panel.

In an example, a wireless device may determine the first panel, from the multiple active panels, having a lowest P-MPR value based on measurements or detections on the multiple active panels. The wireless device transmitting the uplink beam/power report comprising the lowest P-MPR value associated with the first panel may indicate that uplink coverage loss may not occur on the first panel, and/or uplink coverage may be good on the first panel. In an example, the wireless device may transmit the uplink beam/power report comprising the one or more fields (e.g., the first field, the second field, the third field and the fourth field as shown in FIG. 34) indicating a first lowest P-MPR associated with the first panel and a second lowest P-MPR associated with the second panel. The uplink beam/power report comprising the one or more fields may indicate that uplink coverage loss may not occur on the first panel and/or the second panel, or uplink coverage may be good on the first panel and/or the second panel. The uplink beam/power report comprising lowest P-MPRs on the first panel and/or the second panel may indicate the first panel and/or the second panel are candidate of uplink transmission. In response to receiving the uplink beam/power report, the base station may schedule uplink transmission on any one of the first panel and the second panel. In response to receiving the uplink beam/power report, the base station may transmit to the wireless device a command (e.g., a DCI, MAC CE or RRC message) indicating uplink transmission on an active panel selected from the first panel and the second panel.

By implementing examples of FIG. 34, the wireless device may transmit to a base station an uplink beam/power report with an example embodiment report format. By implementing the embodiment report format, the wireless device may reduce power consumption of uplink beam/power report and signaling overhead.

FIG. 35 shows an example of uplink transmission power reduction indication for a wireless device equipped with multiple panels. In an example, a wireless device may transmit to a base station an uplink beam/power report comprising one or more P-MPR values associated with one or more panels of the multiple panels. The wireless device may be equipped with the multiple panels based on examples of FIG. 28. The wireless device may transmit the uplink beam/power report based on example(s) of FIG. 30, FIG. 31 and/or FIG. 32.

As shown in FIG. 35, the wireless device may transmit to the base station the uplink beam/power report with a report format. The wireless device may transmit the uplink beam/power report in one or more uplink control information (UCI) bits. The wireless device may jointly encode the information bits of the uplink beam/power report and one or more CSI bits. The wireless device may separately encode the information bits of the uplink beam/power report and one or more CSI bits.

In an example, the uplink beam/power report with the report format may comprise one or more fields comprising a first field indicating a first combined value of a first P-MPR (or a transmission power reduction value) and a first RSRP value associated with a first panel of the multiple panels. The first field may have a first fixed number (e.g., N1 as shown in FIG. 35, L1 may be 4, 5, 6, 7, or any number greater than 1) of bits. In an example, the uplink beam/power report with the report format may comprise the one or more fields comprising a second field indicating a first index identifying the first panel of the multiple panels. The second field may have a second fixed number (e.g., N2 as shown in FIG. 35, LN may be 1 or 2 depending on a number of the multiple panels) of bits. In an example, the uplink beam/power report with the report format may comprise the one or more fields comprising a third field indicating a second combined value of a second P-MPR (or a transmission power reduction value) and a second RSRP associated with a second panel of the multiple panels. The second combined value of the second P-MPR and the second RSRSP may be an absolute value. The second combined value of the second P-MPR and the second RSRSP may be a differential value compared with the first combined value of the first P-MPR and the first RSRSP. The third field may have a same length of bits as the first field, e.g., when the third field comprise an absolute value. The third field may have a smaller length of bits than the first field, e.g., when the third field comprise a differential value of the first combined value compared with the first combined value. In this case, the third field may have a third fixed length (e.g., N3 as shown in FIG. 35, N3=1, 2, 3, or any number less than N1) of bits. In an example, the uplink beam/power report with the report format may comprise the one or more fields comprising a fourth field indicating a second index identifying the second panel of the multiple panels. The fourth field may have a same length (e.g., N2 as shown in FIG. 35) of the second field. The uplink beam/power report comprising differential combined value of P-MPR and RSRP of a second panel may reduce uplink signaling overhead and power consumption of the wireless device.

In an example, a wireless device may determine the first panel, from the multiple active panels, having a highest combined value of P-MPR and RSRP based on measurements or detections on the multiple active panels. The wireless device transmitting the uplink beam/power report comprising the highest combined value of P-MPR and RSRP associated with the first panel may indicate that uplink coverage loss may not occur on the first panel (e.g., in case of a proximity detection on the first panel). In an example, the wireless device may transmit the uplink beam/power report comprising the one or more fields (e.g., the first field, the second field, the third field and the fourth field as shown in FIG. 35) indicating a first highest combined value of P-MPR and RSRP associated with the first panel and a second highest combined value of P-MPR and RSRP associated with the second panel. The uplink beam/power report comprising highest combined value of P-MPR and RSRP of the first panel and/or the second panel may indicate that the first panel and/or the second panel are candidate for uplink transmission. In response to receiving the uplink beam/power report, the base station may transmit to the wireless device a command (e.g., a DCI, MAC CE or RRC message) indicating uplink transmission on an active panel selected from the first panel and the second panel.

In an example, a wireless device may determine the first panel, from the multiple active panels, having a lowest combined value of P-MPR and RSRP based on measurements or detections on the multiple active panels. The wireless device transmitting the uplink beam/power report comprising the lowest combined value of P-MPR and RSRP associated with the first panel may indicate that uplink coverage loss may occur on the first panel. In an example, the wireless device may transmit the uplink beam/power report comprising the one or more fields (e.g., the first field, the second field, the third field and the fourth field as shown in FIG. 35) indicating a first lowest combined value of P-MPR and RSRP associated with the first panel and a second lowest combined value of P-MPR and RSRP associated with the second panel. The uplink beam/power report comprising the one or more fields may indicate that uplink coverage loss may occur on the first panel and/or the second panel. The uplink beam/power report comprising lowest combined value of P-MPR and RSRP of the first panel and/or the second panel may indicate an uplink transmission restriction on the first panel and/or the second panel. In response to receiving the uplink beam/power report, the base station may avoid to schedule uplink transmission on the first panel and/or the second panel. In response to receiving the uplink beam/power report, the base station may transmit to the wireless device a command (e.g., a DCI, MAC CE or RRC message) indicating uplink transmission on an active panel, from the multiple active panels, different from the first panel and the second panel.

By implementing examples of FIG. 35, the wireless device may transmit to a base station an uplink beam/power report with an example embodiment report format. By implementing the embodiment report format, the wireless device may reduce power consumption of uplink beam/power report and signaling overhead.

FIG. 36 shows an example of uplink transmission power reduction indication for a wireless device equipped with multiple panels. In an example, a wireless device may transmit to a base station an uplink beam/power report comprising one or more P-MPR values associated with one or more panels of the multiple panels. The wireless device may be equipped with the multiple panels based on examples of FIG. 28. The wireless device may transmit the uplink beam/power report based on example(s) of FIG. 30, FIG. 31 and/or FIG. 32.

As shown in FIG. 36, the wireless device may transmit to the base station the uplink beam/power report with a report format. The wireless device may transmit the uplink beam/power report in one or more uplink control information (UCI) bits. The wireless device may jointly encode the information bits of the uplink beam/power report and one or more CSI bits. The wireless device may separately encode the information bits of the uplink beam/power report and one or more CSI bits.

In an example, the uplink beam/power report with the report format may comprise one or more fields comprising a first field indicating a first PHR (or a transmission power state value) associated with a first panel of the multiple panels. The wireless device may determine a value of a PHR for a panel based on above mentioned examples. The first field may have a first fixed number (e.g., M1 as shown in FIG. 36, M1 may be 1, 2, 3, 4, or any number greater than 1) of bits. In an example, the uplink beam/power report with the report format may comprise the one or more fields comprising a second field indicating a first index identifying the first panel of the multiple panels. The second field may have a second fixed number (e.g., M2 as shown in FIG. 36, M2 may be 1 or 2 depending on a number of the multiple panels) of bits. In an example, the uplink beam/power report with the report format may comprise the one or more fields comprising a third field indicating a second PHR (or a transmission power state value) associated with a second panel of the multiple panels. The second PHR value may be absolute value measured on the second panel. The second PHR may be a differential PHR value (e.g., differential value) compared with the first PHR value. The third field may have a same length of bits as the first field, e.g., when the third field comprise an absolute value of PHR measured on the second panel. The third field may have a smaller length of bits than the first field, e.g., when the third field comprise a differential value of PHR measured on the second panel compared with the first PHR value measured on the first panel. In this case, the third field may have a third fixed length (e.g., M3 as shown in FIG. 36, M3=1, 2, 3, or any number less than M1) of bits. In an example, the uplink beam/power report with the report format may comprise the one or more fields comprising a fourth field indicating a second index identifying the second panel of the multiple panels. The fourth field may have a same length (e.g., M2 as shown in FIG. 36) of the second field. The uplink beam/power report comprising differential PHR value of a second panel may reduce uplink signaling overhead and power consumption of the wireless device.

In an example, a wireless device may determine the first panel, from the multiple active panels, having a highest PHR value based on measurements or detections on the multiple active panels. The wireless device transmitting the uplink beam/power report comprising the highest PHR value associated with the first panel may indicate that uplink coverage loss may not occur on the first panel (e.g., in case of a proximity detection). In an example, the wireless device may transmit the uplink beam/power report comprising the one or more fields (e.g., the first field, the second field, the third field and the fourth field as shown in FIG. 36) indicating a first highest PHR associated with the first panel and a second highest PHR associated with the second panel. The uplink beam/power report comprising the one or more fields may indicate that uplink coverage loss may not occur on the first panel and/or the second panel. The uplink beam/power report comprising highest PHR of the first panel and/or the second panel may indicate that the first panel and/or the second panel are candidate panels for uplink transmission. In response to receiving the uplink beam/power report, the base station may transmit to the wireless device a command (e.g., a DCI, MAC CE or RRC message) indicating uplink transmission on an active panel selected from the first panel and the second panel.

In an example, a wireless device may determine the first panel, from the multiple active panels, having a lowest PHR value based on measurements or detections on the multiple active panels. The wireless device transmitting the uplink beam/power report comprising the lowest PHR value associated with the first panel may indicate that uplink coverage loss may occur on the first panel. In an example, the wireless device may transmit the uplink beam/power report comprising the one or more fields (e.g., the first field, the second field, the third field and the fourth field as shown in FIG. 36) indicating a first lowest PHR associated with the first panel and a second lowest PHR associated with the second panel. The uplink beam/power report comprising the one or more fields may indicate that uplink coverage loss may occur on the first panel and/or the second panel. The uplink beam/power report comprising lowest PHR of the first panel and/or the second panel may indicate an uplink transmission restriction on the first panel and/or the second panel. In response to receiving the uplink beam/power report, the base station may avoid to schedule uplink transmission on the first panel and/or the second panel. In response to receiving the uplink beam/power report, the base station may transmit to the wireless device a command (e.g., a DCI, MAC CE or RRC message) indicating uplink transmission on an active panel, from the multiple active panels, different from the first panel and the second panel.

By implementing examples of FIG. 36, the wireless device may transmit to a base station an uplink beam/power report with an example embodiment report format. By implementing the embodiment report format, the wireless device may reduce power consumption of uplink beam/power report and signaling overhead.

Figure 37:
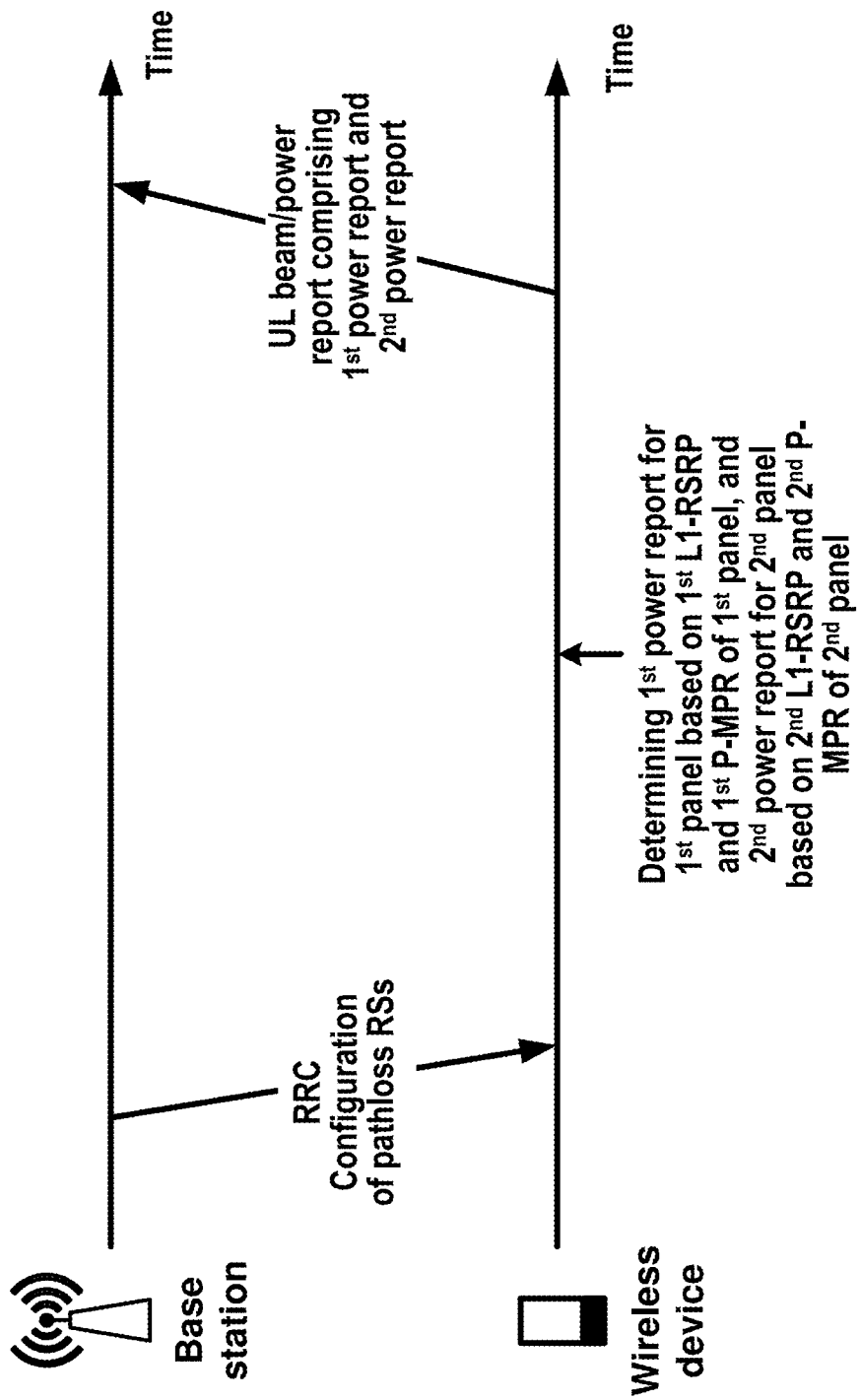
FIG. 37 shows an example of uplink beam/power report determination, according to some embodiments.

FIG. 37 shows an example of uplink transmission power reduction calculation for a wireless device equipped with multiple panels. The wireless device may be equipped with the multiple panels based on examples of FIG. 28. In an example, a base station may transmit to the wireless device one or more RRC messages comprising configuration parameters of pathloss RSs, open loop power control parameters (e.g., P0 and alpha set), close loop power control parameters (e.g., power control loop index).

In an example, the wireless device may determine a first power report for a first panel based on a first L1-RSRP and a first P-MPR measured on the first panel. In an example, the wireless device may measure the first L1-RSRP based on a first pathloss RS of the pathloss RSs, the first pathloss RS of the pathloss RSs being associated with the first panel. In an example, the wireless device may determine the first pathloss RS is associated with the first panel in response the first L1-RSRP measured on the first pathloss RS being the highest value among L1-RSRP values measured on the pathloss RSs. A L1-RSRP value may be determined without filtering based on a layer 3 filter configured by the base station. The wireless device determining a power report based on L1-RSRP may improve uplink beam/power report latency and enable a quick panel change (e.g., in case of a proximity detection).

In an example, the wireless device may further determine a second power report for a second panel based on a second L1-RSRP and a second P-MPR measured on the second panel. In an example, the wireless device may measure the second L1-RSRP based on a second pathloss RS of the pathloss RSs, the second pathloss RS of the pathloss RSs being associated with the second panel. In an example, the wireless device may determine the second pathloss RS is associated with the second panel in response the second L1-RSRSP measured on the second pathloss RS being the highest value among L1-RSRP values measured on the pathloss RSs. In an example, the first pathloss RS may be different from or same as the second pathloss RS. The first L1-RSRP may be different from or same as the second L1-RSRP.

In an example, the wireless device may determine a first P-MPR value for the first panel based on the first L1-RSRP, a first open loop power control parameter of the open loop power control parameters, a first close loop power control parameter of the close loop power control parameters. The first open loop power control parameter may be associated with the first panel. The first close loop power control parameter may be associated with the first panel. The association between the power control parameter (e.g., open loop and/or close loop) and the first panel may be indicated in a command (e.g., a DCI, a MAC CE, or an RRC message).

In an example, the wireless device may determine a second P-MPR value for the second panel based on the second L1-RSRP, a second open loop power control parameter of the open loop power control parameters, a second close loop power control parameter of the close loop power control parameters. The second open loop power control parameter may be associated with the second panel. The second close loop power control parameter may be associated with the second panel. The association between the power control parameter (e.g., open loop and/or close loop) and the second panel may be indicated in a command (e.g., a DCI, a MAC CE, or an RRC message).

By implementing examples of FIG. 37, based on the first L1-RSRP and first P-MPR of the first panel and the second L1-RSRP and the second P-MPR of the second panel, the wireless device may transmit the uplink beam/power report by implementing example embodiments of FIG. 34, FIG. 35 and/or FIG. 36.

In an example, a wireless device may receive from a base station one or more RRC messages comprising first parameters of power state report on a cell and second parameter of CSI report on the cell. The wireless device may transmit the power state report and drop the CSI report based on: the power state report having priority over the CSI report, and a first uplink channel resource of the power state report overlapping in time with a second uplink channel resource of the CSI report. The first uplink channel resource may be on a primary cell, or a PUCCH SCell. The power state report may be periodic transmission via a PUCCH resource. The power state report may comprise a maximum output power associated with a first panel of a plurality of panels of the wireless device. The CSI report may be periodic CSI report via a PUCCH resource. The CSI report may comprise at least one of: a L1-RSRP value and a L1-SINR. The first uplink channel resource may be indicated in the first parameters. The second uplink channel resource may be indicated in the second parameters. The power state report may comprise a power management maximum power reduction (P-MPR) value of a first panel. The wireless device may determine the P-MPR associated with the first panel based on at least one of: a RSRP, a transmission signal format for a transmission via the first panel and/or a proximity detection on the first panel. The wireless device may determine the RSRP of a reference signal received on the first panel. The power state report may comprise a power headroom report (PHR) associated with a first panel. The wireless device may determine the PHR associated with the first panel based on a maximum power reduction (MPR) associated with modulation orders, bandwidth and waveform type of a transmission via the first panel. The wireless device may determine the PHR associated with the first panel based on an additional maximum power reduction (A-MPR) indicated by the base station. The wireless device may determine the PHR associated with the first panel based on a power management MPR (P-MPR) associated with a proximity detection on the first panel. In an example, the wireless device may be equipped with a plurality of panels. One or more of the plurality of panels may be active. The configuration parameters comprise first parameters of a plurality of transmission configuration information (TCI) states, wherein the plurality of TCI states are grouped in TCI groups and each TCI group is associated with a corresponding one of the plurality of panels. The power state report may comprise an index indicating a TCI group corresponding to a first panel. The configuration parameters may comprise second parameters of a plurality of sounding reference signal resource information (SRI), wherein the plurality of SRI are grouped in SRI groups and each SRI group is associated with a corresponding one of the plurality of panels. The power state report may comprise an index indicating an SRI group corresponding to a first panel.

In an example, a wireless device may receive from a base station one or more RRC messages comprising configuration parameters of uplink power state report of a plurality of panels on a cell. The wireless device may determine a first panel, from the plurality of panels, having a highest maximum power reduction value. The wireless device may transmit, in response to the determining, an uplink power state report comprising a first field indicating the first panel and a second field indicating the highest maximum power reduction value.

In an example, a wireless device may receive from a base station one or more RRC messages comprising configuration parameters of uplink power state report of a plurality of panels on a cell. The wireless device may transmit an uplink power state report comprising a first field comprising a first transmission power reduction value associated with a first panel of the plurality of panels and a second field comprising a differential power value of a second panel of the plurality of panels. The differential power value may be determined based on a difference between a second transmission power reduction value of the second panel and the first transmission power reduction value of the first panel.

In an example, a wireless device may receive from a base station one or more radio resource control messages comprising: first configuration parameters of a plurality of pathloss RSs and second configuration parameters of a plurality of panels. Each of the plurality of pathloss RSs may be associated with a corresponding one of the plurality of panels. The wireless device may transmit an uplink power state report comprising at least one of: a first transmission power reduction value associated with a first panel of the plurality of panels and a first power head room determined based on a pathloss value of a pathloss RS, of the plurality of pathloss RSs, associated with the first panel. The pathloss value may be determined based on a L1-RSRP of the pathloss RS. The one or more RRC messages may further comprise third configuration parameters of a plurality of P0 and alpha sets. Each of the plurality of P0 and alpha sets may be associated with a corresponding one of the plurality of panels. The wireless device may determine the first power head room based on a P0 value and an alpha value of a P0 and alpha set of the plurality of P0 and alpha sets, wherein the P0 and alpha set is associated with the first panel.

What is claimed is:

1. A wireless device comprising:
one or more processors; and
memory storing instructions that, when executed by the one or more processors, cause the wireless device to:
receive configuration parameters indicating:
a first uplink channel resource for a permissible exposure report for a cell, wherein the permissible exposure report comprises a power management maximum power reduction (P-MPR) value of a first panel of a plurality of panels of the wireless device; and
a second uplink channel resource for a channel state information (CSI) report for the cell; and
based on an overlap in time between the first uplink resource and the second uplink channel resource:
drop the CSI report scheduled for transmission via the second uplink channel resource; and
transmit the permissible exposure report via the first uplink channel resource.

2. The wireless device of claim 1, wherein the instructions further cause the wireless device to determine to drop the CSI report based on:
a first priority of the permissible exposure report and a second priority of the CSI report; and
the overlap in time.

3. The wireless device of claim 2, wherein the permissible exposure report is transmitted based on the determination to drop the CSI report.

4. The wireless device of claim 2, wherein the first priority indicates a first priority value smaller than a second priority value indicated by the second priority.

5. The wireless device of claim 1, wherein the permissible exposure report comprises an index indicating a transmission configuration information (TCI) group corresponding to the first panel.

6. The wireless device of claim 1, wherein the permissible exposure report comprises a power headroom report (PHR).

7. The wireless device of claim 1, wherein the configuration parameters comprise second parameters of a plurality of transmission configuration information (TCI) states, wherein:
the plurality of TCI states are grouped in TCI groups; and
each TCI group is associated with a corresponding one of the plurality of panels.

8. The wireless device of claim 1, wherein the configuration parameters comprise second parameters of a plurality of sounding reference signal resource information (SRI), wherein:
the plurality of SRI are grouped in SRI groups; and
each SRI group is associated with a corresponding one of the plurality of panels.

9. The wireless device of claim 8, wherein the permissible exposure report comprises an index indicating an SRI group, of the SRI groups, corresponding to the first panel.

10. The wireless device of claim 1, wherein the instructions further cause the wireless device to determine the overlap in time between the first uplink resource and the second uplink channel resource.

11. A method comprising:
receiving, by a wireless device, configuration parameters indicating:
a first uplink channel resource for a permissible exposure report for a cell, wherein the permissible exposure report comprises a power management maximum power reduction (P-MPR) value of a first panel of a plurality of panels of the wireless device; and
a second uplink channel resource for a channel state information (CSI) report for the cell; and
based on an overlap in time between the first uplink resource and the second uplink channel resource:
dropping the CSI report scheduled for transmission via the second uplink channel resource; and
transmitting the permissible exposure report via the first uplink channel resource.

12. The method of claim 11, further comprising determining to drop the CSI report based on:
a first priority of the permissible exposure report and a second priority of the CSI report; and
the overlap in time.

13. The method of claim 12, wherein the permissible exposure report is transmitted based on the determination to drop the CSI report.

14. The method of claim 12, wherein the first priority indicates a first priority value smaller than a second priority value indicated by the second priority.

15. The method of claim 11, wherein the permissible exposure report comprises an index indicating a transmission configuration information (TCI) group corresponding to the first panel.

16. The method of claim 11, wherein the permissible exposure report comprises a power headroom report (PHR).

17. The method of claim 11, wherein the configuration parameters comprise second parameters of a plurality of transmission configuration information (TCI) states, wherein:
the plurality of TCI states are grouped in TCI groups; and
each TCI group is associated with a corresponding one of the plurality of panels.

18. The method of claim 11, wherein the configuration parameters comprise second parameters of a plurality of sounding reference signal resource information (SRI), wherein:
the plurality of SRI are grouped in SRI groups; and
each SRI group is associated with a corresponding one of the plurality of panels.

19. The method of claim 18, wherein the permissible exposure report comprises an index indicating an SRI group, of the SRI groups, corresponding to the first panel.

20. A non-transitory computer-readable medium comprising instructions that, when executed by one or more processors of a wireless device, cause the wireless device to:
receive configuration parameters indicating:
a first uplink channel resource for a permissible exposure report for a cell, wherein the permissible exposure report comprises a power management maximum power reduction (P-MPR) value of a first panel of a plurality of panels of the wireless device; and
a second uplink channel resource for a channel state information (CSI) report for the cell; and based on an overlap in time between the first uplink resource and the second uplink channel resource:
 drop the CSI report scheduled for transmission via the second uplink channel resource; and
 transmit the permissible exposure report via the first uplink channel resource.

\* \* \* \* \*